US010705193B2

(12) United States Patent
Pacala et al.

(10) Patent No.: US 10,705,193 B2
(45) Date of Patent: Jul. 7, 2020

(54) MONITORING OF VEHICLES USING LIGHT RANGING SYSTEMS

(71) Applicant: Ouster, Inc., San Francisco, CA (US)

(72) Inventors: Angus Pacala, San Francisco, CA (US); Dmitri Garbuzov, San Francisco, CA (US); Daniel Lu, San Francisco, CA (US); Wil Selby, San Francisco, CA (US); Mushfiqur Rouf, San Francisco, CA (US); Henru Wang, Palo Alto, CA (US); Kairen Wong, Palo Alto, CA (US)

(73) Assignee: Ouster, Inc., San Francisco, CA (US)

(*) Notice: Subject to any disclaimer, the term of this patent is extended or adjusted under 35 U.S.C. 154(b) by 0 days.

(21) Appl. No.: 16/213,843

(22) Filed: Dec. 7, 2018

(65) Prior Publication Data

US 2019/0179029 A1    Jun. 13, 2019

Related U.S. Application Data

(60) Provisional application No. 62/595,996, filed on Dec. 7, 2017, provisional application No. 62/665,439, filed on May 1, 2018.

(51) Int. Cl.
*G01S 7/497* (2006.01)
*G01S 17/93* (2020.01)
(Continued)

(52) U.S. Cl.
CPC .............. *G01S 7/497* (2013.01); *B60Q 9/008* (2013.01); *G01C 21/20* (2013.01); *G01C 21/30* (2013.01);
(Continued)

(58) Field of Classification Search
CPC .......... G01S 7/497; G01S 7/4808; G01S 7/51; G01S 17/42; G01S 17/936; G01C 21/20;
(Continued)

(56) References Cited

U.S. PATENT DOCUMENTS 6,088,648 A    7/2000  Shah et al.
8,917,169 B2  12/2014  Shofield et al.
(Continued)

OTHER PUBLICATIONS

Notice of Allowance mailed in U.S. Appl. No. 16/213,784, dated Aug. 21, 2019, 9 pages.
(Continued)

*Primary Examiner* — Yuen Wong
(74) *Attorney, Agent, or Firm* — Kilpatrick Townsend & Stockton LLP

(57) ABSTRACT

Methods, systems, and devices are provided for calibrating a light ranging system and using the system to track environmental objects. In embodiments, the approach involves installing light ranging devices, such as lidar devices, on the vehicle exterior. The light ranging system may be calibrated using a calibration device to scan the vehicle exterior and construct a three-dimensional model of the vehicle exterior comprising the positions of the installed light ranging devices on the vehicle exterior. The calibrated light ranging system may use the model in conjunction with ranging data collected by the installed light ranging devices to track objects in the environment. In this way, the light ranging system may detect a proximity of environmental objects and help a driver of the vehicle avoid potential collisions. The light ranging system may further measure the vehicle exterior and thereby detect changes to the vehicle exterior.

23 Claims, 24 Drawing Sheets

(51) Int. Cl.
| | |
|---|---|
| G01S 17/87 | (2020.01) |
| G01S 17/89 | (2020.01) |
| G01C 21/20 | (2006.01) |
| G01C 21/30 | (2006.01) |
| G01S 7/48 | (2006.01) |
| G01S 7/51 | (2006.01) |
| G01S 17/42 | (2006.01) |
| B60Q 9/00 | (2006.01) |
| G05D 1/02 | (2020.01) |
| B60R 1/00 | (2006.01) |
| G01C 21/36 | (2006.01) |

(52) U.S. Cl.
CPC ............ G01S 7/4808 (2013.01); G01S 7/51 (2013.01); G01S 17/42 (2013.01); G01S 17/87 (2013.01); G01S 17/89 (2013.01); G01S 17/936 (2013.01); G05D 1/0214 (2013.01); G05D 1/0238 (2013.01); B60R 1/00 (2013.01); G01C 21/3647 (2013.01); G05D 2201/0213 (2013.01)

(58) Field of Classification Search
CPC .... G01C 21/30; G01C 21/3647; B60Q 9/008; G05D 1/0214; G05D 1/0238; G05D 2201/0213; B60R 1/00
See application file for complete search history.

(56) References Cited

U.S. PATENT DOCUMENTS

| | | | |
|---|---|---|---|
| 2013/0090781 A1 | 4/2013 | Gellatly et al. | |
| 2015/0219764 A1 | 8/2015 | Lipson | |
| 2015/0347840 A1 | 12/2015 | Iida | |
| 2016/0082953 A1 | 3/2016 | Teller et al. | |
| 2017/0008521 A1* | 1/2017 | Braunstein | G01C 21/32 |
| 2017/0110022 A1 | 4/2017 | Gulash | |
| 2017/0177954 A1 | 6/2017 | Micks et al. | |
| 2018/0370552 A1 | 12/2018 | Puttagunta et al. | |

OTHER PUBLICATIONS

Non-Final Office Action received in Application No. 16213827, dated Sep. 20, 2019, 25 pages.
Alismail, H., Baker, L. D., & Browning, B. (May 2014). Continuous trajectory estimation for 3D SLAM from actuated lidar. In *Robotics and Automation (ICRA)*, 2014 *IEEE International Conference on* (pp. 6096-6101). IEEE.
Anderson, S., MacTavish, K., & Barfoot, T. D. (2015). Relative continuous-time SLAM. The International Journal of Robotics Research, 34(12), 1453-1479.
Barfoot, T. D., Tong, C. H., & Särkkä, S. (Jul. 2014). Batch Continuous-Time Trajectory Estimation as Exactly Sparse Gaussian Process Regression. In *Robotics: Science and Systems*.
Besl, P. J., & McKay, N. D. (Apr. 1992). Method for registration of 3-D shapes. In *Robotics-DL tentative* (pp. 586-606). International Society for Optics and Photonics.
Dubé, R., Sommer, H., Gawel, A., Bosse, M., & Siegwart, R. (May 2016). Nonuniform sampling strategies for continuous correction based trajectory estimation. In *Robotics and Automation (ICRA)*, 2016 *IEEE International Conference on* (pp. 4792-4798). IEEE.
Geiger, A., Lenz, P., Stiller, C., & Urtasun, R. (2013). Vision meets robotics: The KITTI dataset. *The International Journal of Robotics Research*, 32(11), 1231-1237.
Kaul, L., Zlot, R., & Bosse, M. (2016). Continuous-Time Three-Dimensional Mapping for Micro Aerial Vehicles with a Passively Actuated Rotating Laser Scanner. Journal of Field Robotics, 33(1), 103-132.
Kohler, D., Hess, W., & Rapp, H. (Oct. 2016) Cartographer is a system that provides real-time simultaneous localization and mapping (SLAM) in 2D and 3D across multiple platforms and sensor configurations. Retrieved from github.com/googlecartographer/cartographer.
Magnusson, M. (2009). The three-dimensional normal-distributions transform: an efficient representation for registration, surface analysis, and loop detection (Doctoral dissertation, Örebro universitet).
Pomerleau, F., Colas, F., & Siegwart, R. (2015). A review of point cloud registration algorithms for mobile robotics. *Foundations and Trends* in Robotics, 4(1), 1-104.
Segal, A., Haehnel, D., & Thrun, S. (Jun. 2009). Generalized-ICP. In Robotics: science and systems (vol. 2, No. 4).
Stoyanov, T., Magnusson, M., Andreasson, H., & Lilienthal, A. J. (2012). Fast and accurate scan registration through minimization of the distance between compact 3D NDT representations. *The International Journal of Robotics Research*, 31(12), 1377-1393.
Tam, G. K., Cheng, Z. Q., Lai, Y. K., Langbein, F. C., Liu, Y., Marshall, D., . . . & Rosin, P. L. (2013). Registration of 3D point clouds and meshes: a survey from rigid to nonrigid. *Visualization and computer graphics, IEEE transactions on*, 19(7), 1199-1217.
Zhang, J., & Singh, S. (Jul. 2014). LOAM: Lidar Odometry and Mapping in Realtime. In *Robotics: Science and Systems* (vol. 2).
Zhang, J., & Sigh, S. (Nov. 2014). LaserOdometry.cpp. Retrieved from http://web.archive.org/web/20160728191133/http://docs.ros.org/indigo/api/loam_velodyne/html/laserOdometry_8cppsource.htmlhtt;://docs.ros.org/indigo/api/loamvelodyne/html/laserOdometry8ccpsource.html.
Zlot, R., & Bosse, M. (2014). Efficient Large-scale Three-dimensional Mobile Mapping for Underground Mines. *Journal of Field Robotics*, 31(5), 758-779.
Pendleton, et al. "Perception, planning, control, and coordination for autonomous vehicles." In: Machines. Feb. 17, 2017 Retrieved on Mar. 28, 2019 from https://www.mdpi.com/2075-1702/5/1/6/pdf entire document.
International Searching Authority; International Search Report and Written Opinion dated May 6, 2019 in International Patent Application PCT/US2018/064597, 24 pages.
International Searching Autority; PCT/US2018/064597, "Invitation to Pay Additional Fees and, Where Applicable, Protest Fee", Feb. 4, 2019, 2 pages.

* cited by examiner

MONITORING OF VEHICLES USING LIGHT RANGING SYSTEMS

CROSS-REFERENCES TO RELATED APPLICATIONS

The present application claims priority from and is a non-provisional application of U.S. Provisional Application No. 62/595,996, entitled "Installation And Use Of Vehicle Light Ranging System," filed Dec. 7, 2017 and U.S. Provisional Application No. 62/665,439, entitled "Installation And Use Of Vehicle Light Ranging System," filed May 1, 2018, the entire contents of which are herein incorporated by reference for all purposes.

The following commonly owned and concurrently-filed U.S. patent applications, including the instant application, are incorporated by reference in their entirety for all purposes:

"Installation And Use Of Vehicle Light Ranging System" by Pacala et. al. Ser. No. 16/213,784, "Telematics Using A Light Ranging System," by Pacala et. al. Ser. No. 16/213,827, and "Monitoring Of Vehicles Using Light Ranging Systems," by Pacala et. al. Ser. No. 16/213,843.

BACKGROUND

Light ranging systems, such as light detection and ranging (LIDAR) systems may be used to assist with the operations of a vehicle, such as a driver-operated vehicle or a self-driving vehicle. Currently, these light ranging systems are typically built into the body of specialized vehicle for performing light ranging functions. However, these vehicles with integrated light ranging systems may be difficult or expensive to build, test, install, and purchase for commercial or personal use. Consequently, such technology complexities and prohibitive costs may prevent such specialized light ranging vehicles from becoming ubiquitous and easily adopted by businesses and consumers.

BRIEF SUMMARY

The present disclosure relates generally to systems and methods for assisting with installation and usage of a light ranging system of a vehicle. The disclosed embodiments may provide approaches that require only a simple installation process for installing a light ranging system on a vehicle. The installation process may not require special calibration targets or specific operator skill and may be customized for each unique vehicle the light ranging system may be installed on. The proposed light ranging system may also take minimal technician time to install and operate, and may be able to automatically recalibrate itself and detect changes to the vehicle envelope in real time.

In an embodiment for assisting with installation, a calibration imaging device can be used to scan a vehicle and one or more light ranging devices installed on the vehicle. For instance, a user may hold the calibration device while walking around the vehicle to perform a 360 degree scan of the vehicle exterior. The data collected by the calibration device may be used (e.g., by a control unit) to construct a primary model of the vehicle exterior and to determine the positions of the light ranging devices on the vehicle exterior as represented in the primary model. In this manner, precise position(s) of the one or more light ranging devices relative to an exterior of the vehicle can be determined, thereby allowing accurate detection of distances from the vehicle's exterior and an object. Such a process can allow easier installation (e.g., less time consuming and cheaper due to lack of costly mounting gear).

In some embodiments, once a light ranging system is installed, it can be used to track environmental objects, e.g., to alert a driver or prevent the vehicle from colliding with such environmental objects, as well as usage for monitoring driver quality. The installed light ranging devices can survey the environment and measure distance vectors between the light ranging devices and points on surfaces of objects in the environment. Various metrics may then be derived from the distance vectors collected by the light ranging devices. For example, a distance vector can be combined with the primary model of the vehicle to determine a risk value using the primary model and a point on an object, thereby allowing detection of when an object is too close or rapidly approaching the vehicle. In one implementation, a three-dimensional coordinate for each point in the environment can be determined according to a coordinate system in the model. A distance value between each point on the vehicle exterior and a closest point in the environment may then be calculated.

In addition, by collecting sets of distance vectors at multiple points in time, the light ranging system may also track the movement of points in the environment and predict where the points might be at a future point in time. By tracking the movement of points in the environment, the light ranging system may also combine such data with the primary model of the vehicle exterior to calculate relative velocities between points in the environment and the vehicle exterior. Or, by tracking changes over time of the distance vectors to respective environmental surfaces of the plurality of environmental surfaces, odometry information about the motion of the vehicle (e.g., a trajectory, speed, velocity, acceleration, etc.) can be determined. Such odometry information can be or be used to determine a risk value, e.g., whether driving is risky at a given instant in time. Such a risk value may be determined without references to the primary model.

Metrics such as distances and relative velocities between the vehicle exterior and points in the environment may be used to compute a risk value for points in the environment. The risk value may be a function of distances, relative velocities, or other metrics or factors that may be derived from the data collected by light ranging devices, or some combination of the above. The risk value may then be compared with a risk threshold, which may be a single value, such as a threshold distance value, or a function of multiple factors, such as distances and relative velocities. By comparing the risk value to the risk threshold, the light ranging system may determine when a risk breach has occurred and generate an appropriate response, such as issuing an alert to the driver or intervening with vehicle operations.

In some embodiments, a light ranging system mounted on the vehicle may be used to detect changes to the vehicle exterior. These changes may include shifts in the positions of the light ranging devices on the vehicle exterior, dents or other damage to the vehicle, or when movable component of the vehicle, such as a door, changes position. Detecting such changes may involve scanning the vehicle exterior using the light ranging devices and comparing the scans with the model of the vehicle previously constructed. Upon detecting changes to the vehicle exterior, an appropriate response may be issued by the light ranging system.

In some embodiments, a computer can provide an interactive user interface for tracking a group of vehicles on which light ranging systems are installed. The interface can be provided by a server computer or a client computer. A computer can receive information about one or more risk breaches determined using the light ranging systems. Metadata about the one or more risk breaches can be stored in a driver's profile. Such metadata can be displayed on a map in association with an icon representing a vehicle of a particular driver.

In some embodiments, a computer system can display a map of vehicles at corrected positions using light ranging data collected from light ranging systems installed on a group of vehicles. The light ranging data collected from the light ranging systems installed on the group of vehicles can be used to correct position data determined via a first technique, e.g., GPS. For example, the light ranging data can be aligned to a portion of a physical map to determine the corrected position data for a vehicle.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments are described with reference to the following figures.

FIG. 9 illustrates an exemplary website dashboard with data of one or more drivers' usage of a vehicle displayed via a user interface according to some embodiments.

FIG. 11 illustrates examples safety breakdown section of the dashboard in an alternate view according to some embodiments.

FIGS. 12-13 illustrate similar dashboard information illustrated in FIGS. 9-11 but for a particular user according to some embodiments.

FIG. 14 illustrates an example driving log for a particular user according to some embodiments.

TERMS

Figure 1:
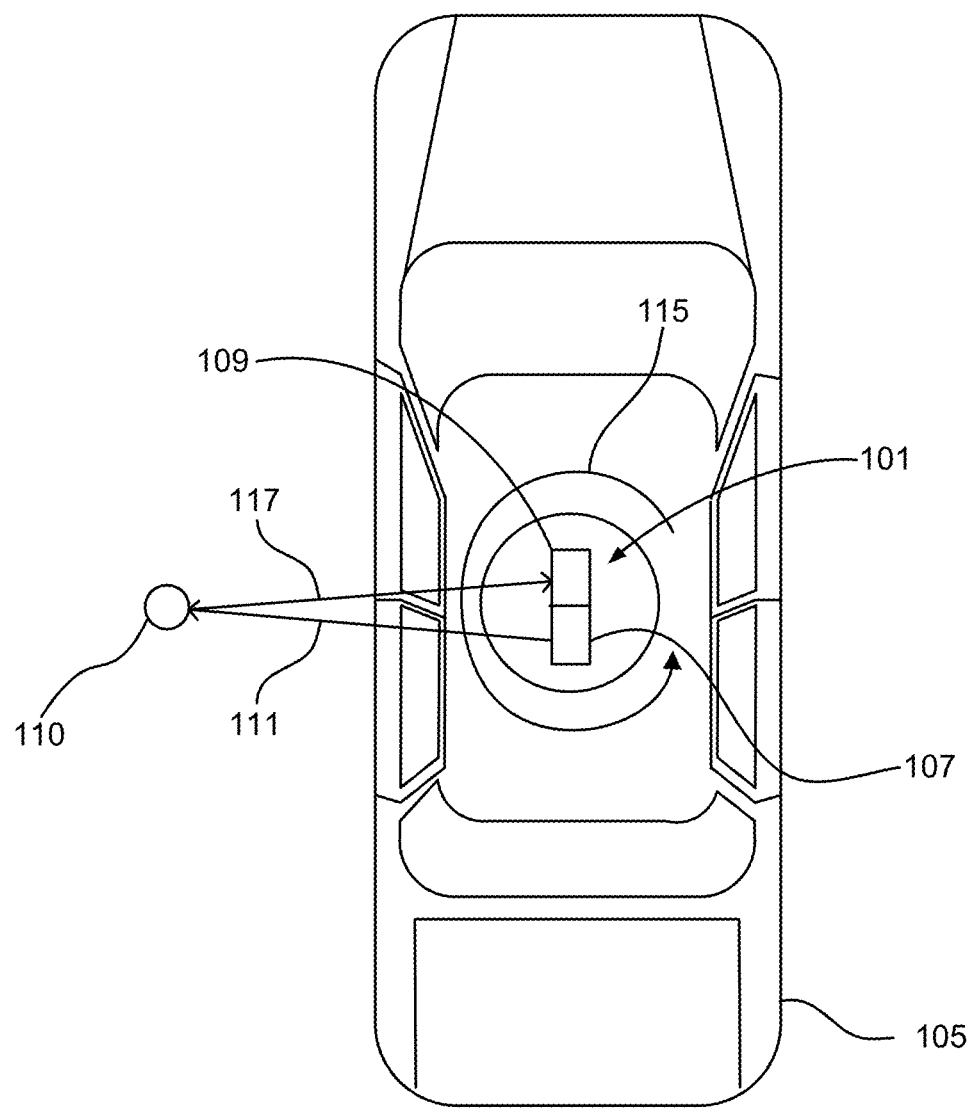
FIG. 1 shows an exemplary light ranging system having a scanning lidar device installed on top of a vehicle according to some embodiments.

The following terms may be helpful for describing embodiments of the present technology.

The term "ranging," particularly when used in the context of methods and devices for measuring an environment and assisting with vehicle operations, may refer to determining a 2D or 3D distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components. in various arrangements.

"Location" and "position" may be used synonymously to refer to a point in two or three-dimensional space that may be represented as having an x, y, and z coordinate. In certain contexts, a location or position can be temporal as opposed to physical.

"Scan" and "scanning" may refer to performing one or more measurements of an object or an environment from one or more locations using a light ranging device. A scan may be of a vehicle's exterior. A "vehicle exterior" or "the exterior of a vehicle" may refer to the outermost surface of the vehicle.

A "model" may be a digital representation of a physical object. For example, a model of a vehicle exterior may be a digital representation of the exterior of the vehicle, such as a three-dimensional or two-dimensional visual representation. The visual representation may take the form of a collection of points having positions in a two-dimensional or three-dimensional space, or a mesh having vertices at various positions in a two-dimensional or three-dimensional space. The representation may further be displayed and viewed by a user.

A "proximity" or a "proximity value" may refer to a type of risk value that relates to the potential for an environmental object to collide with the vehicle. It may be a function of various factors including the distance between the environmental object and the vehicle, the velocity of the environmental object relative to the vehicle, the direction in which the environmental object may be travelling relative to the vehicle, and any other factors that may be relevant to the risk of a potential collision between the vehicle and the environmental object.

A "risk value" may refer to a derived value that relates to a risk of potential harm to the vehicle or the driver of the vehicle. One example of a risk value may be a proximity value as described above, which relates to the potential for vehicle collisions with environmental objects. Other examples of risk values may include values that relate to the likelihood that the vehicle might tip over as a result of turning too quickly, that the driver might be distracted while driving the vehicle, or any other risks that may be determined based on data collected by the light ranging system as described in embodiments of the present technology. The risk value may be determined based on data, such as ranging data, collected by components of the light ranging system, such as one or more light ranging devices and any calibration devices. While embodiments may be described herein with respect to using proximity values, it is understood that other types of risk values may also be used to implement various alternative embodiments of the present technology.

A "coordinate frame" may refer to a three-dimensional coordinate system having an x, y, and z dimension that may be used to define data points in a model of the vehicle exterior and/or additional environmental structures around the vehicle, wherein the model of the vehicle exterior may be in the form of a mapping comprising a plurality of data points corresponding to points on the vehicle exterior and/or the surfaces of environmental structures.

DETAILED DESCRIPTION

According to certain embodiments, methods and systems disclosed herein relate to calibrating and using a light ranging system to assist with operating a vehicle. The following sections of the detailed description will discuss the architecture of the light ranging system, how the light ranging systems may be calibrated by a user, and how the system may be used to track environmental objects while the vehicle is in motion, detect changes in the vehicle's exterior, and perform other functions to facilitate vehicle operations.

In embodiments, the light ranging system may be completely independent from the vehicle's systems with the exception of receiving power from the vehicle. Rather than using data supplied by the vehicle, the light ranging system may perform its sensing, analytical, and other processing functions solely based on data collected by light ranging devices comprised within the light ranging system. Therefore, a light ranging system may not be connected to the vehicle controller area network (CAN) bus. This kind of independence may allow the light ranging system to be easily adapted to any vehicle using the calibration methods described in this application.

I. EXEMPLARY LIGHT RANGING DEVICE

Figure 2:
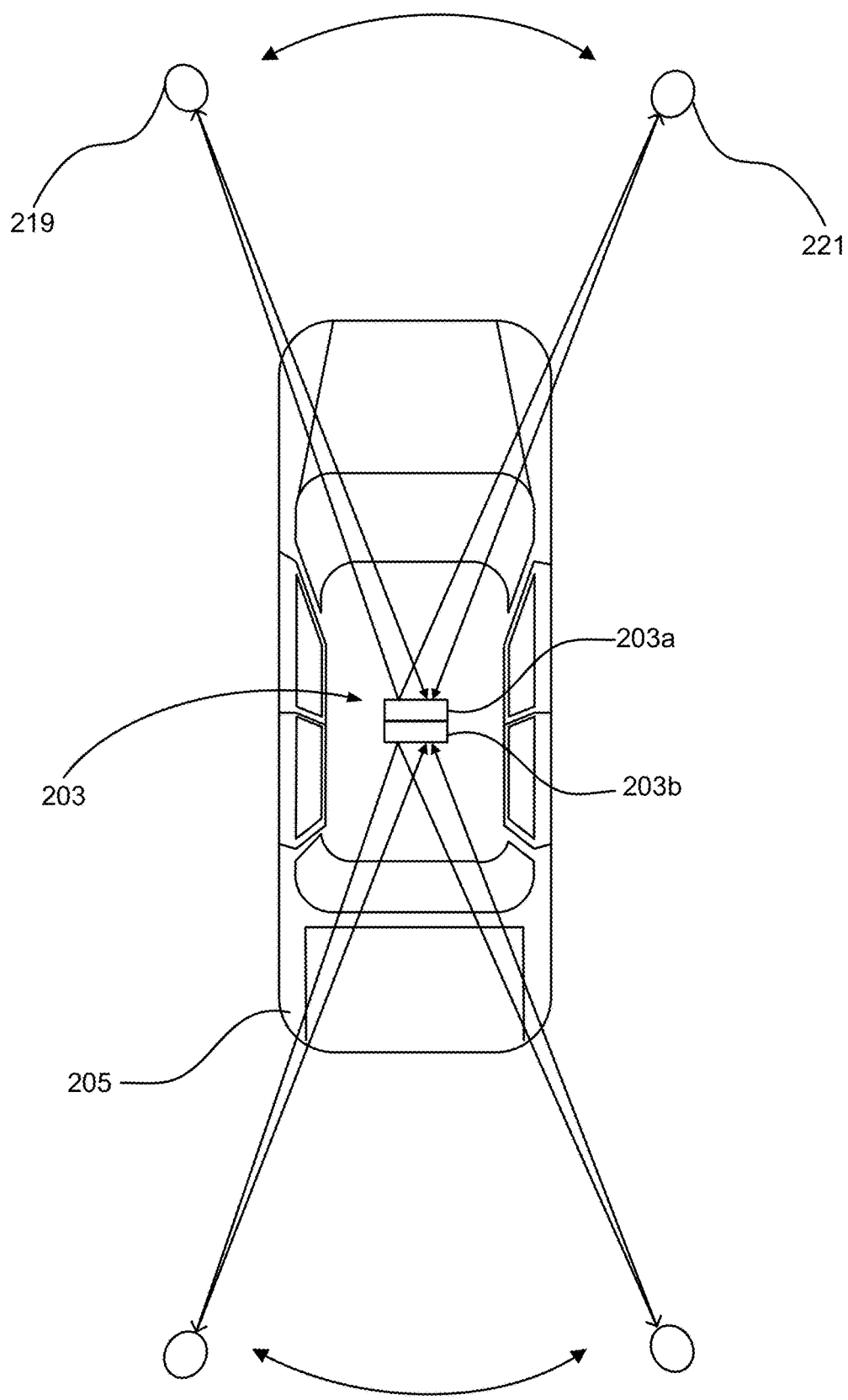
FIG. 2 shows an exemplary light ranging system having a solid-state lidar device installed on top of a vehicle according to some embodiments.

FIGS. 1-2 show automotive light ranging devices, also referred to herein as LIDAR systems, according to some embodiments. The automotive application for the LIDAR systems is chosen here merely for the sake of illustration and the sensors described herein may be employed in any vehicle or fleet of vehicles, e.g., boats, aircraft, trains, etc., or in any application where 3D depth images are useful, e.g., in medical imaging, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., scanning LIDAR system 101 and/or solid state LIDAR system 203, may be mounted on the roof of a vehicle 105 as shown in FIGS. 1 and 2.

The scanning LIDAR system 101 shown in FIG. 1 can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle.

In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

FIG. 2 shows an exemplary light ranging system having a solid-state lidar device installed on top of a vehicle according to some embodiments. For a stationary architecture, like solid state LIDAR system 203 shown in FIG. 2, one or more LIDAR flash LIDAR subsystems (e.g., 203a and 203b) can be mounted to a vehicle 205. Each solid state LIDAR unit can face a different direction (possibly with partially and/or non-overlapping fields of views between units) so as to capture a composite field of view that is larger than each unit is capable of capturing on its own.

In either the rotating or stationary architectures, objects within the scene can reflect portions of the light pulses that are emitted from the LIDAR light sources. One or more reflected portions then travel back to the LIDAR system and can be detected by the detector circuitry. For example, in FIG. 1, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 203a and 203b in FIG. 2 can employ steerable emitters such as an optical phased array or the whole composite unit may rotate through mechanical means thereby scanning the entire scene in front of the LIDAR system, e.g., from field of view 219 to field of view 221.

Figure 3:
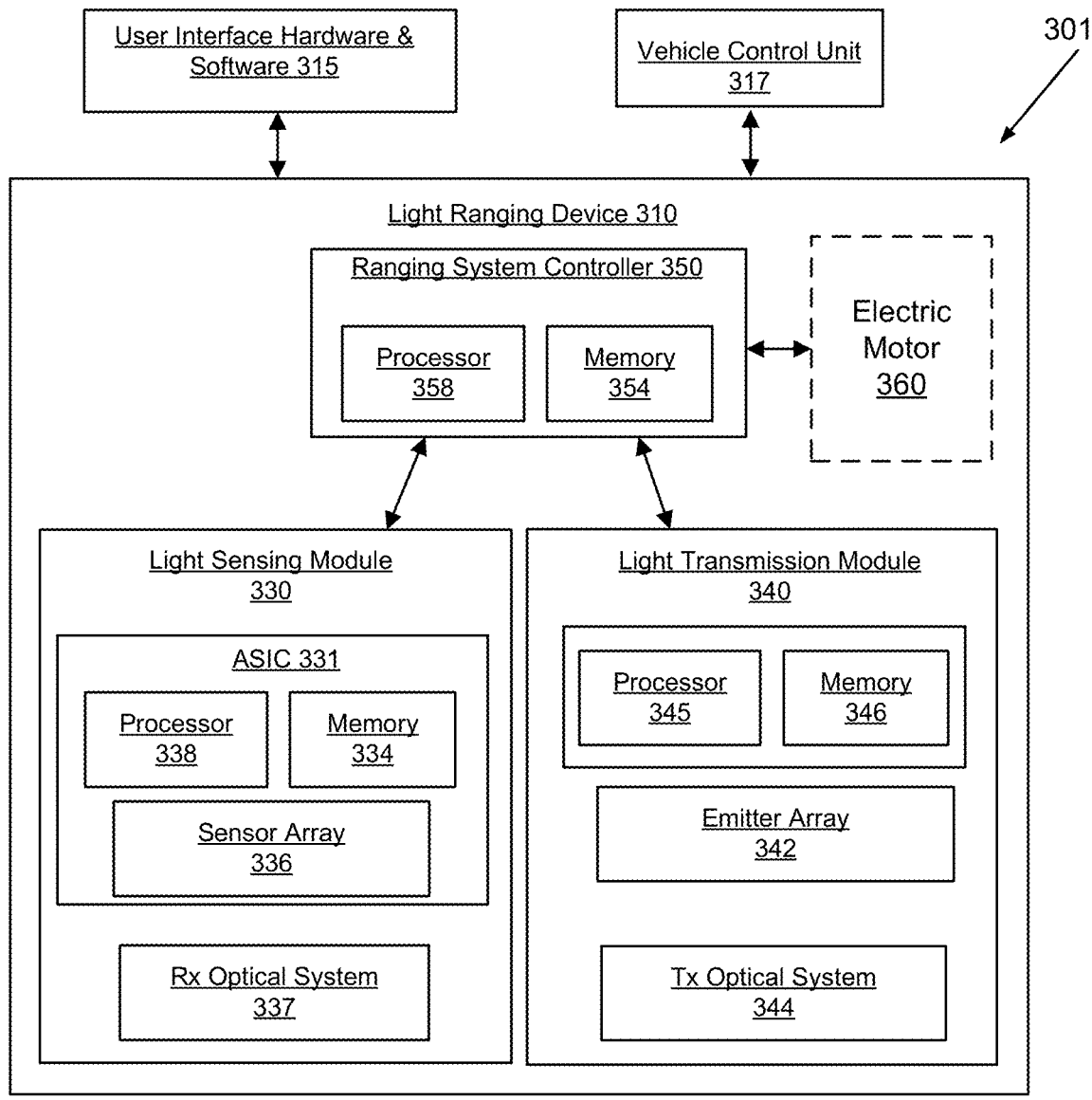
FIG. 3 shows a block diagram of an exemplary lidar device for implementing various embodiments.

FIG. 3 illustrates a more detailed block diagram of a rotating LIDAR system 301 according to some embodiments. More specifically, FIG. 3 optionally illustrates a rotating LIDAR system that can employ a rotary actuator on a rotating circuit board, which receives power and transmits and receives data from a stationary circuit board.

LIDAR system 301 can interact with one or more instantiations of user interface hardware and software 315. The different instantiations of user interface hardware and software 315 can vary and may include, e.g., a computer system with a monitor, keyboard, mouse, CPU and memory; a touch-screen in an automobile; a handheld device with a touch-screen; or any other appropriate user interface. The user interface hardware and software 315 may be local to the object upon which the LIDAR system 301 is mounted but can also be a remotely operated system. For example, commands and data to/from the LIDAR system 301 can be routed through a cellular network (LTE, etc.), a personal area network (Bluetooth, Zigbee, etc.), a local area network (WiFi, IR, etc.), or a wide area network such as the Internet.

The user interface hardware and software 315 can present the LIDAR data from the device to the user but can also allow a user to control the LIDAR system 301 with one or more commands. Example commands can include commands that activate or deactivate the LIDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LIDAR system results which can include, e.g., a single frame snapshot image, a constantly updated video image, an accumulated image of data over time into a map, a simplified projected view of a three-dimensional environment around a vehicle, associated data overlaid on the lidar data like color or texture, and/or a display of other light measurements for some or all pixels such as ambient noise intensity, return signal intensity, calibrated target reflectivity, target classification (hard target, diffuse target, retroreflective target), range, signal to noise ratio, target radial velocity, return signal temporal pulse width, signal polarization, noise polarization, and the like. In some embodiments, user interface hardware and software 315 can track distances of objects from the vehicle, and potentially provide alerts to a driver or provide such tracking information for analytics of a driver's performance.

In some embodiments, the LIDAR system can communicate with a vehicle control unit 317 and one or more parameters associated with control of a vehicle can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 317 is communicably coupled to light ranging device 310, alerts can be provided to a driver or a proximity of an object (e.g. a shortest distance between the object and the vehicle exterior) can be tracked, such as for evaluating a driver.

The LIDAR system 301 shown in FIG. 3 includes the light ranging device 310. The light ranging device 310 includes a ranging system controller 350, a light transmission (Tx) module 340 and a light sensing (Rx) module 330. Ranging data can be generated by the light ranging device by transmitting one or more light pulses from the light transmission module 340 to objects in a field of view surrounding the light ranging device. Reflected portions of the transmitted light are then detected by the light sensing module 330 after some delay time. Based on the delay time, the distance to the reflecting surface can be determined. Other ranging methods can be employed as well, e.g. continuous wave, Doppler, and the like.

The Tx module 340 includes an emitter array 342, which can be a one-dimensional or two-dimensional array of emitters, and a Tx optical system 344, which when taken together can form an array of micro-optic emitter channels. Emitter array 342 or the individual emitters are examples of laser sources. The Tx module 340 further includes optional processor 345 and memory 346, although in some embodiments these computing resources can be incorporated into the ranging system controller 350. In some embodiments, a pulse coding technique can be used, e.g., Barker codes and the like. In such cases, memory 346 can store pulse-codes that indicate when light should be transmitted. In one embodiment the pulse-codes are stored as a sequence of integers stored in memory.

The Rx module 330 can include sensor array 336, which can be, e.g., a one-dimensional or two-dimensional array of photosensors. Each photosensor (also just called a sensor) can include a collection of photon detectors, e.g., SPADs or the like, or a sensor can be a single photon detector (e.g., an APD). Like the Tx module 340, Rx module 330 includes an Rx optical system 337. The Rx optical system 337 and sensor array 336 taken together can form an array of micro-optic receiver channels. Each micro-optic receiver channel measures light that corresponds to an image pixel in a distinct field of view of the surrounding volume. Each sensor (e.g., a collection of SPADs) of sensor array 336 can correspond to a particular emitter of emitter array 342, e.g., as a result of a geometrical configuration of light sensing module 330 and light transmission module 340.

In one embodiment, the sensor array 336 of the Rx module 330 can be fabricated as part of a monolithic device on a single substrate (using, e.g., CMOS technology) that includes both an array of photon detectors and an ASIC 331 for signal processing the raw signals from the individual photon detectors (or groups of detectors) in the array. As an example of signal processing, for each photon detector or grouping of photon detectors, memory 334 (e.g., SRAM) of the ASIC 331 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). In addition, the ASIC 331 can accomplish certain signal processing techniques (e.g., by a processor 338), such as matched filtering, to help recover a photon time series that is less susceptible to pulse shape distortion that can occur due to SPAD saturation and quenching. In some embodiments, one or more components of the ranging system controller 350 can also be integrated into the ASIC 331, thereby eliminating the need for a separate ranging controller module.

In some embodiments, one or more of the individual components of the Rx optical system 337 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 330 may be external to the monolithic structure. For example, the aperture layer may be implemented as a separate metal sheet with pinholes.

In some embodiments, the photon time series output from the ASIC is sent to the ranging system controller 350 for further processing, e.g., the data can be encoded by one or more encoders of the ranging system controller 350 and then sent as data packets via the optical downlink. Ranging system controller 350 can be realized in multiple ways including, e.g., by using a programmable logic device such an FPGA, as an ASIC or part of an ASIC, using a processor 358 with memory 354, and some combination of the above. The ranging system controller 350 can cooperate with a stationary base controller or operate independently of the base controller (via pre-programmed instructions) to control the light sensing module 330 by sending commands that include start and stop light detection and adjust photodetector parameters.

Similarly, the ranging system controller 350 can control the light transmission module 340 by sending commands, or relaying commands from the base controller, that include start and stop light emission controls and controls that can adjust other light-emitter parameters such as emitter temperature control (for wavelength tuning), emitter drive power and/or voltage. If the emitter array has multiple independent drive circuits, then there can be multiple on/off signals that can be properly sequenced by the ranging system controller. Likewise, if the emitter array includes multiple temperature control circuits to tune different emitters in the array differently, the transmitter parameters can include multiple temperature control signals. In some embodiments, the ranging system controller 350 has one or more wired interfaces or connectors for exchanging data with the light sensing module 330 and with the light transmission module 340. In other embodiments, the ranging system controller 350 communicates with the light sensing module 330 and light transmission module 340 over a wireless interconnect such as an optical communication link.

The electric motor 360 is an optional component needed when system components, e.g., the Tx module 340 and or Rx module 330, need to rotate. The system controller 350 controls the electric motor 360 and can start rotation, stop rotation and vary the rotation speed.

II. INSTALLATION AND OPERATION OF LIGHT RANGING SYSTEM

One or more light ranging devices, such as the exemplary light ranging device described above with respect to FIGS. 1-3, may form a light ranging system that may perform machine vision functions to assist with the operations of a vehicle. The light ranging system may further comprise other types of components such as interfaces for interacting with a user, computer systems for processing data, other types of sensing devices for collecting data, communication channels for transferring data between system components, and other components that may support the functionality of the light ranging system.

Figure 4A:
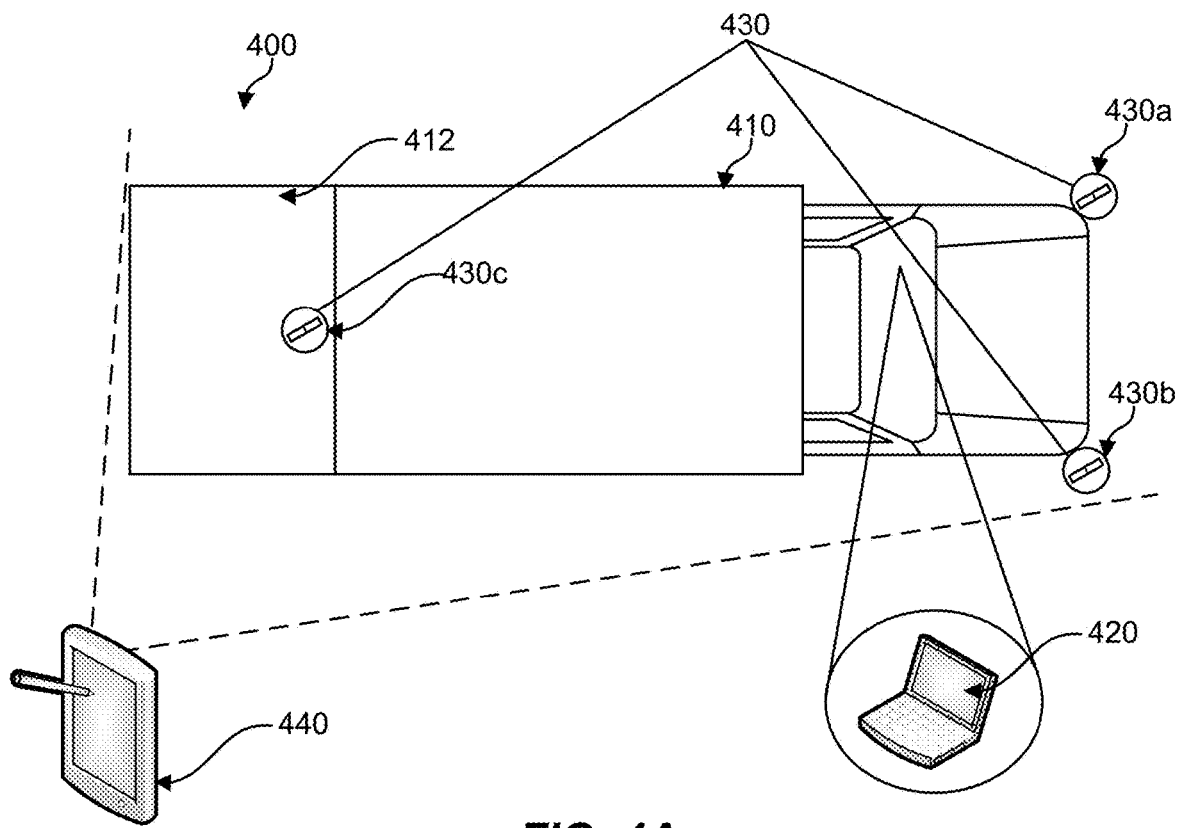
FIGS. 4A and 4B show an exemplary light ranging system having three light ranging devices installed on a vehicle according to some embodiments.
Figure 4B:
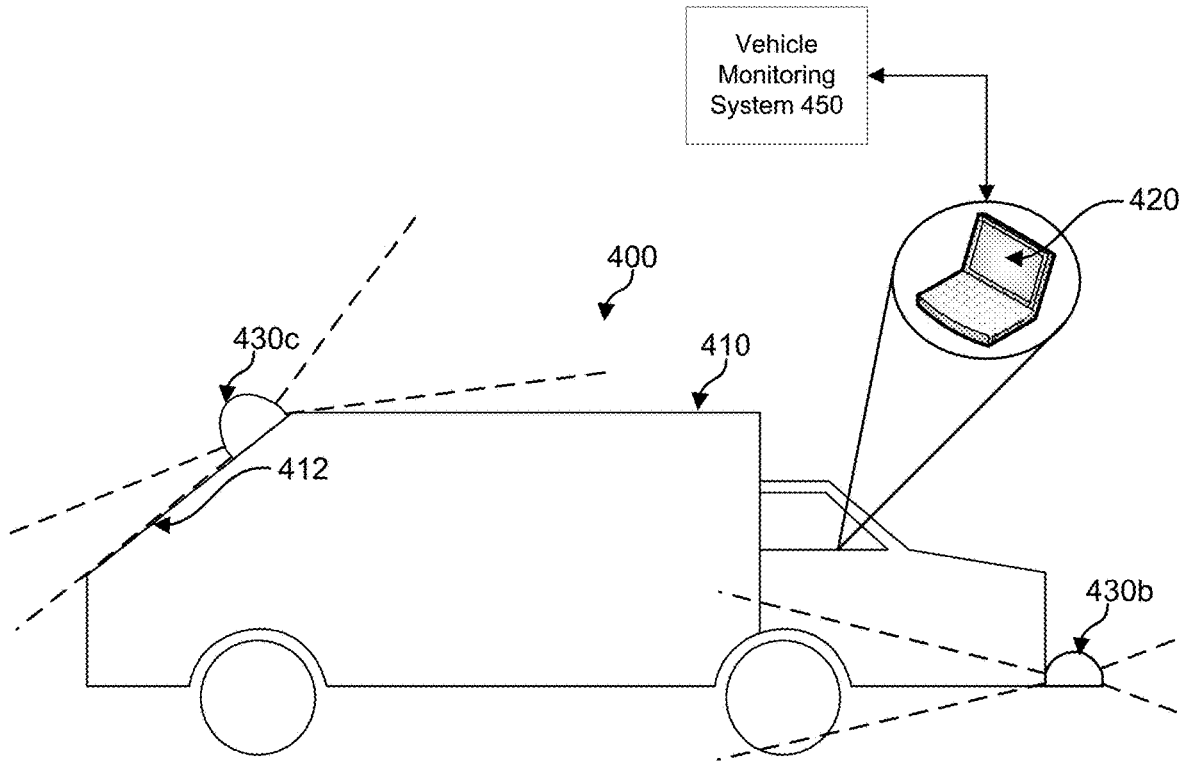

FIG. 4A illustrates an exemplary light ranging system 400 that provides ranging functionality and can assist with the operation of a vehicle 410, such as a waste truck as depicted in FIGS. 4A and 4B, according to embodiments of the present technology. The light ranging system 400 may comprise three light ranging devices 430 that may be installed on the vehicle 410 and a control unit 420 that may process the data collected by the three light ranging devices 430. The location of light ranging devices 430 are for illustrative purposes only and that in some instances the devices can be mounted in a recess or similar cavity of the vehicle so that appear flush or near flush with one or more exterior surfaces of the car, thereby providing an attractive aesthetic appearance.

A. Light Ranging Devices

The three light ranging devices 430a-430c may be lidar devices, such as the device previously described with respect to FIGS. 1 and 2. It is understood that any number of light ranging devices 430 may be installed on the vehicle 410 and that the light ranging devices 430 may be arranged in a variety of configurations on the vehicle 410 in alternative embodiments. For example, a light ranging system 400 may comprise only one light ranging device 430 placed on top of a vehicle 410 as depicted in FIG. 1. In a light ranging system 400 having multiple light ranging devices 430, the light ranging devices 430 may be placed around the vehicle 410 as to maximize the amount of the environment surrounding the vehicle the light ranging devices may collectively sense. In other words, the light ranging devices 430 may be placed around the vehicle 410 as to maximize a coverage area of the light ranging system 400.

In one embodiment, a first light ranging device 430a may be installed at waist level at a front-left corner of the vehicle 410 with respect to a top-down view of the vehicle 410 as shown in FIG. 4A. Similarly, a second light ranging device 430b may be installed at waist level at a front-right corner of the vehicle 410 as shown in FIGS. 4A and 4B. A third light ranging device 430c may be installed on top and towards the back of the vehicle 410 as shown in FIGS. 4A and 4B. Using this arrangement, the light ranging devices 430 are able to provide good coverage over the environment surrounding the vehicle 410 with minimal blind spots.

Generally, the first light ranging device 430a may primarily sense parts of the environment to the front and left sides of the vehicle 410; the second light ranging device 430b may primarily sense parts of the environment to the front and right sides of the vehicle 410; and the third light ranging device 430c may primarily sense parts of the environment above and behind the vehicle 410. However, there may be substantial overlap between the coverage areas of the three light ranging devices 430. Furthermore, there may be regions of the environment that cannot be sensed by any of the light ranging devices 430, such regions under the vehicle 410 or immediately behind the vehicle 410 since the body of the vehicle 410 may block the field of view or line of sight of one or more light ranging devices 430.

FIG. 4B illustrates a side view of the vehicle 410 and the light ranging system 400 from FIG. 4A. As seen in FIG. 4B, the first light ranging device 430a and the second light ranging device 430b are positioned at the front of the truck at about waist level as depicted in FIG. 4B, although a view of the first light ranging device 430a is blocked by the second light ranging device 430b. The light ranging devices 430a-430c may comprise one or more laser emitters and sensors that are able to spin around a vertical axis. In this way, the light ranging devices 430a and 430b, given their positions on the vehicle 410, may be able to scan the sides of the vehicle 410, the front of the vehicle 410, a 270 degree view of the surrounding environment, and anything else that's unobstructed and within the light ranging devices' 430 field of view, as represented by the dashed lines in FIG. 4B.

Similarly, the third light ranging device 430c may be positioned at the top-back portion of the vehicle 410 as shown in FIG. 4B. Given its positioning and orientation at an angle, it is able to see both the back and the top of the vehicle 410 as represented in FIG. 4B by the dashed lines.

Given this set up of the light ranging devices 430, blind spots may include the regions directly behind the base of the vehicle 410 and directly under the vehicle 410 as previously discussed.

B. Control Unit

The light ranging devices 430a-430c may survey (i.e., performing ranging measurements) the environment to collect ranging data and transfer the ranging data to a control unit 420. The ranging data may then be processed and analyzed by the control unit 420. The transfer of the ranging data may be conducted via a communication channel, which may be a wired communication channel comprising a cable that connects the light ranging devices 430 to the control unit 420. Alternatively, the control unit 420 may also be a wireless communication channel such as Bluetooth or Wi-Fi. It is understood that the ranging data may also be processed and analyzed on the light ranging device 430 without having to transfer the ranging data to a separate control unit 420 or device in alternative embodiments. The ranging data or processed information (e.g., information about a breach or other event) can be transmitted wireless to a vehicle monitoring system 450, e.g., using any suitable radio technology. In some implementations, vehicle monitoring system 450 can communicate with various light ranging systems on other vehicles, e.g., as described in section VI.

The control unit 420 may be a waterproof computer that may be installed in the driver's cabin, such as on the dashboard. The control unit 420 may comprise a computer system having a processor and memory for performing various computational functions, a communicator for interfacing and communicating with other devices within or external to the light ranging system 400, and interface elements such as a graphical display, speakers, and a camera for interacting with a driver of the vehicle 410 or any other users of the light ranging system 400.

In one embodiment, the control unit may be a laptop that is attached to the driver's dashboard. Alternatively, the control unit may also be hardware that is built into the dashboard of the car in alternative embodiments. In yet another embodiment, the core processing components of the control unit 420 may be in a separate device from the interface elements. For example, the core processing components may be in a device that is mounted on top of the vehicle leaving only the interface elements on the driver's dashboard. It is understood that other configurations of the control unit 420 and its components may be possible in alternative embodiments.

The camera of the control unit 420 may be used to record a video of the driver while the vehicle is in operation. The camera may further collect visual data that may be used to track the driver's gaze and generate a log of eye-tracking data. The control unit may use the eye-tracking data or measure head orientation to detect when a driver is distracted and provide an alert to the driver in such events. The eye tracking and/or head orientation data may further be used by a manager to supervise drivers' performance.

C. Calibration Device

The light ranging system 400 may further comprise a calibration imaging device 440 that may be used to calibrate the light ranging system 400 by performing a full body (360-degree) scan of the vehicle 410 to generate a digital model of the vehicle 410 exterior. For example, a user may walk around vehicle 410 to obtain a relatively complete scan of the vehicle's exterior. The model may be used to assist with proximity detection as will be described in greater detail with respect to FIG. 7A.

The calibration imaging device 440 may be a light ranging device and may be the same type of light ranging device, such as a lidar device, as the three light ranging devices 430a-430c installed on the vehicle 410. It is understood that the calibration imaging device 440 may also be any device that is capable of performing a scan of the vehicle 410 to produce imaging data (e.g., ranging data) that may be used to construct a digital model of the vehicle exterior.

The calibration imaging device 440 may further comprise a computing system having a processor, a memory, a touch screen for interacting with a driver or user, and a communicator, such as a Bluetooth or Wi-Fi transceiver, for communicating with the control unit 420. For example, the calibration imaging device 440 may be a tablet device having the above mentioned components as well as a built-in lidar sensor. In one embodiment, the processor and memory of the calibration imaging device 440 may process the imaging data collected by the built-in lidar sensor and generate the model of the vehicle 410 exterior. The communicator of the calibration imaging device 440 may then send the model of the vehicle 410 exterior to the control unit 420 for use in proximity detection as will be discussed in greater detail with respect to FIG. 7A.

In an alternative embodiment, the communicator may send the collected imaging data to the control unit 420 wherein the imaging data is used by the control unit 420 to generate the model of the vehicle 410 exterior. In yet another alternative embodiment, the communicator may send the collected imaging data to a remote server wherein the imaging data is used by the server to generate the model of the vehicle 410 exterior wherein the model may then be transmitted back to the control unit 420.

III. CALIBRATING A LIDAR SENSOR SYSTEM

The light ranging system 400 described with respect to FIG. 4 may be calibrated by scanning the vehicle 410 and the light ranging devices 430 installed in the vehicle 410 with a calibration imaging device 440. The scan may produce imaging data that may be processed and used to construct a model of the vehicle 410 exterior. The model may then be subsequently used to detect when something in the environment may be getting too close to the vehicle 410 exterior.

Figure 5:
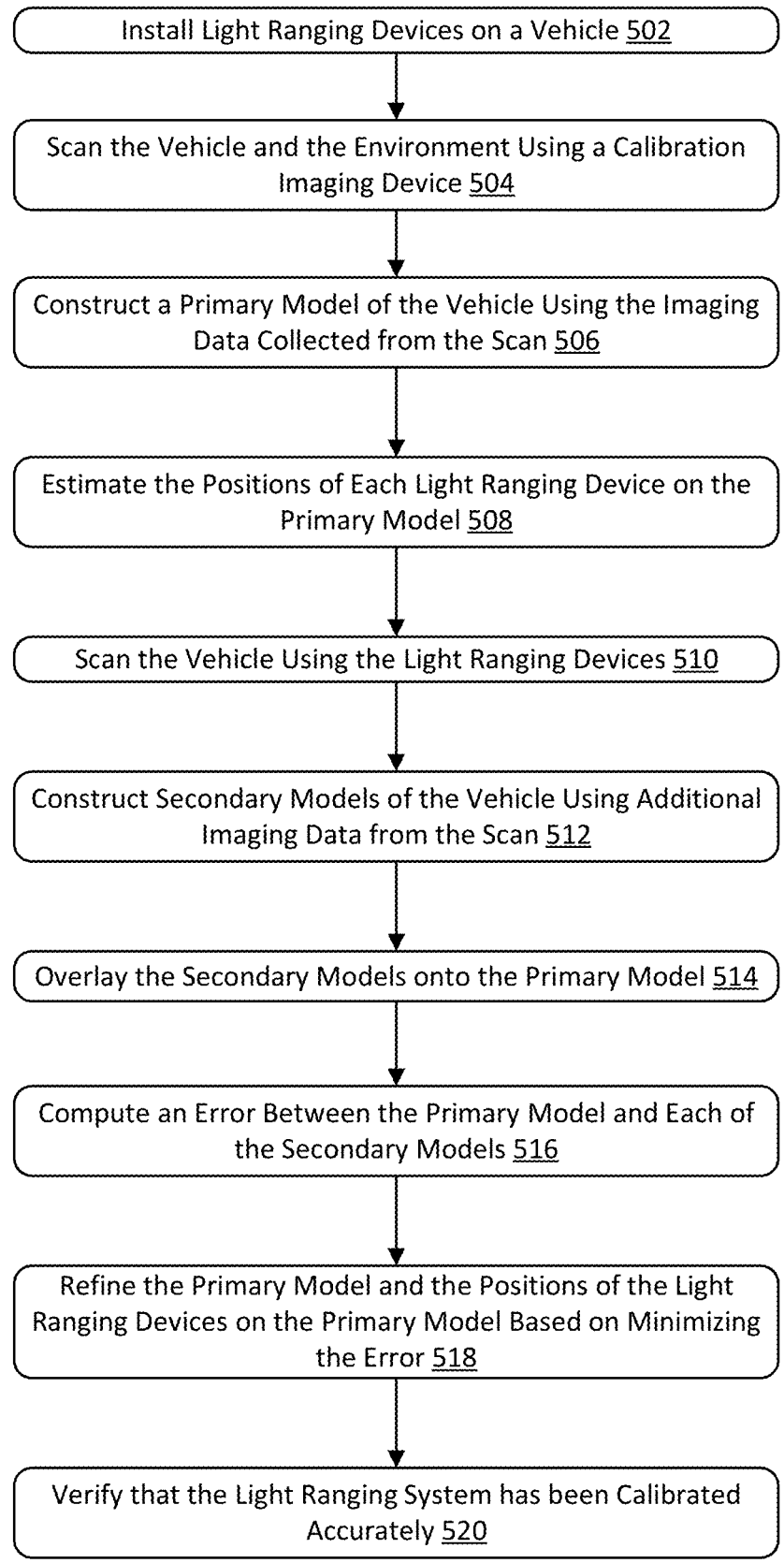
FIG. 5 shows a flowchart for calibrating a light ranging system according to some embodiments.

FIG. 5 illustrates an exemplary method for calibrating a light ranging system of the vehicle according to embodiments of the present technology. Each step of this method may be performed using various components of the light ranging system 400. In addition, the steps may be automatically initiated at components within the light ranging system 400 or initiated by a user. It is further understood that one or more steps for calibrating a light ranging system may not be necessary in alternative embodiments. For example, the scanning of the vehicle 410 at step 504 and/or constructing a model of the vehicle 410 at step 506 may be omitted. Instead, a predefined model of the vehicle may be loaded from memory. The loaded model may accurately represent the positioning of the light ranging devices 430 if the light ranging devices 430 are placed precisely at designated positions around the vehicle 410.

A. Install Sensors

At step 502, a user, such as a driver of the vehicle 410, may install one or more light ranging devices (e.g., 430) on a vehicle (e.g., 410). Each light ranging device can include a laser source (e.g., an emitter or an array of emitters) and a photosensor, which may be part of a sensor array. Accordingly, a user may install three light ranging devices 430a-430c into their respective positions as depicted in FIGS. 4A and 4B. The light ranging devices 430 may be attached onto the vehicle 410 using tape, screws, or any other method of attachment. The vehicle 410 may also have docking stations, mounted onto the vehicle at predetermined physical positions, for receiving the light ranging devices 430 such that the light ranging devices 430 may easily clip or slide into their respective docking stations. This may help to ensure that the light ranging devices 430 are placed into specific positions that may maximize sensor coverage.

B. Scan Vehicle

At step 504, a driver or any other personnel may use the calibration imaging device 440 to scan the vehicle 410, according to embodiments of the present technology. In some embodiments, the calibration imaging device 440 and the light ranging devices 430 mounted on the vehicle 410 may also collect information about the environment to assist with the calibration process using environmental cues and reference points. The scanning process may be three-dimensional in nature and the data collected through the scanning processing may be used to construct a three-dimensional model of the vehicle. The scanning process may also generate data that is used to construct a two-dimensional model of the vehicle in alternative embodiments.

A user may use the calibration imaging device 440 to scan the vehicle 410, e.g., through the use of a lidar device built into the calibration imaging device 440 as previously discussed. The user may further orient the calibration imaging device 440 at the vehicle to perform a plurality of measurements of the vehicle 410 exterior while walking all the way around the vehicle so that a full body (360-degree) scan of the vehicle may be performed. The user may further raise the calibration imaging device 440 to a level above or lower the calibration imaging device 440 to a level below the vehicle 410 to scan the top and bottom exterior surfaces of the vehicle. By scanning the vehicle 410 using the calibration imaging device 440, the calibration imaging device 440 may generate imaging data that may be used to construct a model of the vehicle 410. The calibration imaging device 440 may be installed in or on a cart that has wheels, thereby allowing easy movement around the vehicle.

In one embodiment, as the user moves around the vehicle with the calibration imaging device 440, the calibration imaging device 440 may determine its own trajectory, and/or position while simultaneously collecting data and building a three-dimensional model of the environment comprising the vehicle 410 exterior. The vehicle model can be obtained by discarding points outside of a loop formed from the calibration device's trajectory, as well as the ground plane.

Accordingly, the calibration imaging device 440 may collect a sequence of imaging data that is collected over time and along a trajectory in three-dimensional space. The calibration imaging device 440 may further receive a stream of data from the light ranging devices 430 mounted on the vehicle 410 in a similar format of a continuous sequence of data collected over time and along a trajectory in three-dimensional space. The calibration imaging device 440 may then determine a best fit between the of data received from the light ranging devices 430 and the calibration imaging device's 440 own data sequence that it has collected through the scanning process. The best fit may be determined using an iterative closest point algorithm or a variation of the algorithm as known in the art.

By determining the best fit across data from the calibration imaging device 440 and the light ranging devices 430, the calibration imaging device 440 may combine all of that data into one spatial coordinate system and construct a model within this coordinate system that would comprise representations of the vehicle envelope as well as any environmental structures that the calibration imaging device 440 and the light ranging devices 430 may have scanned and collected data about as well. Incorporating data about additional structures in the environment may help improve the calibration process by using these additional structures as points of reference in the environment to combine multiple sensory data streams. This may result in a calibrated model of the vehicle exterior that is a more accurate representation of the vehicle exterior. These processes of converting a time series of imaging data into a three-dimensional map of points may be performed using a simultaneous localization and mapping (SLAM) algorithm as known in the art. In alternative embodiments, these processes may also be performed remotely on a server to reduce computation time or improve accuracy.

Upon scanning the vehicle 410 and the surrounding environment and constructing a model to represent the vehicle 410 and the surrounding environment, the model may be segmented into various components. This may be done using the calibration imaging device 440, the remote server, a combination of both, or either device with aid from an operator. In one embodiment, where the model comprises the vehicle 410 exterior and a ground plane that the vehicle 410 is on top of, this segmentation process may be performed automatically by incorporating knowledge of gravity vectors into the model to identify the ground plane.

Based on the identified ground plane, the three-dimensional points in the model that exist above the ground plane may be segmented as being the vehicle envelope. Additional accuracy may be achieved by providing the system with a guess about the approximate size, shape, and location of the vehicle envelope in the accumulated map either through operator input or through a preloaded three-dimensional model of the vehicle envelope acquired from the vehicle manufacturer, from a scan of a previous, but similar vehicle, or from some other source. As previously mentioned, the model may also comprise environmental structures surrounding the vehicle 410. Once the ground plane and the vehicle 410 are segmented, what remains in the model may be segmented as being part of the environment, and may be used later in the calibration process. Overall, this process may allow the vehicle exterior segment to be isolated from other elements that may be incorporated into the model as part of the scanning process.

In another embodiment, the calibration imaging device 440 may generate a set of imaging data each time it performs a measurement of the vehicle 410 exterior at a particular location. Accordingly, each set of imaging data may comprise a location of the calibration imaging device 440, a plurality of points on surfaces scanned by the calibration imaging device 440, a distance measure between the calibration imaging device 440 and each point, and an angular direction for each point relative to the calibration imaging device 440.

In one embodiment, when the calibration imaging device 440 begins the scanning process, it may set its current location as an origin position and initialize an x, y, and z axis to function as references for subsequent position measurements. Accordingly, the current location of the calibration imaging device 440, being at the origin position, may be presented as having x, y, and z coordinates of 0,0,0, corresponding to the calibration imaging device's 440 position in three-dimensional space relative to the origin position. The calibration imaging device 440 may then begin to scan the vehicle 410 by performing a series of measurements of the vehicle 410 surface as the calibration imaging device 440 is moved around the vehicle 410 so that measurements at different angles may be performed. As the calibration imaging device 440 is moved, the calibration imaging device 440 may track its change in position relative to its starting position (origin position). Thus, for each additional set of measurements at a new position, the calibration imaging device 440 may compute a new set of x, y, and z coordinates for the new position to correspond to a set of imaging data produced by the measurements of the vehicle 410 exterior at the new position. It is understood that the calibration imaging device 440 may also measure its location independently from an origin position, such as by using a GPS device or inertial measurement unit (IMU), in alternative embodiments.

During each measurement of the vehicle exterior, the calibration imaging device 440 may further measure a distance vector between points on a surface of the vehicle 410 exterior and the calibration imaging device 440. A distance vector may be measured for each point that is within the calibration imaging device's field of view and therefore detectable by the calibration imaging device 440. The distance vector may include both how far the point is from the calibration imaging device 440 and also the angular direction of that point relative to the calibration imaging device 440.

Accordingly, a measurement of the vehicle 410 exterior may generate imaging data comprising a model position (ideally corresponding to the physical position) of the calibration imaging device 440 as well as one or more distance vectors corresponding to each point on vehicle 410 exterior that has been detected by the calibration imaging device 440. This imaging data may be stored in an array or any other suitable data structure. A complete scan of the vehicle 410 involving multiple measurements of the vehicle 410 exterior from different sensor positions may thus generate multiple sets of imaging data corresponding to different measurements, wherein each set of imaging data comprises a position of the calibration imaging device 440 and multiple distance vectors.

C. Construct Vehicle Model

At step 506, the previously generated imaging data may be processed and used to construct a three-dimensional model of the vehicle, herein referred to as the primary model, according to an embodiment. Once the vehicle and the surrounding area has been scanned and accumulated into a map, the calibration imaging device 440, the remote server, a combination of both, or either device with aid from an operator may segment the map into the vehicle envelop, or primary model, and the surrounding environment. This step may be performed automatically by using knowledge of the earth's gravity vector in the map coordinate frame to identify the ground plane, and based on the ground plane, extract all of the three-dimensional points from the imagery that exist above the ground plane in the z direction, e.g., lying within a loop trajectory taken by the calibration imaging device 440. These points in aggregate are assumed to be the vehicle envelope. Additional accuracy may be achieved by providing the system with a guess about the approximate size, shape, and location of the vehicle envelope in the accumulated map either through operator input or through a preloaded three-dimensional model of the vehicle, or from some other source.

The primary model may have a coordinate system and an origin or origin position having x, y, and z coordinates of 0, 0, 0. It is understood that the primary model may be combined with other models, such as partial, secondary, and additional models of the vehicle or environment, such that all the models are merged into the coordinate system of the primary model so that all the models effectively share the same origin position. Thus, each of the separate models can have their own origin within that particular model, but a translation vector between the coordinate systems effectively makes them have a same origin.

It is further understood that other approaches to modelling the vehicle 410 may also be possible in alternative embodiments. For example, a two-dimensional model of a top-down view of the vehicle 410 may be constructed to represent the outermost lateral boundaries of the vehicle 410. Accordingly, this two-dimensional model may be used to detect a proximity breach such as whenever an environmental object gets too close to the outer boundaries of the model, as will be discussed in further detail with respect to FIGS. 6 and 7. In addition, the two-dimensional model may further comprise a height measurement of the vehicle 410 to assist with detecting a proximity breach such as whenever an environmental object above the vehicle 410 gets too low as to potentially collide with the vehicle 410.

In one embodiment, step 506 may be performed by a processor in the calibration imaging device 440 and thereafter transferred to the control unit 420 via a communication channel. The communication channel may wireless, such as Bluetooth or Wi-Fi. Alternatively, in another embodiment, the communication channel may be through a wired connection. In another embodiment, the imaging data may also be transferred from the calibration imaging device via a wireless or wired communication channel and thereafter processed by the control unit 420 to construct the primary model.

In one embodiment, the imaging data may be sent from the calibration imaging device 440 to the control unit 420, which then uses the imaging data to construct the primary model of the vehicle 410. For example, the control unit 420 may calculate a position for each point on the vehicle 410 exterior that was previously measured by the calibration imaging device 440. The position for each point may be calculated based on the position of the calibration imaging device 440, and the distance vector measured for that point. This calculation may be performed using vector operations. For example, a first distance vector may be between an origin position and a position of the calibration imaging device 440 where a particular measurement of the vehicle 410 exterior was made. The first distance vector may then be added to a previously measured second distance vector between the measured point and the calibration imaging device 440 to compute a third distance vector between the point and the origin position, thereby generating a set of positions.

Accordingly, the control unit 420 is able to generate a data set comprising the coordinates of each point captured in the set of imaging data. Based on this data set of coordinates, the control unit 420 may then construct a three-dimensional model to represent the outer surface of the vehicle 410 by connecting the points together. Each scan and each corresponding set of imaging data can capture a large number of points in order to ensure that the resolution of the primary model is sufficiently high as to be a precise representation of the vehicle 410 exterior.

In one embodiment, the primary model of the vehicle 410 may be constructed by the calibration imaging device 440 in real time while the user is using the calibration imaging device 440 to scan the vehicle 410. The primary model may further be displayed on a screen of the calibration imaging device 440 in real time to provide feedback to the user during the scanning process. Based on the display of the constructed primary model, the user may be able to see which parts of the vehicle 410 he has already scanned and which parts has yet to be scanned. In addition, the user may also be able to see whether a portion of the scan has a low resolution or was scanned improperly and may then respond by scanning that corresponding portion of the vehicle 410 again.

In the course of determining the primary model of the vehicle, the calibration imaging device 440 may also capture imaging data of the environment surrounding the vehicle, which is also accumulated in the map. Once the primary model is extracted/segmented, the remaining data may be considered as being the environment and may be saved on the calibration imaging device 440, on the control unit 420, or on an external server to be used to determine sensor positions.

D. Estimate Sensor Positions

At step 508, an estimate of the model positions of each light ranging device 430 may be determined. In one embodiment, default positions may be used as the estimated positions or an initial guess for where the light ranging devices 430 may be. The initial guess may then be subsequently refined to determine the actual positions (i.e., physical positions) of the light ranging devices 430. In one embodiment, the estimated positions may be determined based on a user input. For example, the calibration imaging device 440 may comprise a touchscreen that displays a constructed model of the vehicle 410 to the user, who may then indicate on the touchscreen the approximate positions for where the light ranging devices 430 are positioned on the vehicle 410. The estimate can ensure that the model positions are corresponding to the physical positions of the light ranging devices.

In another embodiment, the estimated positions may be automatically determined by a processor, either on the calibration imaging device 440 or the control unit 420 or an external server. For example, a control unit 420 may know the housing dimensions of the light ranging device 430 and determine where the housing dimensions of the light ranging device 430 matches (aligns) with what appears to be a light ranging device 430 on the primary model. The one or more housing dimensions can include any combination of length, width, and height, as well as shape. Upon finding one or more successful matches on the primary model with the preconfigured model of the light ranging device 430, the positions for where the match took place may be set as the estimated positions for the one or more light ranging devices 430.

Accordingly, such extrinsic calibration of each light ranging device can be obtained by aligning its output with the primary model and/or with the environment. Since this alignment process can use an initial guess in order to converge, embodiments can use a method similar to random sample consensus. For example, random orientations and positions (up to 100,000 times) can be selected until a large majority of points are well-aligned. Points similar to those that are well-aligned (e.g., minor offsets with the random number) can be selected so as to refine the search near the well-aligned points, thereby focusing the search.

E. Refine Calibration

At step 510, additional scans of the vehicle 410 may be performed using the installed light ranging devices 430. In one embodiment, these scans may produce imaging data in a similar format as discussed above with respect to scans using the calibration imaging device 440.

At step 512, additional secondary models of the vehicle 410 may be constructed based on the imaging data produced from these scans. In one embodiment, these secondary models may be partial models of the vehicle 410 given that the light ranging devices 430 are stationary and mounted on the vehicle 410 such that they may only have a partial view of the vehicle 410. In one embodiment, these secondary models may be combined into a single composite model by stitching these secondary models together. For example, this may be done by merging the secondary models at the regions in which the models and the fields of view of the corresponding light ranging devices overlap. In another embodiment, these secondary models may also be handled separately.

At step 514, the secondary models may be put into the same coordinate system as the primary model and overlaid onto the primary model. In one embodiment, each secondary model comprises a position of the light ranging device that generated the secondary model, i.e. a model position of the light ranging device. Accordingly, each secondary model may be overlaid onto the primary model such that the model position of the corresponding light ranging device on the secondary model aligns with the estimated position of that same light ranging device on the primary model.

At step 516, an error may be computed to measure how much the secondary model deviates from the primary model. In one embodiment, this may be computed by summing a shortest distance from each point on the secondary model to a corresponding point on the primary model across all points of the secondary model. The secondary model may then be spatially rotated and translated around the model position of the calibration imaging device 440 on the secondary model so that the error between the secondary model and the primary model may be minimized. This may involve multiple iterations of rotating and translating the secondary model and computing the error to determine whether the error is decreased as a resolution of the rotation.

At step 518, the calculated error may be used to perform a series of steps that further refines the positions of the light ranging devices 430 on the primary model. This may involve iteratively moving the estimated position of a light ranging device 430, overlaying the secondary model over the primary model once again at the new estimated position, and computing a new error value between the secondary model and primary model. The new error value corresponding to the new estimated position of the secondary model may be compared to a previous error value corresponding to a previous estimated position to determine whether there has been an increase or decrease in the error. The estimated position of the light ranging device 430 may then be once again moved in the same direction if there was a decrease in the error, or in a different direction if there has been an increase in the error or in a direction determined by evaluating the local gradient of the underlying optimization problem. These steps may be repeated until the error has been minimized, at which point the last estimated location for the light ranging device 430 may be set as the finalized position for the light ranging device 430.

In this way, the space of possible estimated positions may be explored to determine the position that minimizes the error. Solving for the absolute minimum of the solution space may use various optimization techniques, such as steepest descent, conjugate gradient, or quasi-Newton methods.

Once the positions of the light ranging devices 430 have been finalized, the secondary models may then be used to further refine the rest of the primary model. In one embodiment, the secondary models may be used to correct deficiencies in the primary model. For example, if there is consensus between two light ranging devices 430 on the correct contours of the exterior of the vehicle 410 at a region in which the fields of view of the two light ranging devices 430 overlap, and the deviations between the secondary models and the primary model is relatively small (e.g., below a certain predetermined threshold), then the primary model may be updated to match the secondary models in those regions in which the primary model deviates from the secondary models. In another embodiment, the secondary models may also be used to provide an alert to the user if a scanning error is suspected in a region of the primary model. For example, if there is a large deviation from a secondary model relative to a primary model, then an alert may be issued to the user to inspect that region to ensure that the calibration measurements were done properly.

In one embodiment, the positions of the light ranging devices 430 and the primary model of the vehicle 410 may be refined at the calibration imaging device 440 and thereafter sent to the control unit 420. In an alternative embodiment, the unrefined primary model and positions of the light ranging devices 430 may be sent to the control unit 420 where the refining procedures take place. In a further embodiment, the unrefined primary model and secondary models may be sent to an external server where the refining procedures take place and then transmitted back to the control unit 420 and calibration imaging device 440 for review and operation. It is understood that the processes involved in calibrating the light ranging system 400 may be allocated in other ways between calibration imaging device 440, control unit 420, and any other components of the light ranging system 400 in alternative embodiments.

At step 520, the light ranging system 400 may further verify that the calibration of the light ranging system 400 is accurate. In one embodiment, this may be performed manually, by having the user walk up to the vehicle 410 and use their hand to touch the vehicle's 410 exterior to ensure that the light ranging system 400 is able to detect that the distance between the hand or wand and the vehicle 410 exterior has passed a predetermined threshold, as will be described in further detail with respect to FIGS. 6 and 7. It is understood that other automated methods may also be implemented for verifying a calibration of the light ranging system 400 in alternative embodiments.

IV. TRACKING ENVIRONMENTAL OBJECTS

Once the light ranging system, including the primary model of the vehicle and the positions of the light ranging devices on the primary model, has been calibrated, the light ranging system may be use used to assist with operating the vehicle. For example, the light ranging system may detect when objects or surfaces in the environment are getting too close to the vehicle or when the objects are moving towards the vehicle at a high velocity. The light ranging system may then further help a driver of the vehicle avoid potential collisions. Similarly, the light ranging system may also detect when the vehicle is turning too quickly and thereby assist the driver with controlling the vehicle to prevent the vehicle from rolling over. How a light ranging system uses the primary model of the vehicle for tracking environmental objects and surfaces and assisting with vehicle operations is discussed herein with respect to FIGS. 6 and 7.

A. Illustrative Scenario

Figure 6:
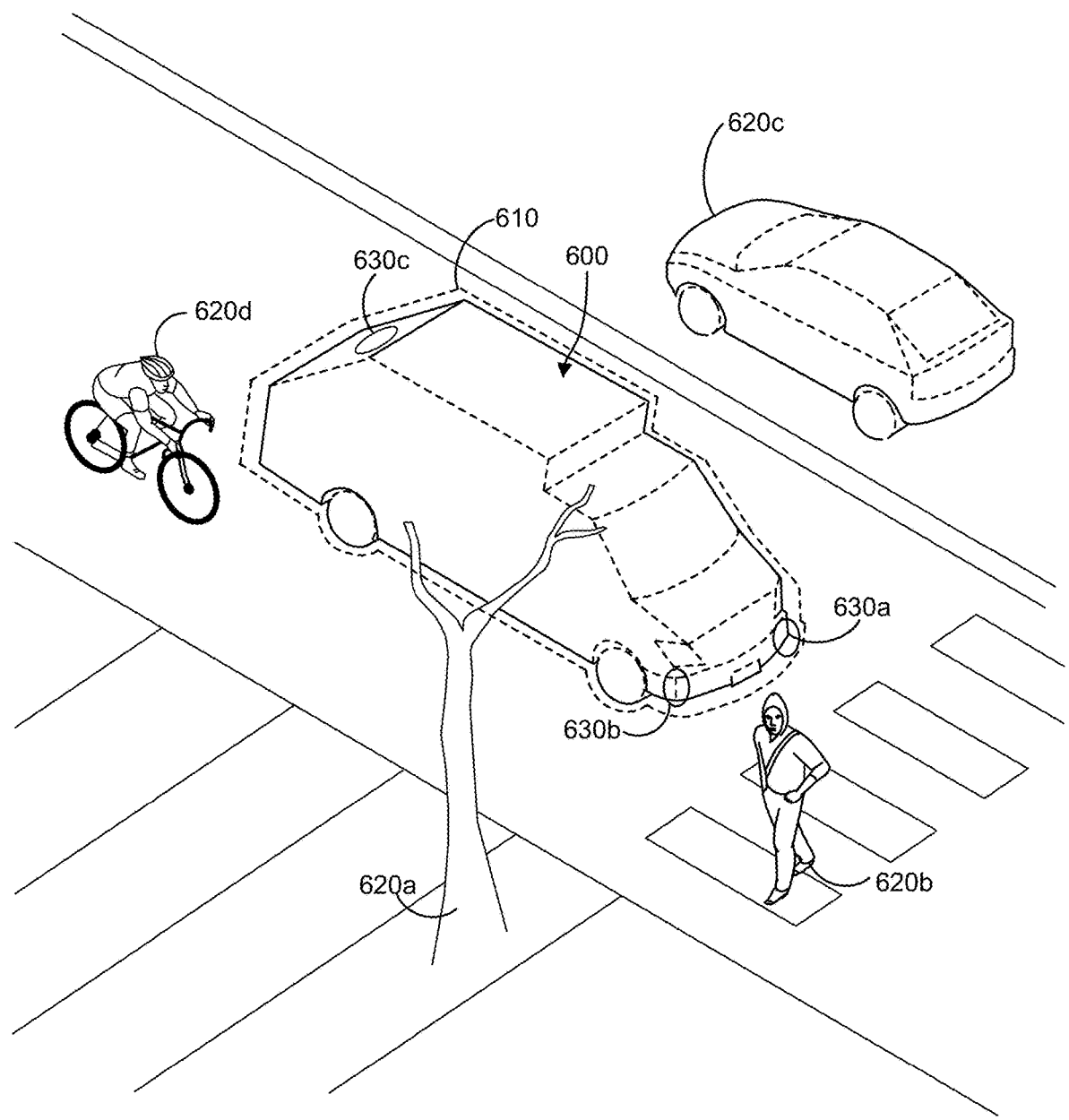
FIG. 6 shows how a light ranging system on a vehicle may survey an environment around the vehicle according to some embodiments.

FIG. 6 illustrates an exemplary scenario where a driver may be driving a vehicle 600 installed with a light ranging system (e.g., light ranging system 400 of FIG. 4). The vehicle 600 may be in an environment, such as a section of road near a pedestrian crosswalk. The environment may further include one or more environmental objects 620a-620d, such as a tree, a pedestrian, a car, or a cyclist. These objects may further comprise environmental surfaces that may potentially come into contact with the vehicle 600 if they get too close to the vehicle 600.

As shown in FIG. 6, the vehicle 600 may be installed with three light ranging devices 630a-630c. These light ranging devices may survey the environment around the vehicle 600 and generate ranging data. The ranging data may be sent to a control unit (e.g., installed on the dashboard of the vehicle 600) where the ranging data may be processed. The control unit (e.g., control unit 420 in FIG. 4) of the light ranging system may maintain a primary model of the vehicle 600 generated during the calibration process discussed with respect to FIG. 5, wherein the primary model includes the positions of the three light ranging devices.

The control unit may define a vehicle coordinate frame, having an origin at the position of the first light ranging device 630a with origin at x, y, and z coordinates of 0,0,0 and orientation alpha, beta, gamma (0,0,0) defined along the primary axes of the first light ranging device 630a such that all other positions and measurements (e.g., measurements made by the second light ranging device 630b and the third light ranging device 630c) are defined relative to the vehicle coordinate frame. Additionally, the primary model of the vehicle envelope would be translated into the vehicle coordinate frame. The ranging data collected by the light ranging devices may be used to compute proximity values for points on environmental objects and surfaces relative to the primary model of the vehicle 600. A proximity value, may refer to the extent in which environmental objects or surfaces are physically and geometrically approaching the vehicle as to place the vehicle at risk of collision. In alternative embodiments, a more generalized risk value may also be determined to measure the likelihood of other dangers relating to the operation of the vehicle, such as whether a vehicle may be turning too quickly such that it has a risk of tipping over. A risk value may be determined based on additional measurements and derived measurements about a vehicle's trajectory, such as a vehicle's rotational velocity that may be determined based on changes to reference points in the environment within a coordinate frame of a model of the vehicle and the environment, or determined by simultaneous localization and mapping techniques that may be used for estimating vehicle odometry.

The proximity of environmental objects and surfaces may be compared with a threshold proximity value to determine when there may be a risk that environment objects and surfaces may collide with the vehicle 600. In one embodiment, proximity of environmental objects and surfaces may be defined based on the distances of the environmental objects and surfaces such that the system may detect when environmental objects and surfaces are getting too close to the vehicle 600 when the proximity of the environmental objects and surfaces satisfy the proximity threshold. Accordingly, the threshold proximity value may be represented as a threshold distance and applied to the primary model so that the control unit may construct a proximity shell 610 around the primary model to represent a region around the vehicle exterior where the proximity threshold may be breached.

It is understood that proximity may also be defined based on other factors, such as a function of the distance and relative velocity between an environmental object and the exterior of the vehicle. For example, an environmental object may be located at a substantial distance away from the vehicle 600, such as being 10 meters away from the vehicle, but have a relative velocity that is moving quickly towards the vehicle, such as a relative velocity towards the vehicle 600 of 20 meters per second. The velocity can be determined using changes over time in the distance vector from a light ranging device to a particular environmental object (surface). A function may then be applied to the distance and relative velocity of the object to determine an overall proximity value corresponding to the environmental object wherein the overall proximity value may exceed a proximity threshold. For instance, a time-to-contact value can be calculated for all points in the environment using the estimated velocity and position of every point with respect to the vehicle.

B. Tracking Vehicle Trajectory (Odometry)

As mentioned above, a risk value may be determined based on additional measurements and derived measurements about a vehicle's trajectory. Once the light ranging system (potentially including the primary model of the vehicle and the model positions of the light ranging devices) has been calibrated, the light ranging system may be use used to assist with operating the vehicle. In one example, the light ranging system can detect, using image data, where the vehicle is at a given location relative to the ground or where the vehicle is at a given location relative to stationary objects in its environment, e.g., obtaining a trajectory of the vehicle.

The odometry techniques, also known as "open-loop SLAM", can iteratively perturb or update the trajectory using sensor data (e.g., ranging data) such that sensor data is locally consistent, so as to recover a best estimate of vehicle trajectory given the sensor data. For example, a set of points previously sampled by light ranging may be considered locally consistent if, after the points have been transformed according to the trajectory, the distance between every point to one or more spatially proximal other points (sampled at a later time) is minimized for a majority of said subset. The points within the majority (inliers) may be assumed to correspond to static objects in the environment, and the remainder points may be assumed to correspond to moving objects or outliers caused by sensor noise, atmospheric effects, and so on. The inlier set (i.e., data points for static objects) may be stored for use in determining one or more variables (e.g., speed, velocity, acceleration, etc.) and one or more risk values.

Motion distortion can arise when a lidar system and other sensors continuously output data (e.g. by scanning at a high rate) or by outputting data at different rates relative to one another, so that within the duration of one frame (e.g. 0.1 seconds), various data sampled at different times within the frame may correspond to different vehicle positions when the vehicle is moving. Some embodiments can partially compensate for motion distortion using an external pose source, such as an inertial navigation system or visual odometry, and then treat the point clouds rigidly. In such methods, inevitable drift in motion estimates can cause each point cloud to remain slightly warped, hampering registration accuracy. To achieve the best accuracy, the vehicle's trajectory can be solved directly using the lidar point cloud.

Every point in a current frame can be associated with the nearest point from the previous frame. Sparsity and sampling patterns by a lidar can bias the result, and the large number of points produced by a typical lidar makes real time performance challenging. Feature extraction can be used to decimate points for computational efficiency and also to avoid the influence of sampling bias.

The literature on rigid point set registration algorithms is largely covered by reviews by Tam et al and Pomerleau et al. The most well-known of these is iterative closest point (ICP), and, more recently, generalized ICP and normal distributions transform. Variants of rigid ICP can have point clouds preprocessed assuming constant motion from the previous frame, and then registered. Other implementations can preprocess point clouds with the motion estimate from an unscented Kalman filter, then rigidly registers them with correlative scan matching.

At the cost of additional complexity, solving for the vehicle's continuous motion directly using nonlinear methods tends to be more accurate than the two-step approach of de-warping and rigid registration. Among continuous time methods, two primary techniques are the non-parametric approach of Gaussian processes and the parametric approach of interpolating between a discrete set of control poses with splines or piecewise linear functions. In some embodiments, a trajectory can be represented as a collection of discrete samples at an arbitrary rate, which may not be at the same rate as the frame rate of sensors.

Parametric approaches can use B-splines or piecewise linear functions to interpolate between a discrete set of control poses, or spline knots. Bibby and Reid proposed using cubic B-splines to represent 2D rigid motion. Alismail et al proposed continuous ICP, which models 3D rigid motions with a cubic B-spline in the six-dimensional space consisting of a Gibbs rotation vector and xyz translation. Zhang et al proposed a method which uses a piecewise linear interpolation in the space of Euler angles and xyz translation (the paper claims to use the angle-axis representation but the source code uses Euler angles) to coarsely estimate the vehicle's motion via dead reckoning in the frontend, and then uses rigid ICP-like registration to correct for drift. Zlot and Bosse use quaternions and xyz for their rigid body parametrization, and their algorithm is also divided into a frontend and a backend, with piecewise linear functions for the frontend sliding window filter and cubic B-splines for a batch optimization in the backend. Dube et al modify the front end of the algorithm of Zlot and Bosse to use non-uniform knot spacing between piecewise linear interpolation. This results in a more computationally efficient open loop front end.

Spline representations of 3D rigid motions are challenging because it is difficult to rigidly transform smooth splines, and rigid motion parametrizations become ambiguous or singular for large rotations. Anderson and Barfoot sidestep the issue by modelling the velocity instead of the pose with cubic B-splines in $\mathfrak{se}(3)$ space, the Lie algebra associated with rigid motions. A drawback is that numerical integration is needed to recover the pose from the velocity spline. Small errors in any spline knot may lead to a large difference in pose in the future.

TABLE 1

Summary of approaches to lidar pose estimation. Some methods use different trajectory representations for the frontend and backend, here separated by a semicolon. For interpolation-based methods, unless otherwise specified, control pose spacing is uniform in time.

| Method | Pose | Trajectory |
|---|---|---|
| Moosmann | Axis-angle + xyz | Rigid |
| Zhang | Euler angles + xyz | Linear; Rigid |
| Alismail | Gibbs vector + xyz | Cubic B-splines |
| Zlot | Quaternions + xyz | Linear; Cubic B-splines |
| Anderson | $\mathfrak{se}(3)$ (velocity) | Cubic B-splines |
| Kohler | Axis-angle + xyz | Rigid with UKF; Rigid |
| Dubé | Axis-angle + xyz | Linear (non-uniform) |

By using trajectory parametrization based on composing a plurality of B-splines in 6-dimensional se e(3) space, the vehicle's motion can be determined. In one example, the light ranging system can detect vehicle position in a busy urban environment.

The odometry techniques can use light image data from a light imaging system and estimate the change in the data over time (e.g., the change in distance vectors over time). A light ranging system can detect a position of a vehicle equipped with the light ranging system in real time using a spinning lidar sensor by directly estimating the vehicle's continuous trajectory. In one example, the odometry data collected by the light ranging system can be supplemented with GPS data to more accurately determine a position of the car in real time.

In one example, the light ranging system can detect and approximate a surface environment around the vehicle. The light ranging system can detect which types of surfaces detected are static surfaces and which types of surfaces detected are dynamic or moving surfaces. In one example, the light ranging system can color code objects that the light ranging system detects are moving objects, stationary objects, the ground, and humans into different colors.

In one example, the light ranging data used to estimate the vehicle's continuous trajectory can be used as a factor in determining a breach of risk based on a certain threshold value of risk. In one example, risk values determining how much risk is involved in when a vehicle is operated in a certain way can be more accurate.

For example, a light imaging system can detect a stop sign or a traffic light on the road when the vehicle is operational. When the light imaging system also determines from map data that there is indeed a stop sign at a given location, the light imaging system can more accurately determine if a certain risk or amount of risk was taken when operating the vehicle at a location generally around the stop sign. The same SLAM technique used in section III. B can be the same as used for odometry.

C. Survey Environment

Figure 7A:
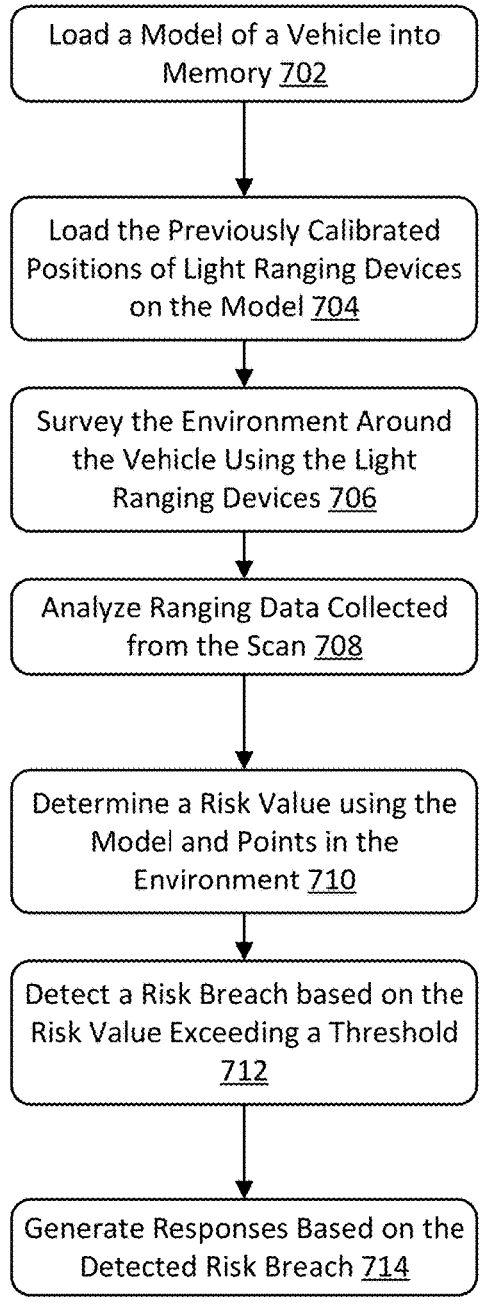
FIGS. 7A and 7B show flowcharts illustrating methods of using a light ranging system of a vehicle to detect a risk breach involving the vehicle according to some embodiments.

FIG. 7A shows a flowchart illustrating a method using a light ranging system of a vehicle to detect a risk breach involving the vehicle according to embodiments of the present technology. As examples, the risk breach can involve a proximity breach of an object with the vehicle and/or a breach involving the risk of operation of the vehicle as measured by the light ranging system, e.g., using a trajectory of the vehicle, as may be determined using odometry techniques.

At step 702, the control unit (e.g., 420 in FIG. 4) of the vehicle may load the previously constructed and refined digital model (e.g., the primary model) of the vehicle into memory. It is understood that step 702 may not need to be performed in alternative embodiments. For example, the primary model may already be in memory. Alternatively, the control unit may also access a primary model of the vehicle by retrieving it from remotely located device or system, such as a cloud storage, via a wired or a wireless communication channel.

At step 704, the control unit loads the previously calibrated positions of the three light ranging devices (e.g., 430 in FIG. 4) on the primary model into memory. Similar to step 702, step 704 may not need to performed in alternative embodiments, such as where the control unit may access the primary model of the vehicle by retrieving it from a remotely located storage, such as a cloud storage, using a wireless communication channel.

At step 706, the light ranging devices may continuously survey the environment surrounding the vehicle to generate ranging data that may be sent to the control unit for processing. Many measurements of the environment may be performed every second so that a time sequence of ranging data may be generated to have sufficient temporal resolution to capture incremental changes in position for fast moving objects and surfaces in the environment. In one embodiment, for example, a high number of scans may be performed every second so that multiple measurements of an environmental object may be made while the object travels. Multiple measurements may be made over a short period of time so as to detect a breach within a threshold proximity value, even when the vehicle is traveling at a speed of over 160 miles per hour.

The ranging data collected by each of the light ranging devices may comprise the position of the light ranging device generating the ranging data. In one embodiment, the position of the light ranging device may be set as an origin position having x, y, and z coordinates of 0, 0, 0, wherein the origin position may be used as a reference point for further measurements collected by the light ranging device. Alternatively, the position of the light ranging device as represented in the ranging data may have the same coordinates as the position of the light ranging device as represented by the primary model of the vehicle.

In yet another embodiment, the position may also be defined as a distance vector from an origin position, wherein the origin position may further correspond to the origin of the primary model. The ranging data may further comprise a plurality of distance vectors corresponding to a plurality of points on objects and surfaces in the environment. The distance vectors may be defined relative to the position of the light ranging device generating the ranging data comprising the distance vectors. A memory can store an origin position for the primary model, where the one or more model positions are defined relative to the origin position. The common coordinate frame can allow the distance vectors to be defined relative to the one or more model positions of the one or more light ranging devices.

In addition to surveying the environment around the vehicle, the control unit may also run a real-time odometry algorithm, such as a real time simultaneous localization and mapping (SLAM) algorithm or statistical filter or some combination thereof, which combines LIDAR data with any of the following—GPS, IMU, camera and other vehicle sensor data to estimate the current six degree of freedom for velocity, acceleration, and position of the vehicle in the environment. This real time vehicle state information may be fed into any downstream algorithms that require knowledge of the current vehicle state (e.g., velocity, acceleration, etc.) to calculate some types of risk values.

D. Analyze Ranging Data

At step 708, the control unit may analyze the ranging data, which may be in the form of imaging data, received from the light ranging devices. In one embodiment, a time sequence of ranging data comprising sets of distance vectors between a surface of an object and a particular ranging device at different moments in time may be analyzed to determine the movement patterns of objects and surfaces in the environment, while accounting for any movement of the vehicle. These movement patterns may include information about changes in the positions of environmental objects and surfaces and their velocity, direction, accelerations and other similarly measures relating to the movement patterns of environmental surfaces of objects. The control unit may then use such movement pattern data along with the distance vectors and positions of points in the environment to generate projected positions of points in the environment corresponding to where the points are predicted to move to after a predetermined time segment. This predetermined time segment may, for example, be set to 0.2 seconds, corresponding roughly to a typical reaction time for human drivers.

At step 710, the control unit may determine one or more risk values (e.g., proximity or trajectory values) using the model of vehicle and all or some points in the environment, e.g., a reduced set of points. For instance, the location of clusters of points having a similar distance can be identified as corresponding to a same environmental surface. A distance vector can be determined to the geometric centroid of a cluster of points that have determined to be associated with one another. The risk value may be a function of distances or relative velocities between the vehicle exterior and points in the environment, or any other measurements derived from the ranging data collected by the light ranging devices, or any combination of the above, e.g., to determine a trajectory of the vehicle.

In one embodiment, the risk values may correspond to distances (e.g., a shortest distance) between points in the environment and the vehicle exterior. In this embodiment, the ranging data received by the control unit from the light ranging devices may comprise distance vectors between points in the environment and the light ranging devices generating the ranging data. The control unit may then convert these distance vectors to other distance vectors that measure shortest distances between all measured points in the environment and the vehicle exterior as represented by the primary model. The control unit may also determine distance vectors that measure shortest distances between the vehicle exterior as represented by the primary model and the projected positions of all points in the environment that were calculated from step 708.

In other embodiments, the control unit may also directly determine shortest distances, rather than distance vectors, between points in the environment and the vehicle exterior. The shortest distances may be calculated based on the primary model of the exterior of the vehicle and distance vectors between points in the environment and the light ranging devices. For example, the distance vectors collected by the light ranging devices may be defined relative to an origin position corresponding to the position of the first light ranging device (e.g., 430*a*) on the vehicle exterior. The position of the first light ranging device on the vehicle exterior can then be matched with the position of the first light ranging device on the primary model to determine an x, y, and z coordinate for each point in the environment using the distance vector corresponding to the point in the environment. Accordingly, a distance between a point in the environment and a point on the vehicle exterior may be determined using the x, y, and z coordinates of the points in the environment and on the vehicle exterior.

For each point on the vehicle 410 exterior, a distance between the point on the vehicle exterior may then be determined with a closest point in the environment. A binary search tree, such as a K-D tree may be used to determine the closest point in the environment to the point on the vehicle. The distance may then be used as a factor for calculating the risk value. Other factors, such as relative velocity and acceleration may also be considered when calculating the risk value as previously discussed.

A risk may be defined to encompass other types of risks relating to the operation of the vehicle. For example, a rotation velocity for the vehicle may be computed based on the ranging data collected by the light ranging devices and used to compute a risk value. The risk value that was calculated based on the rotation velocity of the vehicle may be used to detect when the vehicle is at risk of rolling over when the risk value satisfies a risk threshold. Other motion variables of a vehicle can also be determined, e.g., velocity straight ahead or an acceleration.

In other examples, odometry data may be used, as determined based on the changes in the distance vectors to the environmental surfaces. For example, an environmental surface can be identified as being stationary (static), e.g., by comparing relative positions of the surfaces to each other at different times. If two surfaces are static, they will stay at the same relative positions to each other, whereas a moving object will become closer or further away from a static object. Examples of a static surface can be a line marking on a road. As an alternative, moving objects can be identified, and then removed, thereby leaving static objects.

Once static surfaces are identified, changes over time of the distances vectors to these respective environmental surfaces can provide motion variables, such as velocity and acceleration. Such motion variables can be determined in various ways, as described herein. In some examples, the motion variables can be determined by subtracting the components (i.e., for different ones of three dimensions) of the distance vectors and determining a change per unit time, e.g., as a rate, such as speed or velocity. Differences in such rates can be used to determine an acceleration. A trajectory of the vehicle can be determined by determining a relative position compared to stationary surfaces at each time step. Some stationary surfaces will move out of range, while other ones will appear, with a sufficient time overlap to have a common reference frame.

Some embodiments can assume that a majority of points in a scene are stationary. Such an assumption would generally be true, e.g., as the ground and most objects at the sides of a road would be stationary. A map determined from the measurements of the objects in the environment can be aligned to determine a movement of the vehicle during the time period between measurements. As an alternative to using a map determined from the lidar measurements, some embodiments can localize (align) on a precomputed or pre-collected static map of the environment, which may be determined using similar techniques as the map determined using the vehicle's lidar. Thus, instead of matching to the previous couple images from the lidar system, the system can match its data to the 3D map that is already loaded in memory. Localizing to a map can be a robust approach that can provide global positioning information if the map has been computed into a global frame of reference, as is discussed in more detail later.

Accordingly, the calculation of the one or more risk values can include determining changes over time of the distance vectors to respective environmental surfaces of the plurality of environmental surfaces. At least one of the one or more risk values can correspond to a speed, velocity, or an acceleration of the vehicle, or combination thereof. For instance, a risk value can be speed, velocity, or an acceleration, or some function thereof. Such a function could be a weighted sum or average of various motion variables, such as a speed, a velocity, or an acceleration.

E. Detect Risk Breach

At step 712, the control unit 420 may compare the one or more risk values discussed in step 710 to a risk threshold to determine whether a risk value exceeds the risk threshold. Accordingly, a risk breach can be detected based on a risk value of the one or more risk values exceeding a threshold value. In various embodiments, a breach detection might require multiple risk values to exceed respective thresholds, and other criteria may be used as well.

There may be different types of risk thresholds including those based on distance or velocity. For example, the value of the risk threshold (also referred to as the threshold value) may be set to 30 centimeters. In such an example, a risk breach can occur when the risk value is below the risk threshold. When the risk value relates to a velocity, the breach may occur when the risk value is greater than the risk threshold.

Shortest distances between points in the environment and the exterior of the vehicle 410 may be extracted from a set of distances determined from the vehicle's exterior to an environmental point. The shortest distance values may then be compared with the risk threshold (e.g., a proximity threshold) to determine whether there is a risk breach (e.g., a proximity breach). For example, a point on an object or surface in the environment, such as the branch of a tree 620*a* as depicted in FIG. 6, may approach the vehicle 600 and come within 30 centimeters of the vehicle's exterior. In such an event, the control unit can determine that the shortest distance between the point on the tree branch and any point on the vehicle's exterior (i.e., corresponding to the primary model) is below the proximity threshold of 30 centimeters and determine that a proximity breach has occurred.

It is understood that the threshold value may also be determined based on additional factors other than distance in other embodiments, such as a relative velocity or a relative velocity vector between points in the environment and the vehicle. For example, if a point on an environmental surface is moving at a higher relative velocity towards the vehicle exterior, then the threshold value may be set to be higher than 30 centimeters to provide more of a buffer zone to allow the control unit to generate a timely response.

Accordingly, a risk breach can be detected based on a risk value exceeding a threshold value. In some implementations, multiple risk values may need to exceed respective threshold values for a risk breach to be detected. Other criteria can also be used to detect a risk breach, in addition to one or more risk values exceeding one or more threshold values. Examples of such additional criteria can include how recent another risk breach was detected, road conditions, time of day, and the like. If the one or more other criteria are not satisfied, the system can determine that a risk breach did not occur. Other criteria can include situational information, e.g., that another car moved suddenly toward the vehicle thereby causing the driver to suddenly stop or accelerate away. An abrupt change in the motion of another object can cause a breach to not be detected or recorded.

At step 714, if a risk breach is detected, the control unit may determine a response, such as if a risk value exceeds a risk threshold (e.g., any of the distance vectors fall exceed the threshold value). The response may be to generate an alert to the driver of the vehicle. An alert may be an audio alert, visual alert, or haptic alert, or any other types of notifications to a driver or user. A notification may also be sent to a remotely located computer system to be displayed to a manager or supervisor. The response may also involve an automated effect on the operations of the vehicle, such as changing control of the vehicle. For example, the control unit may respond by braking and slowing the vehicle down. The control unit may also brake quickly to stop the vehicle where appropriate. The control unit may also employ more advanced control systems that involve steering the vehicle to avoid obstacles. It is understood that other types of responses may be utilized in alternative embodiments.

Multiple proximity thresholds may also be configured to detect different levels of proximity, wherein breaching different threshold levels may trigger different responses. For example, a first threshold may be set at 50 centimeters wherein detected points in the environment and calculated projected points that breach such a threshold may trigger a warning to the driver. A second threshold may further be set at 30 centimeters where a breach of such a threshold may trigger some intervention by the control unit on the operations of the vehicle.

The extent to which the proximity threshold is exceeded may also determine an intensity of a response. For example, where a proximity threshold is set as a distance of 5 meters, exceeding the proximity threshold by 1 meter or less may trigger a response of applying the brakes of the vehicle lightly, such as at 20% of maximum. In contrast, where a proximity threshold is exceeded by 3 meters or more, the control unit may respond by applying the brakes at 100% of maximum. As another example, the volume or repetition rate of an audible alert or the size, color and brightness of a visual alert may be tuned based on the severity of the risk. A continuous function may also be used to map the intensity of a proximity event to the intensity of a system response, instead of applying discrete thresholds.

The light ranging system may further detect collisions when a measured proximity reaches a value of zero such that an environment object or surface makes contact with the vehicle exterior as represented by the primary model. In such an event, the light ranging system may categorize this event as a collision. In response, the light ranging system may log the event as well as all data and analytics performed within a time segment leading up to and following the event. Such a log may be used subsequently for evaluating the driver's performance or diagnosing what took place, such as for legal or insurance purposes. The system may log data in response to other predefined risk events or any other criteria as well.

The light ranging system may also know when to suppress a risk breach determination or a response to a detected risk breach. For example, based on detecting that the vehicle's doors are open, such as using the methods described with respect to FIG. 8, the light ranging system may determine that the proximity of the vehicle door should not trigger a proximity breach determination even though it is below a proximity threshold. Similarly, the light ranging system may have a connection to the power of the vehicle and know whether the vehicle is powered on or off. Accordingly, the light ranging system may suppress all risk breach determinations and associated responses when the vehicle is powered off. This may help to avoid draining the battery of the vehicle.

Responses may also be defined in the event that one of the light ranging devices goes offline, such as due to a malfunction. When this happens, the light ranging system may send an alert to the driver, instruct the driver to use manual controls and shut off the light ranging system, or proceed using the remaining light ranging devices that are still online. It is understood that other responses may also be used in alternative embodiments.

In one embodiment, the light ranging system may provide additional functionality to assist with vehicle operations based on the data generated by processes involved in risk detection. For example, the ranging data, the model of the vehicle, and the calculated risk breaches may be displayed to a user on a display of the control unit in the vehicle dashboard. In the event of a risk breach, the display may indicate to the user where on the model of the vehicle the risk breach was detected. Similarly, the light ranging devices may also provide 360-degree views of the environment in real time, including functioning as a backup camera when the vehicle is driven in reverse.

F. Breach detection using Odometry

Figure 7B:
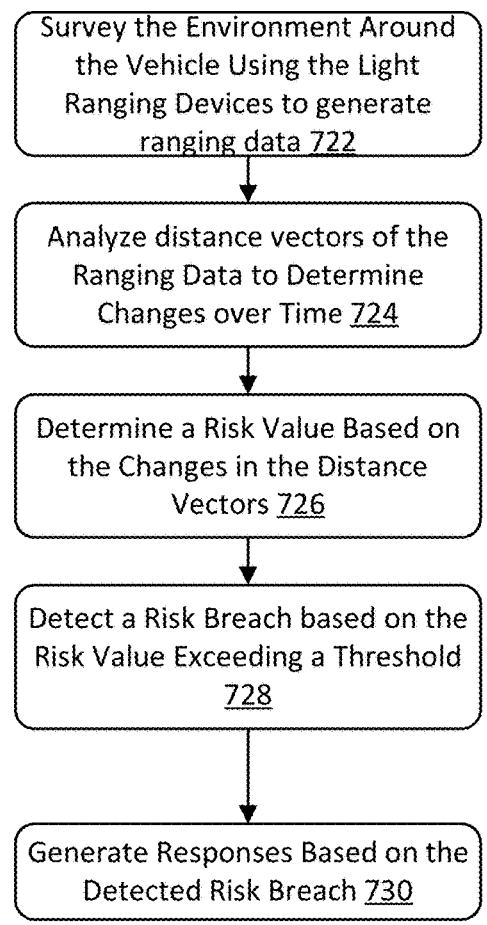

FIG. 7B shows a flowchart illustrating a method using a light ranging system of a vehicle to detect a risk breach involving the vehicle according to embodiments of the present technology. The risk breach can involve the risk of operation of the vehicle as measured by the light ranging system, e.g., using a trajectory of the vehicle, as may be determined using odometry techniques.

At step 722, the light ranging devices may continuously survey the environment surrounding the vehicle to generate ranging data that may be sent to the control unit for processing. The environment can comprise a plurality of environmental surfaces, and the ranging data can comprise distance vectors between the one or more light ranging devices and the plurality of environmental surfaces. Many measurements of the environment may be performed every second so that a time sequence of ranging data may be generated to have sufficient temporal resolution to capture incremental changes in position for fast moving objects and surfaces in the environment. Step 722 may be done in the same way as step 706 from FIG. 7A.

At step 724, the distance vectors of the ranging data are analyzed to determine changes over time of the distance vectors to respective environmental surfaces of the plurality of environmental surfaces. The analysis can be performed as described above in relation to FIG. 7B.

At step 726, one or more risk values are determined based on the changes over time of the distance vectors to the respective environmental surfaces. Step 726 may be done in the same way as step 710 from FIG. 7A. For example, at least one of the one or more risk values can correspond to a speed, velocity, or an acceleration of the vehicle.

At step 728, a risk breach can be detected based on a risk value of the one or more risk values exceeding a threshold value. Step 728 may be done in the same way as step 712 from FIG. 7A.

At step 730, if a risk breach is detected, a control unit may determine a response. Step 730 may be done in the same way as step 714 from FIG. 7A. For example, one or more alerts may be generated in response to detecting the risk breach. As another example, a control of the vehicle can be changed in response to detecting the risk breach.

V. DETECTING CHANGES TO THE VEHICLE EXTERIOR

Another exemplary function of a light ranging system during the operations of a vehicle may be to detect changes to the vehicle exterior. These changes may include a movement in a movable component of the vehicle, such as a door, an arm of a waste truck, or a hood of a convertible car. These changes may also include a shift in a position of a light ranging device on the vehicle exterior or a dent or other kind of damage to the vehicle exterior.

A. Scanning Vehicle During Operation

Figure 8:
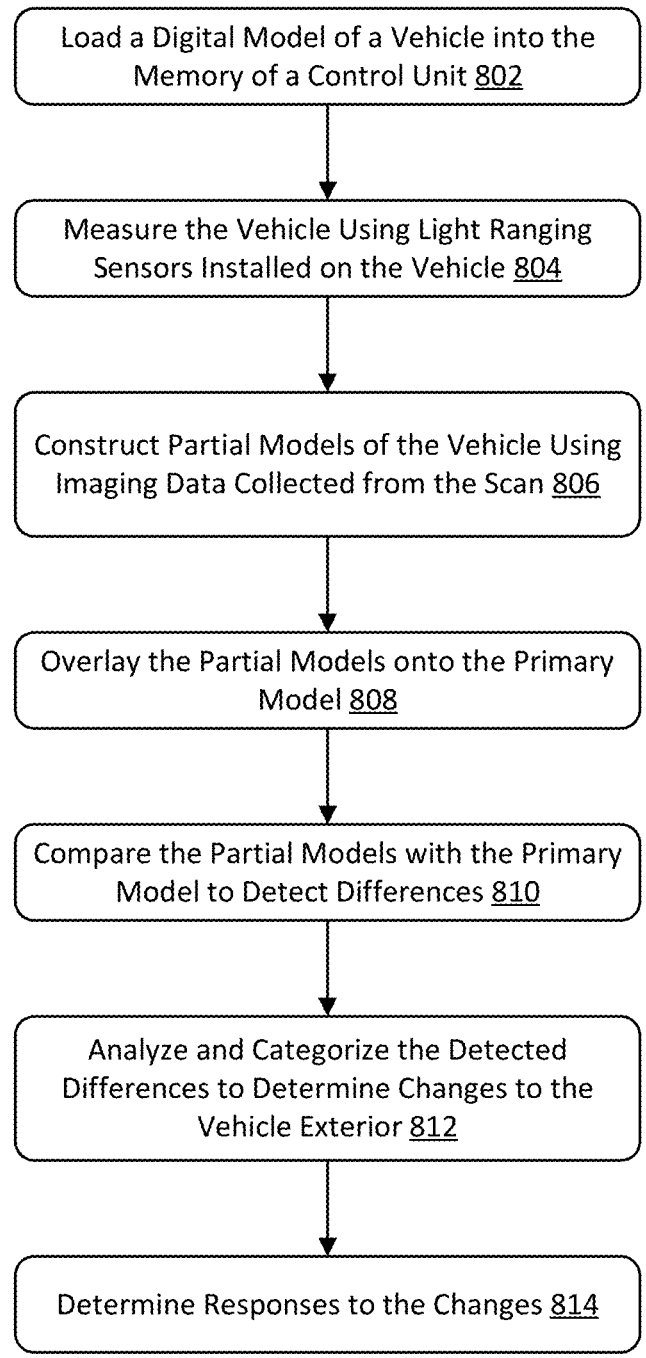
FIG. 8 shows a flowchart for detecting changes to a vehicle using a light ranging system according to some embodiments.

FIG. 8 shows an exemplary method for detecting changes to the vehicle 410 exterior. At step 802, a control unit (e.g., 420 of FIG. 4) may load a digital model including the positions of the light ranging devices (e.g., 430a-c of FIG. 4) of the vehicle into memory. This may be done in the same way as steps 702 and 704 from FIG. 7A.

At step 804, one or more light ranging devices installed on the vehicle 410 may perform one or more measurements of the exterior of the vehicle to generate ranging data, similar to step 706 previously described with respect to FIG. 7A.

At step 806, partial secondary models of the vehicle may be constructed using the ranging data generated from step 804. This may be performed using a similar method as step 506 for constructing the model as previously described with respect to FIG. 5. In one embodiment, the primary model and the secondary models may all be defined relative to an origin position equal to the position of a first light ranging device (e.g., 430a of FIG. 4) and share the same x, y, and z axes.

At step 808, the secondary models may be overlaid onto the primary model by placing the secondary models into the same coordinate system as the primary model and aligning the origin position of the secondary models with the origin position of the primary model. The alignment may be further refined by computing an error corresponding to the difference between the secondary models and the primary model and iteratively readjusting the orientation of the secondary models to minimize the error. The error may be computed using a variety of algorithms known in the art.

At step 810, the secondary models are compared with the primary model. This may be done by associating each point in the secondary model with the closest point on the primary model and computing a distance vector between those points. Accordingly, a set of distance vectors may be generated wherein each distance vector corresponds to a point on the primary model and a point on the secondary model.

B. Vehicle Defects

At step 812, the control unit may analyze the set of distance vectors representing the differences between the primary and secondary models to detect and categorize changes to the vehicle's exterior. Based on these differences between the primary and secondary models, the control unit may determine that there is some change, such as a dent, to the vehicle exterior. This may be determined based on finding that distance vectors are all below a threshold except with respect to a small, localized region. Such a scenario suggests that the ranging device has an accurate estimated position since the error is small for much of the vehicle, except in localized area.

At step 814, the control unit may then respond by recording and notifying a user with an indication of where that defect in the vehicle exterior may be. Alternatively, the system may upload this information to a server and generate a standard report that satisfies any number of existing regulations for pre- and post-drive vehicle inspections. The defect or dent may be very small and difficult or time-consuming for a human to inspect. Thus, automatically detecting defects in the vehicle exterior using a light ranging system may save from having to make regular manual inspections and help the user identify problems with the vehicle early on.

C. Shifts in Light Ranging Devices

As previously discussed with relation to FIG. 4, changes to the vehicle exterior may also include a shift in the positions of one or more of the light ranging devices over time from an initial position (e.g., by getting physically knocked). For example, the control unit may detect a shift in position of first light ranging device if the differences detected by second light ranging device are localized around the position of the first light ranging device. Such a shift can be confirmed by significant errors in the secondary model determined by first light ranging device relative to the primary model. In alternative embodiments, where the primary and secondary model may comprise environmental structures in addition to the vehicle exterior, these shifts may also be detected based on the alignment of reference points in the environmental structures using similar methods previously described with respect to the calibration process. Accordingly, the one or more changes can comprise a change in a physical position of a light ranging device on the exterior of the vehicle, such that the light ranging device has a new physical position on the exterior of the vehicle.

As described above for step 814, the control unit may determine a response to the detected change in the positions of the light ranging devices. The response may be a warning to the driver of the vehicle that the light ranging system should be recalibrated. Accordingly, one or more alerts can be generated in response to detecting the one or more changes. Alternatively, in response to a shift in the light ranging devices, the system may choose to automatically recalibrate the positions of the light ranging devices.

To recalibrate the position of a first light ranging device (e.g., 430*a*) that has shifted, the control unit may match the housing dimensions of the first light ranging device with a secondary model from a second light ranging device (e.g., 430*b*) that has the first light ranging device in its field of view to determine a new position for the first light ranging device. The control unit can then update the position of the light ranging device in the primary model with the new position. Accordingly, the model position of the light ranging device on the primary model can be recalibrated so that the model position more closely matches the new physical position of the light ranging device on the exterior of the vehicle.

Alternatively, recalibration may be performed by having the light ranging devices survey the environment to generate ranging data of the environment. The ranging data from each light ranging device may comprise the position of the light ranging device and a set of distance vectors for points detected in the environment. The control unit may then compare and merge the ranging data between a primary light ranging device (e.g., 430*a*) with each of the two other secondary light ranging devices (e.g., 430*b* and 430*c*) based on matching the relative arrangement of the points in the region where the fields of view of primary and secondary light ranging devices overlap. Once the merge is complete, the control unit may then determine a transformation matrix or a coordinate frame transformation between a secondary light ranging device and the primary light ranging device and thereby update the position of the secondary light ranging device on the primary model using the transformation matrix or the coordinate frame transformation.

D. Movable Components

The control unit may also detect when movable components of the vehicle move and change position. These movable components may include the arm of a waste truck or a vehicle door. The control unit may have preloaded data that provides the control unit with understanding of these movable components. For example, the control unit may understand the shape, housing dimensions, and orientation of these components, the positions and axes of rotation and movement, and the degrees of freedom of each movable piece. This preloaded data may be considered to assist the control unit with detecting and predicting how these components may move.

In response, the control unit may elect to recalibrate and update the primary model of the vehicle so that it can further detect the proximity of environmental objects and surfaces to these movable components in their new positions after they have moved. The control unit may similarly generate warnings to the driver that a door is open or that an arm of the vehicle is being raised. Further, the control unit may also respond by suppressing any proximity breach warnings that may be triggered by these movable components, which may be picked up by the light ranging devices as being too close to the rest of the vehicle exterior.

VI. DISPLAYING DATA ON A USER INTERFACE

Telematics data and image data can be collected, processed and displayed on an application via a user interface. Such an application can be used for monitoring a particular vehicle or fleet of vehicles. For example, telematics data and image data can be collected when a vehicle equipped with the light ranging system is operational. The telematics data and image data can be stored in a local server of a light ranging system or in a database stored of server that is connected to the light ranging system of a particular vehicle. The light ranging system can determine the vehicle's movements based on odometry and/or proximity of objects. One or more events logged by the light ranging system or vehicle monitoring system can be triggered by the odometry or proximity breaching a certain threshold predetermined by the vehicle monitoring system.

The telematics data and image data gathered and processed by the light ranging system can be used for monitoring a driver's usage based on the movements of the vehicle. A vehicle monitoring system (e.g., system 450 in FIG. 4) can connect and compile light ranging data or odometry data from a group of vehicles equipped with the light ranging system. Such a vehicle monitoring system can monitor a network of vehicles that span across a geographical region. The light ranging data and odometry data can be stored locally in the light ranging system equipped to the individual vehicle. Alternatively or in addition, the light ranging data and odometry data can be uplinked to a server or a cloud network that the vehicle monitoring system can access and process.

Features and data points processed by the light ranging systems can be displayed on an application via a user interface. The information on a driver's usage provided by the light ranging data can generally indicate a driver's behavior.

In one example, a general application to using a vehicle monitoring system for vehicles equipped with light ranging systems would be for a company that manages a fleet of commercial vehicles in a particular geographic region. Typically, a company that enlists a number of drivers to drive certain vehicles for their jobs, such as garbage truck drivers or delivery truck drivers, may generally operate a fleet of trucks every day. The employer of the drivers or the drivers themselves would benefit from seeing a driver's data relating to usage, particularly if the data can help lowering the risk of collisions due to poor driving behavior.

The following sections illustrate an example application with multiple features depicting a manager of a fleet of vehicles that have a light ranging system registered to each vehicle. In this example, each light ranging system can be connected to a network (e.g., cellular towers) or to each other as part of a mesh network and can be viewed and monitored in real time by the vehicle monitoring system. The manager of the fleet can view various points of data processed by the vehicle monitoring system based on the light ranging data of the fleet of vehicles. The application displayed to the user such as the fleet manager from the vehicle monitoring system can be executed on a website application, and the light ranging data from the fleet of vehicles can be gathered and processed by a cloud server.

A. Dashboard on a Fleet of Vehicles

Figure 9:
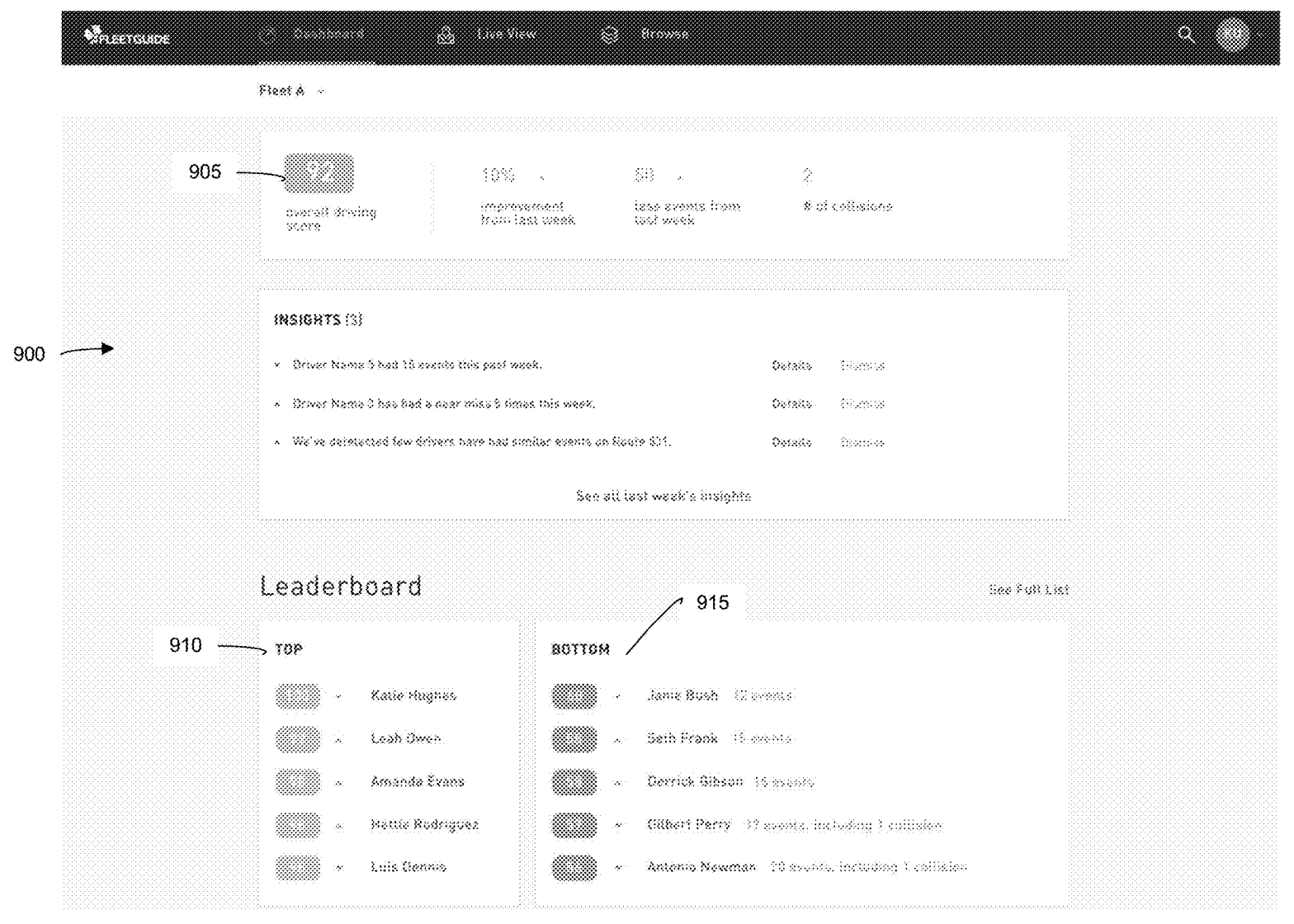

FIG. 9 illustrates an exemplary website dashboard 900 with data of one or more drivers' usage of a vehicle displayed via a user interface according to some embodiments. In one example, a particular fleet's overall driving score 905 can be displayed. The range of overall driving scores can be an arbitrary number preset by the vehicle monitoring system. The fleet's driving score of a particular driver's driving score can indicate a safety score of the particular fleet or the particular driver. A high score can relate to an overall safe driving fleet or driver, and a low score can indicate an unsafe or reckless driving fleet or driver. In one example, an overall score of 100 indicates the best score.

The overall driving score 905 can represent one or more safety events (e.g., risk breaches) that can be ranked by a number and compiled into an overall number. The safety events can be factors relating to driving behavior that can be determined based on a light ranging data. For example, the light ranging system can detect the proximity of an environmental object as it gets closer or farther away from an exterior point of the vehicle. As described in an earlier section, if the vehicle reaches a certain proximity level (e.g., the vehicle's proximity to the environmental object is too close), an alert can be given to the driver or displayed to the manager of the fleet. This trigger of the alert can trigger a safety event that can be logged by the vehicle control monitor.

In one example, every driver's profile can start with a score of 100 when each driver begins his or her route. Each safety event that is logged can trigger a certain cost that deducts an amount from the overall starting score of 100. For example, for each safety event, a penalty of a loss of points can be applied to each driver or the fleet overall, thereby lowering the fleet's overall score. The application, via the user interface, can display a leaderboard that can show either the highest ranking drivers' profiles of a particular fleet or the lowest ranking drivers' profiles of that particular fleet. As shown, the dashboard 900 can display information on a particular fleet such that the leaderboard are of high ranking drivers' profiles 910 and low ranking drivers' profiles 920. In another example, the dashboard can display information about multiple fleets instead of one particular fleet. In this configuration of the dashboard, the leaderboard visualization can display a high ranking fleets' profiles and low ranking fleet's profiles, along with each fleet's overall driving scores.

The methods of calculating the overall driving scores of each fleet can be similar to that of calculating the overall driving scores of each individual driver. In one example, the overall safety score of a fleet can represent the average score of the total number of routes taken by a fleet for a given day, week, or month, depending on the range of time to be displayed determined by the vehicle monitoring system.

A manager, individual driver, or both can have access to the dashboard. Different permissions and privileges for accessing multiple fleet information, specific fleet information, or individual driver information can be granted to different accounts such as that of region managers, fleet managers, or individual drivers.

The particular parameters for choosing safety events can help a manager or a system identify which particular fleet's or which particular drivers engage in risky driving. These safety events can be triggered by parameters such as vehicle contact with an object or a near miss. In one example, the application can display a particular portion of the exterior of the vehicle that collided with an environmental object or the particular portion of the exterior of the vehicle that triggered a near miss. The vehicle monitoring system can thus detect which particular driver engages in frequent accidents or unsolicited near misses and display such information in a simple form via a user interface.

In one example, the safety events can be generalized into categories, and then each category of safety events can be compiled to form an overall safety score. The dashboard can display one or more categories of safety events on the user interface, and each category of safety events can include a visualization of the particular safety events. The user can select each particular safety event on the visualization, and the dashboard can display the visualizations in more detail.

Figure 10:
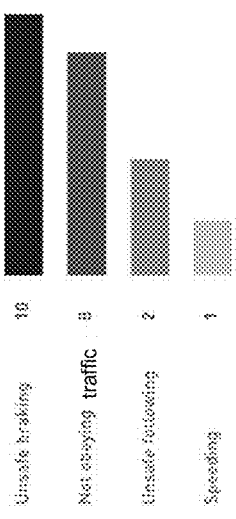
FIG. 10 illustrates examples of safety events by category that combine to create the overall driving score of a driver and of a fleet according to some embodiments.
Figure 10:
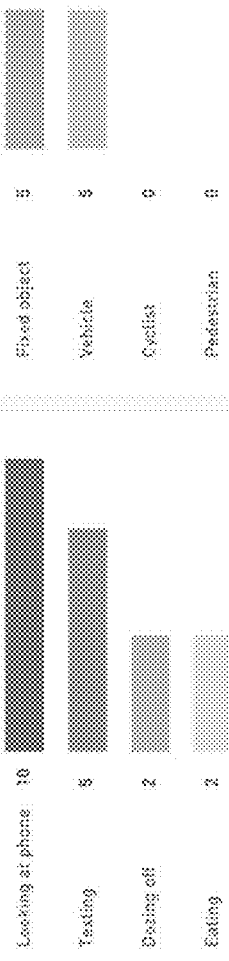
Figure 10:
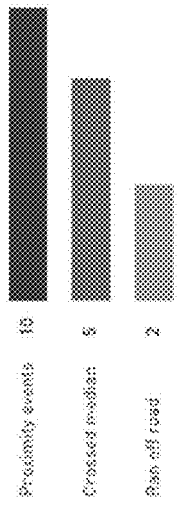
Figure 10:
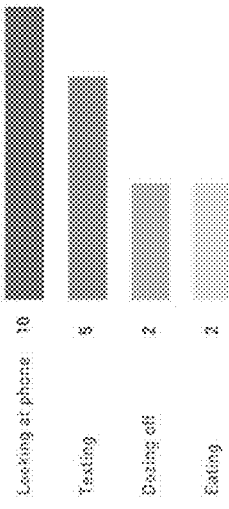

FIG. 10 illustrates examples of safety events by category that combine to create the overall driving score of a driver and of a fleet according to some embodiments. As shown, example categories of safety events include near collision events 1005, fundamental driving errors 1010, distracted driving 1015, and collisions 1020. Each of these categories have subcategories listed. Different weights can be applied to events of different categories and subcategories, where such weights can be specified by a user of the software application. The example types of safety event are described in the following sections.

1. Near Collision Events

Near collision events can relate to driving events during a driver's route that indicate a possible collision had a higher probability than desired, e.g., where the distance between a portion of the exterior of the vehicle is too close to an environmental object. As shown, examples of such events include proximity events, crossed median, and ran off road. Such types of events can be determined by a light ranging system on a vehicle.

A proximity event can be based on a proximity threshold being reached. In some embodiments, the proximity threshold can be set by a user of the dashboard, which can cause settings at a client, server, or a light ranging device to be configured with that proximity threshold for determining this type of safety event. Example proximity events include when the light ranging system detects a distance between a portion of the exterior of the vehicle being too close to an environmental object, the relative speed of the exterior of the vehicle compared to that of another object being too large (high), or a combination of both.

For a crossed median event, the light ranging system can detect that the vehicle has crossed a median that separates the road or separates two roads from each other. Such an event can be detected by a light ranging system that identifies line markings of a media using an intensity of reflections. In one example, the light ranging system can detect a crossed median with computer vision, e.g., using cameras of a system installed on the vehicle.

An off road event can be detected when the vehicle has gone off road when it should not have left the road. The light ranging system can detect a crossed median using odometry and calculating a position of the vehicle relative to a portion of the road having one or more lanes. The edges of a road can be identified using cameras and/or a light ranging system, or using a pre-computed map of the area that contains lane information.

2. Fundamental Driving Errors

Fundamental driving errors can relate to driving behavior on a road that is against normal driving behavior. Examples of such events include unsafe braking, not obeying traffic, unsafe following, speeding, and harsh turning or a harsh acceleration. Such types of events can be determined by a light ranging system on a vehicle. For example, speeding can be calculated by the light ranging system using odometry techniques described herein.

Unsafe braking can be determined based on changes in distances to stationary objects or to another vehicle. The rate in change of distance vectors can be determined and compared to a threshold. As with other thresholds, they can be set by a user of the system (e.g., via a website that sends networking commands to the light ranging systems) or be set by default.

Unsafe following (e.g., tailgating) can be identified as a safety event when a forward proximity threshold is triggered on a first vehicle relative to another moving vehicle in front of the first vehicle on the road. It can be required for the vehicle to be too close for at least a specified amount of time. Triggering of such a forward proximity threshold can be detected using distances measured over a particular field of view, e.g., by specific solid-state sensors pointed in a particular direction or certain angles of a scanning device. The thresholds used to determine a proximity event for a near collision can be different than used for unsafe following. And, these separate safety events can result in different costs or deductions to a driver's overall safety score.

In some embodiments, not obeying traffic laws may be detected either through real-time monitoring of road markings and traffic signs, or through information of these features stored in a precomputed map existing on the vehicle. In conjunction with high accuracy map-based localization using the lidar sensors, it is possible to detect granular traffic infractions or driver skill, e.g., how closely a driver stops to the white line by a stop sign or how close to the center of a lane the driver follows.

In various embodiments, the difference between the thresholds for different safety events can be defined by distance or the time the driver's vehicle is within a certain distance from another moving object. Also, the size, envelope, speed of the vehicle can be factors considered for triggering the safety event for proximity. In one example, the calibration of the vehicle for determining proximity thresholds can be set manually. In one example, the calibration of the vehicle's proximity thresholds can be automatically determined based on a table of predetermined thresholds assigned to different types of vehicles' envelopes, weights, size, and other factors.

The threshold at which a fundamental driving error is set can be predetermined by the vehicle monitoring system or embedded in a memory of the light ranging system and can be updated via a network connection to the internet. As another example, the threshold may be tuned by the fleet manager via the dashboard. In one example, different thresholds for triggering safety events can be assigned to different types of vehicles. The assignments of thresholds can be predetermined by the light ranging system. For example, a delivery truck may have different parameters that trigger an unsafe following safety event than that of a smaller taxi sedan because the amount of distance required for emergency braking would be different for vehicles having different weight and envelope. These parameters can be predetermined and updated from a computer.

3. Distracted Driving

Distracted driving can relate to a driver's physical behavior or movements while operating a vehicle in the fleet. Examples of such events include looking at phone, texting, dozing off, or eating/drinking.

For a user looking at a phone, this can be determined by having one or more driver-facing dash cams as part of the light ranging system and linked to the vehicle monitoring system. Such a dash cam or lidar sensor can also be used to determine when a driver is texting.

Besides dozing off, examples can include when a driver is not paying attention to the road or when the driver's hands are either not engaged with the steering wheel of the vehicle or not exerting enough control over the steering wheel. As for eating or drinking, the determination of a safety event can depend on how long the driver's hands are disengaged from the steering wheel.

The threshold at which a distracted driving safety event is triggered for a fleet's overall driving score can be predetermined by the vehicle monitoring system. For example, a driver removing his hand from a steering wheel for given amount of time may not necessarily mean that the driver is distracted, such as dozing off or texting. In that event, a distracted driving safety event should not be triggered. The thresholds can be determined based on time such as when the driver facing dash cam determines that the driver's hands are off the steering wheel for a time too long for any non-distracting operations. The thresholds can also be based on the dash cam visually detecting specific items that would automatically trigger a distracted driving safety event, such as the detection of a phone.

4. Collisions

Collisions can relate to any type of vehicle exterior making physical contact with a physical object. For example, a collision safety even can occur when the vehicle equipped with the light ranging system makes physical contact with a fixed object or nonmoving object, or with another vehicle. Particular subcategories can become more specific, such as detecting collisions with a pedestrian or with a cyclist. In one example, the vehicle monitoring can detect when a collision is a result of the driver's moving vehicle colliding with a stationary object, when a collision is a result of an environmental object colliding with a stationary driver's vehicle, or when a collision is a result both the driver's vehicle moving and the environmental object moving relative to the ground.

For a collision, the vehicle monitoring system determines a collision safety event when the light ranging system detects a breach of a proximity threshold. The proximity threshold in some examples does not necessarily have to be the exact envelope of the vehicle. In some examples, the proximity threshold can be intentionally set to an area that is certain distance away and outside of the actual vehicle envelope. For example, while a shape, design, and dimensions of a physical delivery truck is absolute, the light ranging system can define the vehicle envelope as a space that is 6 inches away from all surfaces of the actual delivery truck. In one example, the light ranging system can define a first vehicle envelope having a shape, design, and dimensions of the actual truck and can separately define a second vehicle envelope having a shape, design, and dimensions that is 6 inches away from all surfaces of the actual truck. The vehicle monitoring system can then define the proximity threshold based on the vehicle envelope that is 6 inches away from all surfaces of the actual truck such that a collision safety event can be triggered by breaching the proximity threshold and not by an actual physical collision. In another example, the proximity threshold can be based on any set envelope relative to the size of vehicle envelope.

In one example, a safety event can be triggered on a combination of different detections by the light ranging system. For example, a stop-and-go safety event can be triggered based on the light ranging system detecting that the car is currently engaged in stop-and-go traffic, the vehicle cannot stop without collision if it breaks a threshold acceleration in the traffic, and the driver is currently looking at the driver's phone during the stop in the stop-and-go traffic.

In one example, the cost or deduction value associated with each safety event are different. For example, generally, a collision safety event triggered can be associated with a greater penalty leading to a greater deduction of an overall safety score compared to a crossed median safety event triggering.

5. Visualizations

In some embodiments, the dashboard can display the safety breakdowns having one or more categories of safety events with one or more visualizations. The visualizations can represent a number of times a particular safety event was triggered for a driver or a fleet. For instance, the visualization of the particular events can be represented in a bar chart such that a bar chart of each particular safety event is presented in each category. For example, if there are four categories of safety events to be presented on a particular fleet, four sets of bar charts can be displayed to represent each category of safety events. A user can then select each particular event within each bar chart to see the safety breakdown of that particular safety event in more detail.

Figure 11:
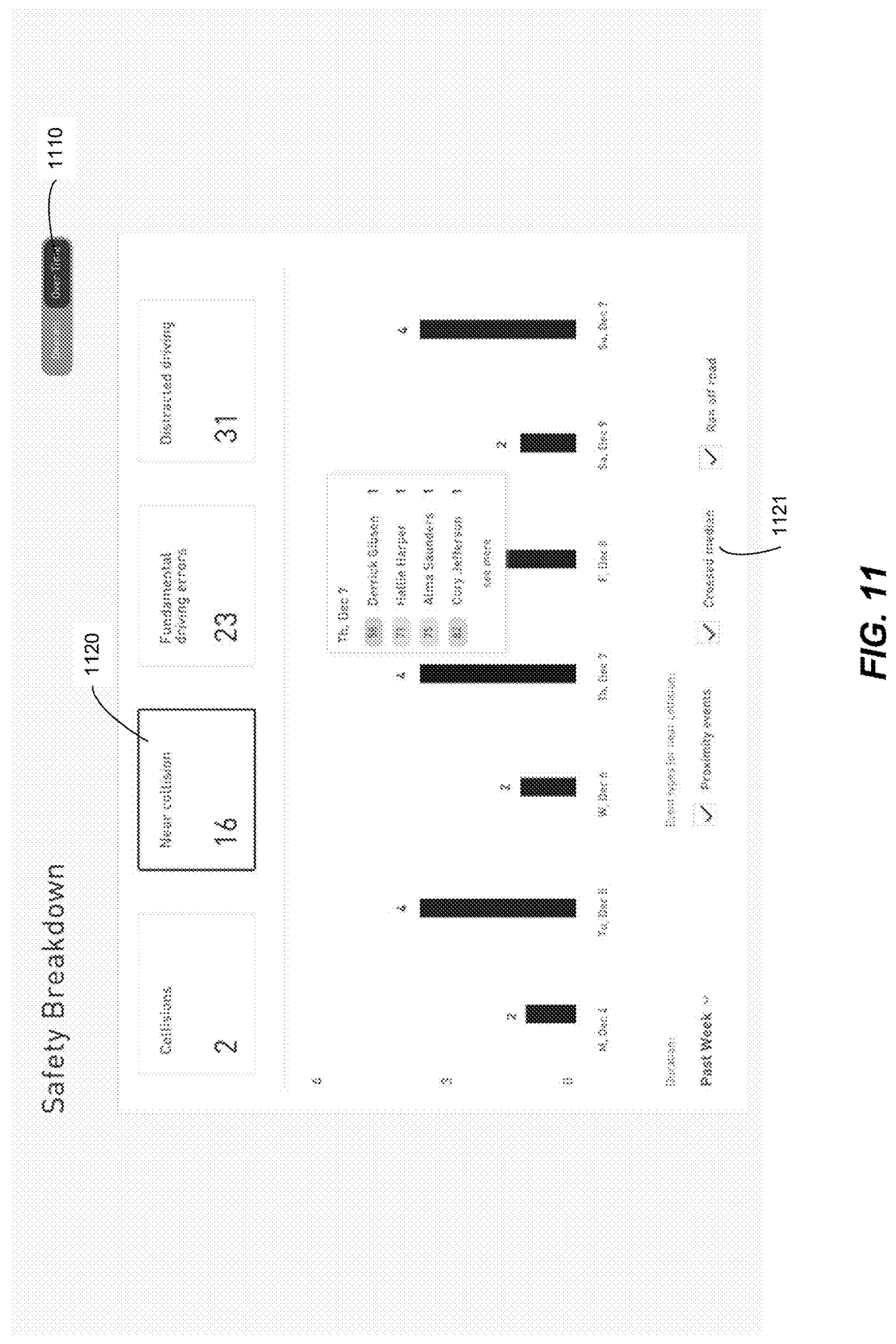

FIG. 11 illustrates examples safety breakdown section of the dashboard in an alternate view according to some embodiments. For example, under the safety breakdown section of the dashboard, a fleet manager can view that Fleet A has experienced 10 unsafe braking safety events during the week that the vehicle monitoring system has recorded. The fleet manager can select the unsafe braking component of the bar chart in the fundamental driving error visualization. The dashboard can then present details of the fleet's unsafe braking safety events such as when each of the particular unsafe braking safety events occurred during the week, by which driver was the unsafe braking safety event triggered, the location of the safety event, or a combination thereof.

When the dashboard is presenting information about a specific user and not a fleet, the safety breakdown section of the user interface can present data on a particular user and each visualization of the specific categories of safety events triggered presented by bar charts can represent data of that particular user.

The dashboard of FIGS. 9-10 can also display a visualization of improvements of the fleet alongside the visualization of the overall driving score. The improvements can be represented by the number of total collisions or broader safety events triggered in the currently displayed month compared to that of the previous month. The improvements can also be represented by a percentage of fewer collisions or broader safety events triggered in the currently displayed month compared to that of the previous month. The visualization can display the overall driving score, the percentage of improvements, the number of fewer safety events triggered, and the number of the specific number of collision safety events triggered in one section of the user interface.

As another example, the dashboard of FIGS. 9-10 can display a visualization of highlighted details of driving improvements or particular safety events triggered. The highlighted details can be displayed in a separate section of the user interface. In various implementations, the highlighted details can be details of particular safety events triggered by a particular driver, the total number of safety events triggered by a particular driver, and/or the total number of safety events of particular type triggered at a particular location in each driver's route. For example, if a significant portion of the fleet had a particular safety even triggered on Route #351 or a specific safety event is not or seldom triggered only on Route #351, the detail can be a highlighted detail displayed on the visualization. The user can then select each highlighted detail individually on the dashboard to view specific data on the individual highlighted details.

A visualization of the highlighted details can also be used for benchmarking a particular fleet or user to another fleet or user. The highlighted details can be displayed based on a triggering threshold. For example, while many near miss safety events can be stored for each particular user (driver), only near miss safety events that happen over ten times for a particular driver may be displayed in the highlighted details visualization. In one example, the highlighted details section of the visualization are part of an insights section of the dashboard.

Referring back to FIG. 11, examples of a safety breakdown section of the dashboard is shown in an alternate view. In one example, the safety breakdown can display a visualization of a fleet's safety events triggered based on a user specified window of time. For example, a user can select the 'over time' feature 1110 on the safety breakdown section of the user interface, and the user interface can display a visualization of a category of safety events triggered for a period of time. In one example, the user can set the period of time to a week. The visualization of the number of safety events triggered for a given category in that week can be represented by a bar chart. Each bar can represent the number of safety events triggered for that particular day for a total of 7 bars. In another example, specific safety breakdowns for each category displayed can be filtered out.

The example in FIG. 11 illustrates the overall safety breakdown for fleet A over a given week. Specifically, FIG. 11 illustrates the number of total near collision-type safety events 1120 that was logged by the vehicle monitoring system from December 4 to December 10 in a bar chart. In one example, the user can filter the specific safety events displayed in the bar chart such that if the user only wants to see the number of crossed median type 1121 near collisions from December 4 to December 10, the user can select to only show a bar chart representing crossed median type near collisions. In one example, the user can hover or select a specific bar of the bar chart, and the dashboard can display a breakdown of specific driver profile names who contributed to the total number of safety events of that particular bar. In another example, the dashboard can display the individual's overall driving score next to the name of the specific driver in this visualization.

B. Determination of Safety Events

The light ranging data and odometry data used to determine each safety event can be stored in each light ranging system installed on the individual vehicles. The calculation of the safety events based on the light ranging data and odometry data can be processed by the vehicle monitoring system once it retrieves the data. In another example, the calculation of the safety events can be performed within each local light ranging system, including a computer for processing calculations. Thus, in some implementations, the vehicle monitoring system can pull the safety event data and display it on the user interface without processing the light ranging data and odometry data.

The types of safety events processed and the scores calculated from the safety events can be stored in a database connected to the vehicle monitoring system. The specific odometry and light ranging data that will trigger the safety events can be specified in a program with precomputed logic that identifies safety events by crawling through the data looking for specific data points. Thus, the vehicle monitoring system can run the light ranging data and odometry data through the program and output the safety events to be displayed on the user interface. In another example, the odometry data itself can be processed in the database to determine whether a safety event has occurred.

In one example, the odometry data can be organized by storing the odometry data of each driver or each identified vehicle in individual tables. The tables can be separated into sections based on the type of information that is being calculated or processed. In one example, the odometry data is organized by fleets, then by vehicle VIN numbers, and then by specific shifts identified by specific drivers' names, and then at the time of the shift.

C. Dashboard on an Overall Individual Driver

Figure 12:
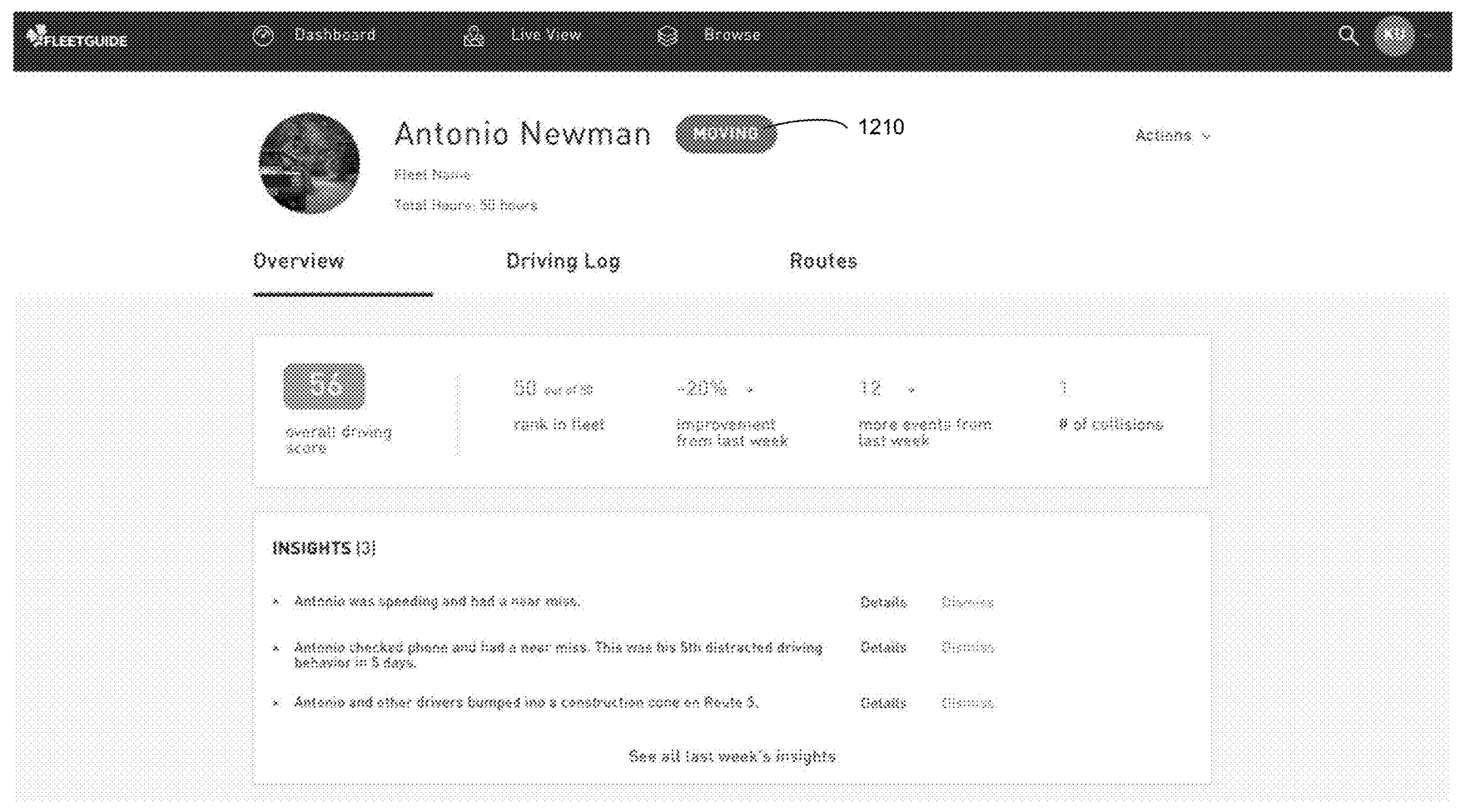
Figure 13:
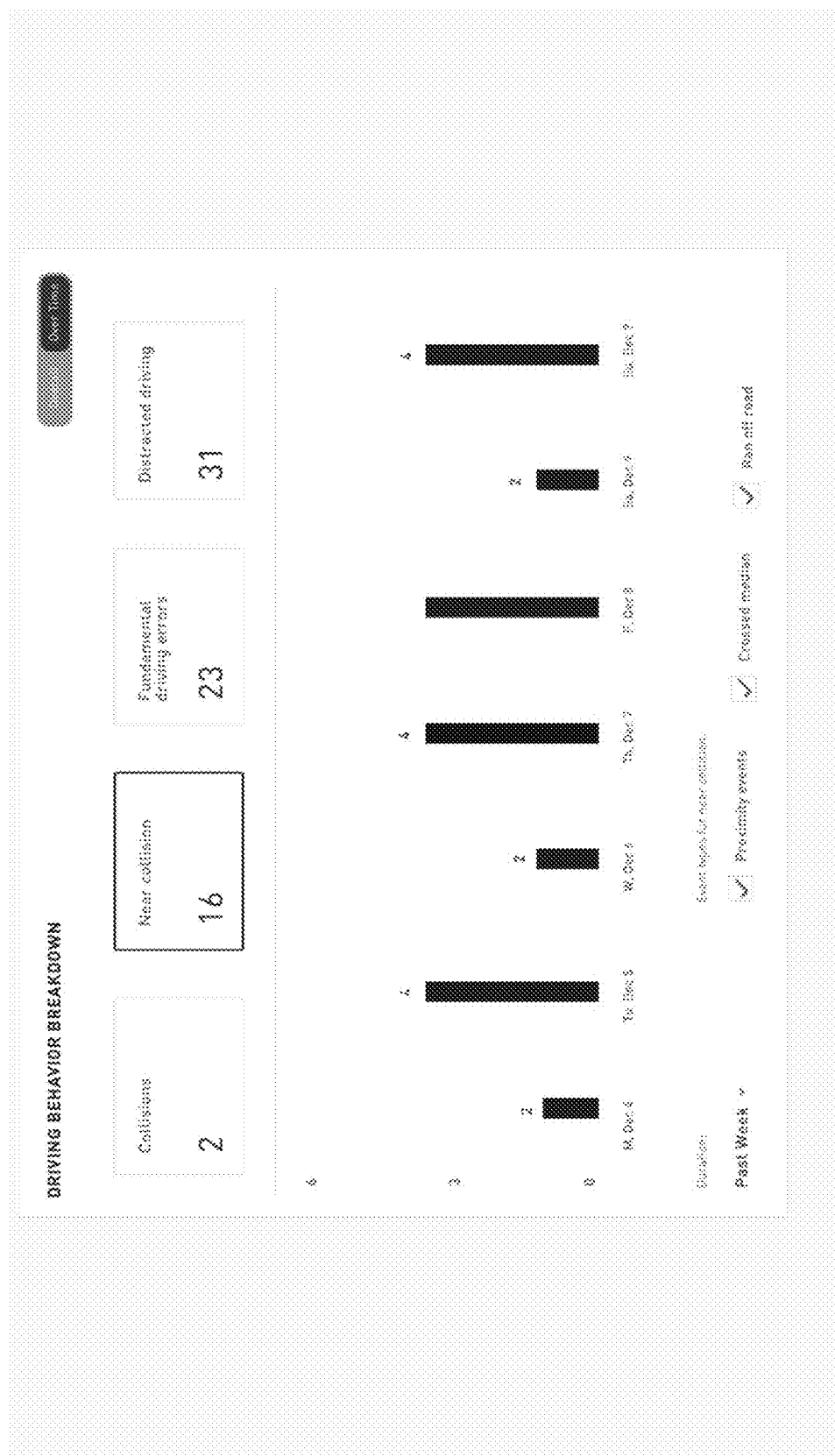

FIGS. 12-13 illustrate similar dashboard information illustrated in FIGS. 9-11 but for a particular user. In one example, a driver's profile can be displayed at the top of the dashboard in a section. The section can also include a picture or avatar of the driver, the fleet name or number that the driver is part of and the total number of hours driven for a particular period of time. An icon showing the live status 1210 of the driver can be displayed in the same top section of the page. The status can indicate whether the driver is moving, idle, on a break, or not engaging in any route. FIG. 13 shows a similar breakdown as FIG. 11.

Figure 14:
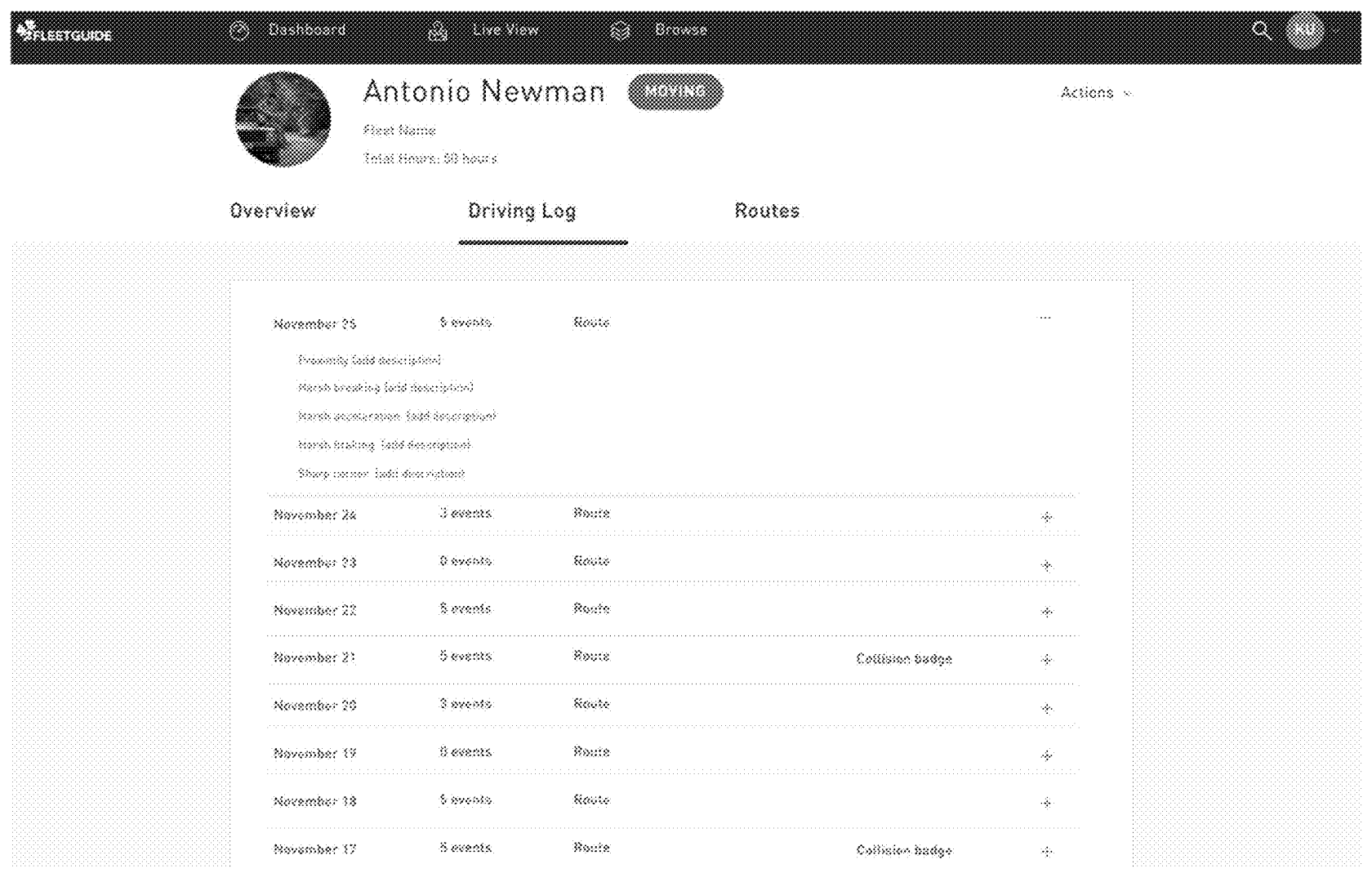

FIG. 14 illustrates an example driving log for a particular user. In one example, a driver's total number of safety events can be displayed in a drop down list sorted by specific days. Each row in the drop down list can be expanded on the same driving log page to provide details to the total number of specific safety events triggered on that specific day.

For example, a driving log page of a particular user can show a list of rows of dates ranging from November 10 at the bottom of the list all the way to November 25 at the top of the list. Each row can also display the total number of safety events logged about the driver that day and the name or type of route taken. Each row can also be expanded when selected and then break down each specific type of safety events logged for that day and display the safety events and number of times logged.

Figure 15:
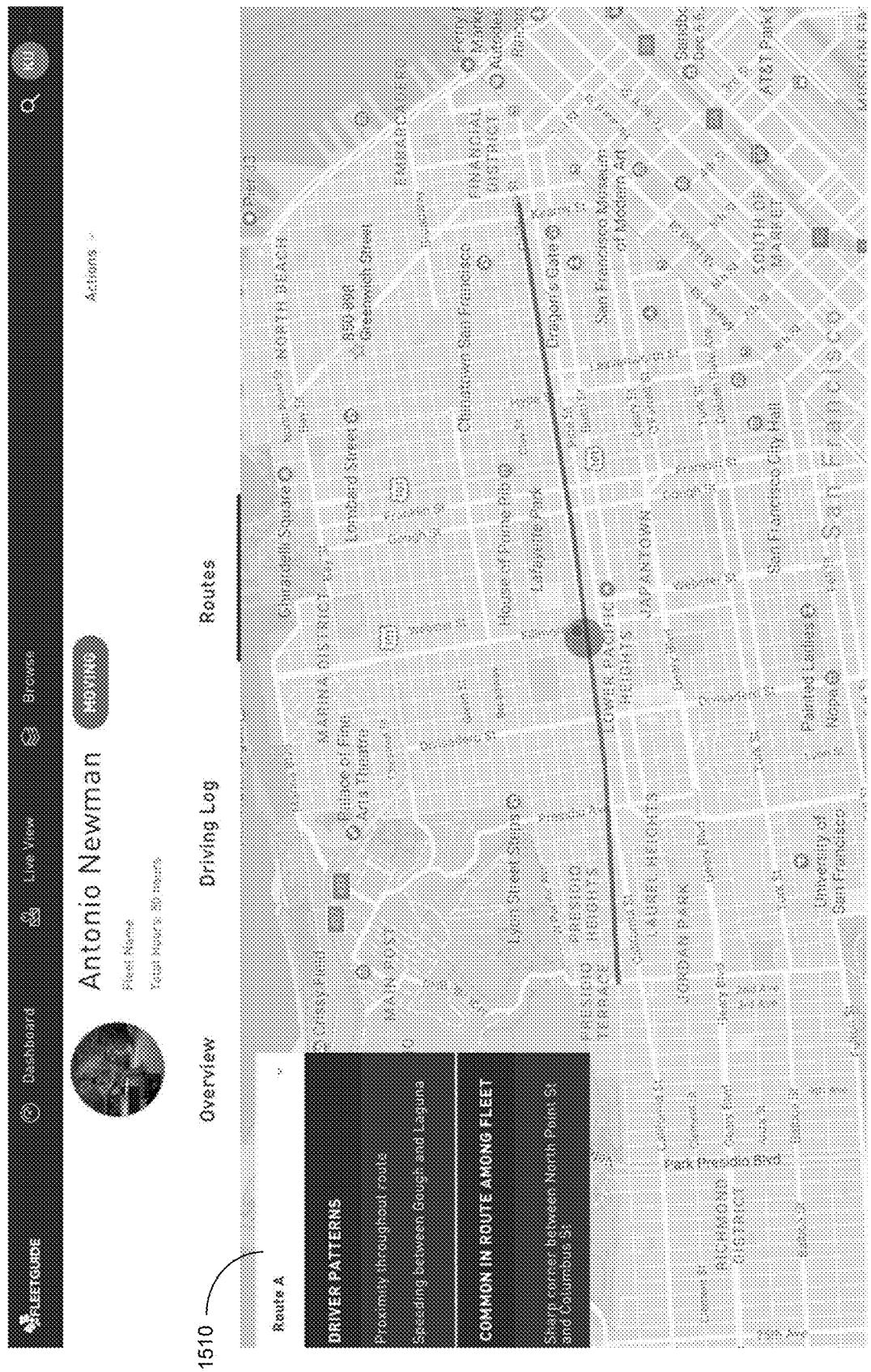
FIG. 15 illustrates a live view routes page for a particular driver according to some embodiments.

FIG. 15 illustrates a live view routes page for a particular driver (same as the description for FIG. 18, described below).

D. Viewing a Specific Safety Event (Accident Reconstruction)

In one example, a user can access information about a specific safety event from a dashboard page showing information about an overall fleet as described in FIGS. 9-11 or an individual driver as described in FIGS. 12-15. Each of these dashboard pages can display a specific incident of a safety event. For example, the dashboard can display a detail on the driver having a near miss safety event. When the user selects details of the safety event, the user can be taken to a page that specifically illustrates details about the near miss safety event. For example, the page can include at the top of the page, the type of safety event (e.g., a proximity event), a timestamp of the event, a neighborhood or intersection of the event, and local region where the event was logged.

Figure 16:
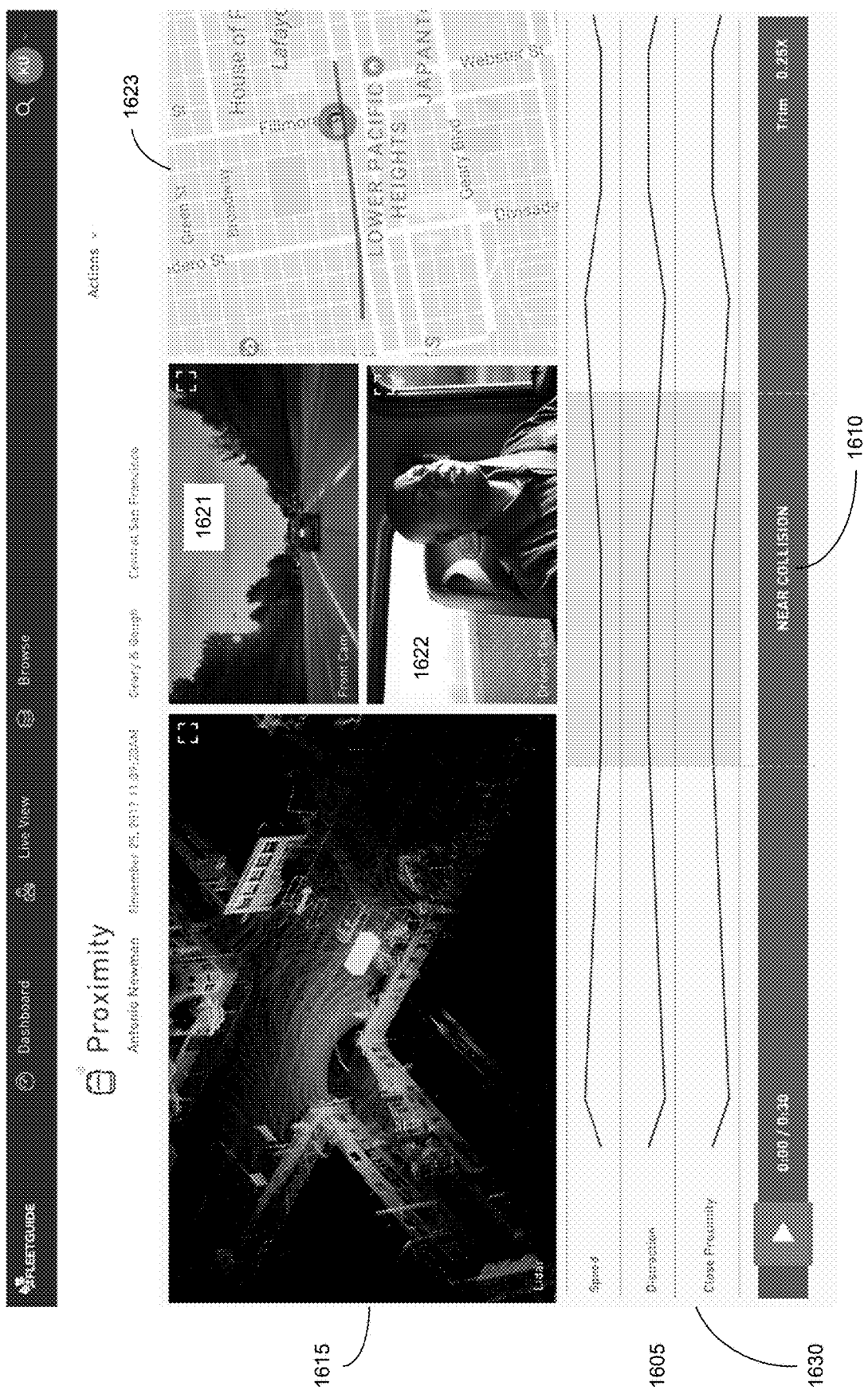
FIGS. 16-17 illustrate another example feature for viewing a specific safety event for a particular user according to some embodiments.
Figure 17:
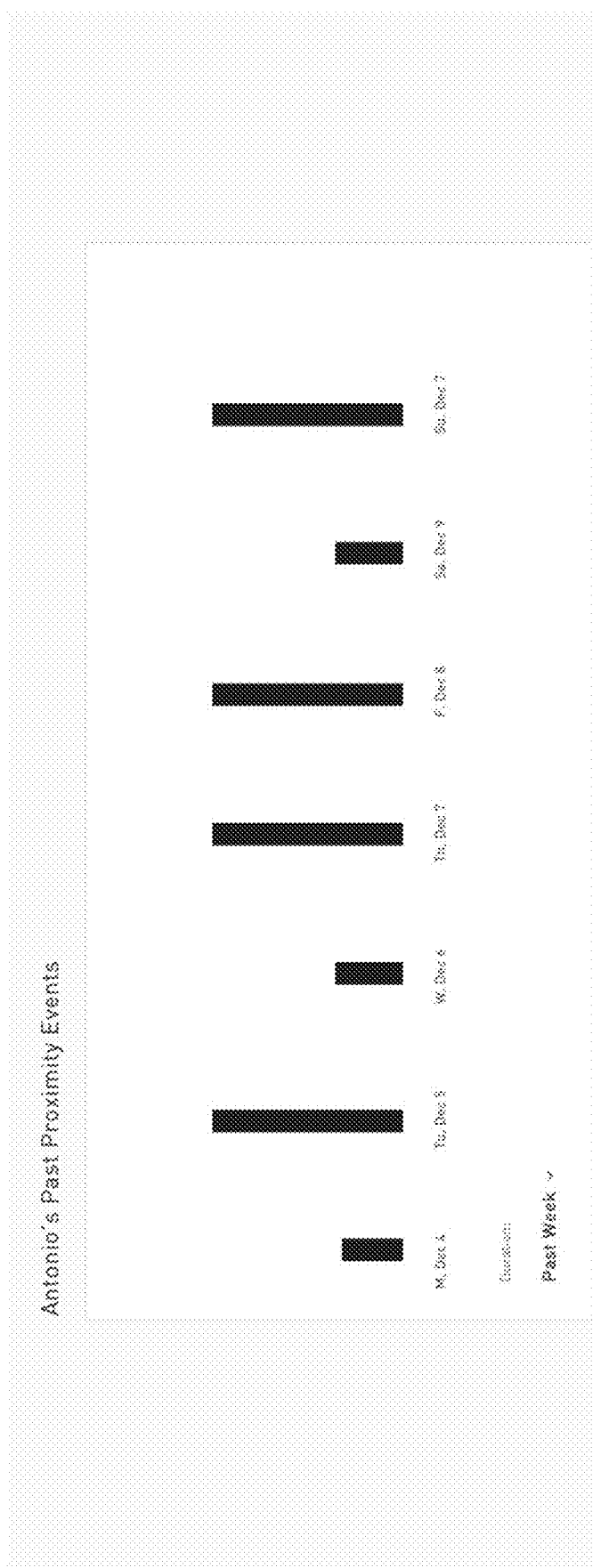

FIGS. 16-17 illustrate another example feature for viewing a specific safety event for a particular user according to some embodiments. In this example, when specific safety event is detected and logged, data associated with the risk breach can be recorded. For example, the ranging data, odometry data, metadata, and camera (image) data can be recorded. The data can be uploaded to a server that can be accessed by the vehicle monitoring system and displayed on the user interface. The data associated with the risk breach can be obtained by caching the light ranging data continuously as the vehicle is operated. The cached light ranging data can be stored on a computer in the vehicle ranging system, or uploaded to a server over a network. When a risk breach is detected, ranging data within a specified amount of time before and/or after the risk breach can be retrieved and store in a permanent location or transmitted. In some embodiments, the data associated with a particular breach (e.g., an accident) can be uploaded in response to a breach, as opposed to being uploaded later during a batch uploading for multiple breaches or with other ranging data.

As shown, the safety event is a near collision 1610. The light ranging system can upload all of the data recorded a specified number (e.g., 10) of seconds before the safety event, during the safety event, and after the safety event. The light ranging system can create a point cloud or a set of point clouds (reconstructed model) of the environment around a moving vehicle in a series of images (ranging data stream) across a span of time around the detection of the safety event, as shown in window 1615. The point clouds associated with the safety event can be uploaded to the server for the vehicle monitoring system to access.

The light ranging system can upload all of the image data gathered near the time of the safety event recorded. For example, a front camera and a driver camera can also upload the images or video (video data stream) captured in the span of time around the detection of the point cloud. Images from such cameras are shown in windows 1621 and 1622. A map of locations covered by the vehicle over the span of time can be displayed in a map 1623 as if it were a live view. The locations can be received as position data for the vehicle during a time interval associated with the risk breach.

Odometry data, distance data, and other metrics (e.g., distraction as measured from images) can be provided as continuous values 1605 over time, e.g., in window 1630. Such data can correspond to parameters such as speed, distraction, and close proximity used to calculate the near miss safety event. A sliding bar (e.g., vertical) can move across these continuous values to illustrate a current time that corresponds to the images shown in windows 1615, 1621, and 1622.

The data can be played back together, e.g., as a single file (including videos, point cloud, and other data) that runs from 10 seconds before the near miss, during the near miss, and 10 seconds after the near miss. The single file can have markers for where each data stream is located. The software of the playback system can include multiple rendering engines for generating images for each of the data streams. To establish and maintain synchronization, the data streams can include time stamps. The engines can communicate with each to determine a current time stamp (e.g., of a current or most recent image), so that a rendering engine can speed up or slow down to keep synchronization.

The user (e.g., the fleet manager) can access such a playback from a computer connected to the server where the video of the near miss is stored, which could be in a server connected to a cloud network, or the locally on the vehicles light ranging system. The user can provide user input to start playback in a variety of ways, e.g., via a button, a voice command, a gesture on a touch screen, and the like.

In one example, the point cloud visualization of the specific safety event can be interactive with the user. The user can select the point cloud visualization and change the view of the visualization such that the particular data played for the particular safety event logged and recorded does not necessarily have to be the default ones (e.g., as shown in FIG. 16) or the default perspective, or the default arrangement. For example, while the page detailing the specific safety event has a video of approximately 20 seconds of LIDAR images, the orientation and perspective view of the LIDAR images can be changed by the user during the 20 seconds playback. Further, color information can be overlaid on the point cloud visualizations to simplify the interpretation of the scene or highlight the location of the event. For instance, different colors can be used for ground (e.g., blue), environmental objects (e.g., yellow), other vehicles (e.g., red), and people (e.g., green). In addition, an idealized 3D model of the vehicle or the 3D scan of the primary model of the vehicle may be incorporated into the 3D visualization to provide additional context about the event.

In the event of detecting a collision, the light imaging system can save the data immediately before the collision, during the collision, and after the collision, and automatically upload the data to central server or vehicle monitoring system that oversees a network of light imaging systems equipped to individual vehicles. In this manner, evidence of an accident can be preserved for ready access, e.g., to determine fault. And, as ranging data (as well as data determined from ranging data, such as odometry data) can be displayed in synchronization with video and/or point cloud reconstruction, a user can have an creased ability to determine a cause of an accident.

Accordingly, the series of point clouds, the video from the front camera, the video from the driver camera, and the route that was displayed in a live view mode of the particular vehicle on the map can be displayed together on the dashboard. This visualization can be linked to any part of the dashboard that displays information about the particular safety event. For example, when a user on a more general page in the dashboard clicks on the specific safety event, the user can see details of that specific safety event. The time frame for a safety event can be a specified time (e.g., a small length of time, such as a few minutes or seconds), where the time periods before, during, and after can differ. In another example, the specific thresholds and parameters used to determine if a safety event is triggered can be logged and displayed in the same way as the videos described above, e.g., as depicted by continuous values 1605.

FIG. 17 shows past events of a particular category as can be accessed from the page shown in FIG. 16 according to some embodiments. In one example, the user's past safety events of the particular type or of that broader category can be displayed in a visualization in the same page or a on a different page. As shown, the visualization is in the form of bar charts detailing the number of safety events triggered for time period. These features can be saved in a server so that the user, such as the fleet manager, can access details of the by clicking on the specific safety event (as discussed in previous sections) at any time on the user interface.

Figure 18:
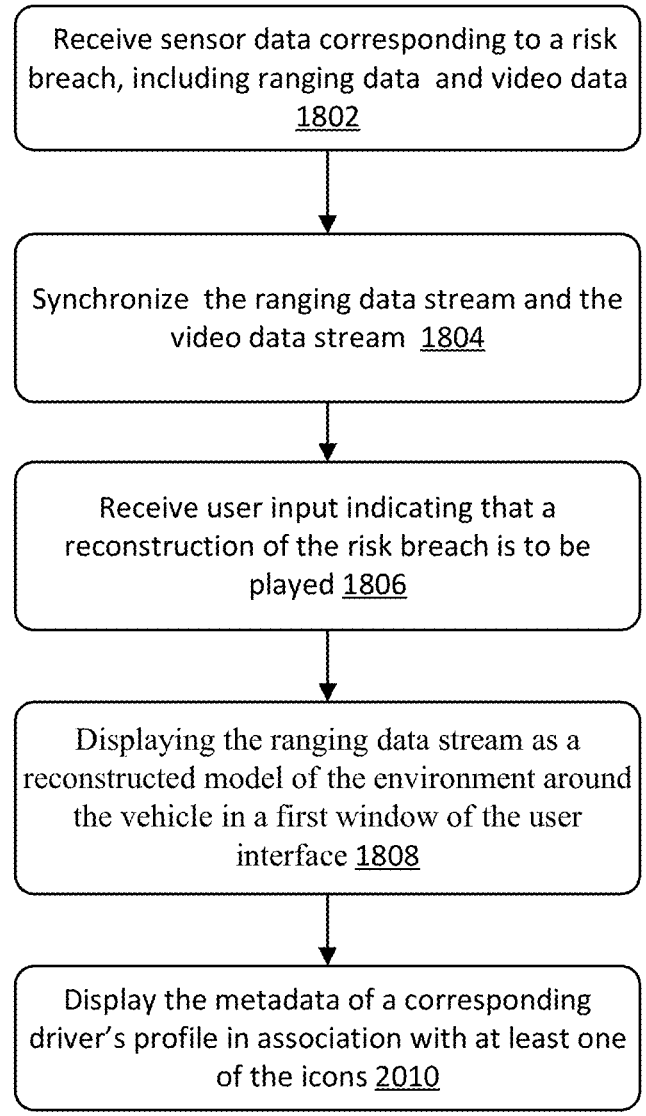
FIG. 18 is a flowchart illustrating a method for using ranging data collected from a light ranging system installed on a vehicle according to embodiments of the present disclosure.

FIG. 18 is a flowchart illustrating a method for using ranging data collected from a light ranging system installed on a vehicle according to embodiments of the present disclosure. The method may be performed by a computing system, such as a client computer or a server computer, which may provide a website to clients.

At step 1802, sensor data corresponding to a risk breach for the vehicle is received. The sensor data can be determined using the light ranging system of the vehicle. The sensor data can include (1) a ranging data stream measured by the light ranging system of an environment around the vehicle and (2) a video data stream obtained from a camera installed on the vehicle. The ranging data can be as described herein, e.g., a series of measurements of depths at one or more pixels, as may be measured using a lidar system. The system can also include cameras for obtaining video data. One or more cameras may be positioned as described above for FIG. 16. Data from other sensors may also be used in addition or instead of the video data.

At step 1804, the ranging data stream and the video data stream are synchronized by determining a time in the ranging data stream that corresponds to a time in the video data stream. The synchronization may be performed in a variety of ways. For example, a common clock signal can be provided to the ranging devices (light ranging devices 430 of FIG. 4) and to the camera(s). The common clock can be located in any of the devices that comprise the light ranging system, e.g., in a control unit, the ranging devices, or a camera.

The light ranging devices and the camera(s) can time stamp the data, so that ranging data corresponding to certain video data can be identified. In some embodiments, the resolution of the time stamps for each device can vary. For example, a scanning ranging device can time stamp each measurement at a new angular position, thereby having a 360° depth image have a range of time stamps. Or, a single time stamp can be used, e.g., the start time of the image, the end time, a median time, or other value. The synchronization can match ranging data and video data that have a closest time stamp.

At step 1806, user input indicating that a reconstruction of the risk breach is to be played is received. The user input can be received at a user interface, e.g., as shown in FIG. 16. For example, a manager of a fleet of vehicles or an insurance adjuster may want to playback the reconstruction on an office computer at a later time. The user interface can be configured to allow forward and reverse playback, e.g., with a toggle that allows the user to control the sequence of images to be displayed.

At step 1808, in response to the user input, the ranging data stream can be displayed as a reconstructed model of the environment around the vehicle. The reconstructed model can be displayed in a first window (e.g., 1615 in FIG. 16) of the user interface. The reconstructed model can depict a two-dimensional or three-dimensional model of the environment as measured at a time resolution for a ranging device. For example, the first window can refresh at a rate equal to the rate that a 360° depth image is taken. Such images can be less than 360°, and can use ranging devices that do not rotate or otherwise scan.

At step 1810, in response to the user input, the video data stream is displayed in a second window of the user interface. For example, video stream data can be displayed in windows 1621 and/or 1622. The data streams can be displayed side-by-side so that a viewer can identify specific positions of objects (e.g., another vehicle) in the environment at a specific time that also shows video images, e.g., of the driver. In some embodiments, the user interface can include an interface element (e.g., a slider bar) that allows the user to move time forward and backward such that the reconstructed model of the environment around the vehicle displayed in the first window and the video data stream displayed in the second window are played forward and backward in synchronization.

Besides ranging data and video data, the sensor data can include position of the vehicle, e.g., a GPS position or a position determined from aligning a first map (e.g., as determined from the ranging data) to a stored map. Thus, position data for the vehicle during a time interval associated with the risk breach can be received. then, in response to the user input, a third window of the user interface can display positions of the vehicle on a map. The position at an instant in time can be synchronized with the ranging data stream and the video data stream.

As another example of sensor data, variables such as speed, distraction, and closest proximity to another device can be obtained. A series of values of a variable can be determined from the ranging data stream or the video data stream. The series of values span a time interval associated with the risk breach. The series of values can be displayed in a fourth window (e.g., 1630 of FIG. 4) of the user interface. Such variables may include speed, velocity, or acceleration, which may be obtained from a vehicle control unit or the ranging data, as examples. In some embodiments, a variable can measure distraction of a driver of the vehicle and is determined using the video data stream. A distraction measure can be based on a variety of factors, such as whether eye lids are closed, how upright the head is, or direction of the driver's eyes.

E. Live View of a Vehicle's Geolocation

Besides accessing reports of driver activity determined using ranging data and reconstruction of events, embodiments can provide live access to data, including location and safety scores. The live data can be used to manage a fleet of vehicles that are actively being used. For example, locations of safety events for all or some drivers can be identified, e.g., so routes can be modified or new drivers assigned to a route. In addition, the view can provide a fleet manager a way to quickly see many different issues with a fleet. For instance, vehicles that are ahead of or behind their typical schedules, that are off route, or have idled too long could all be highlighted in different ways to call attention to them.

1. User Interface

Figure 19:
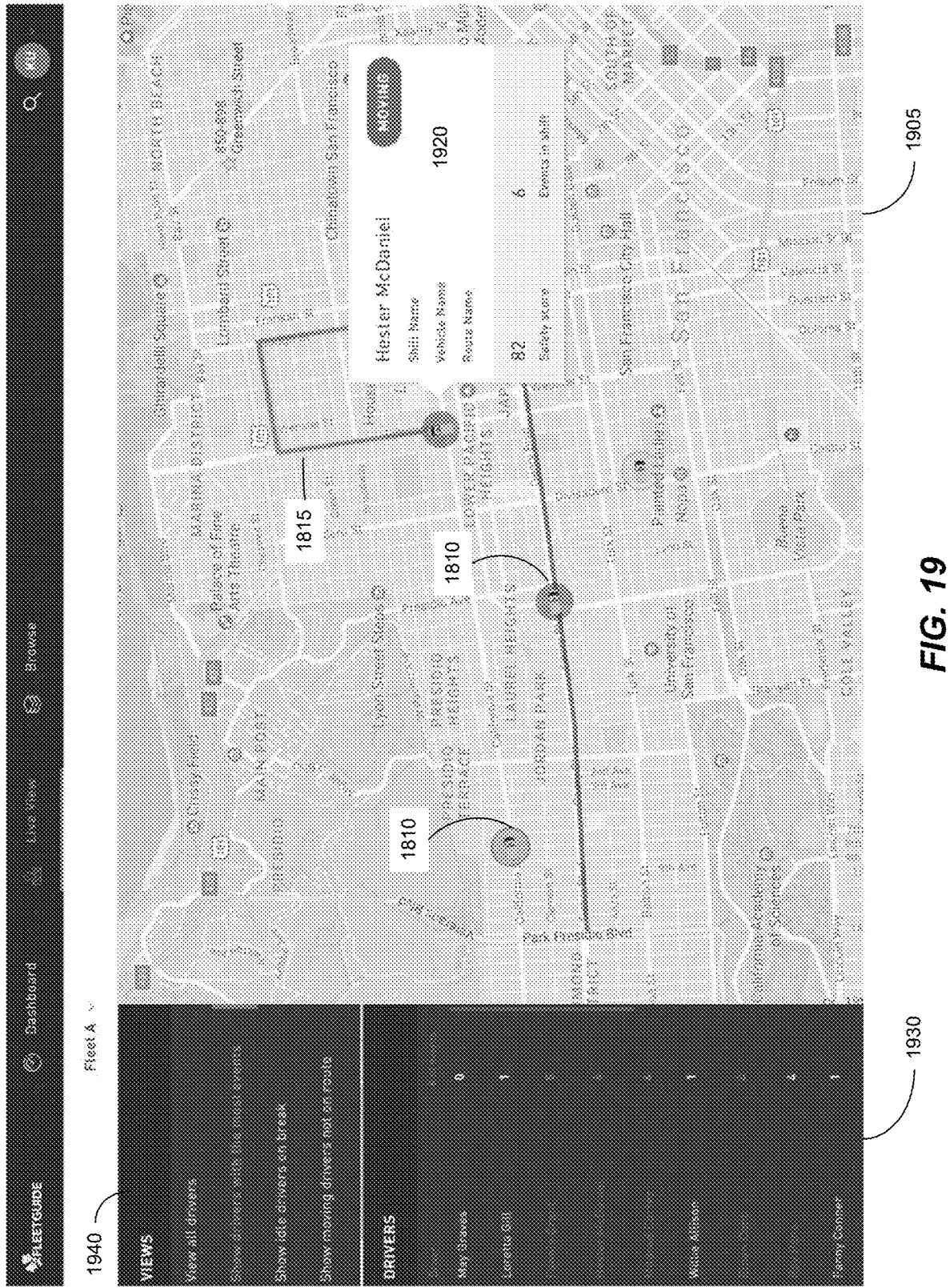
FIG. 19 illustrates a live view of a vehicle monitoring system according to some embodiments.

FIG. 19 illustrates a live view of a vehicle monitoring system according to some embodiments. A display of the user interface of the live view is shown. Such a user interface can be used by a vehicle fleet manager or regional manager and can show the user telemetry and odometry data about the fleet or region.

FIG. 19 shows a visualization of a fleet or group of vehicles displayed on a map 1905. The map can feature multiple vehicle icons 1910 that represent the vehicles in the fleet. The map 1905 can also display solid lines 1915 associated with icons on the map that indicate the vehicle's current target route or past driving sessions. A user can select which routes to display, e.g., by selecting a vehicle, and that vehicle's route can be displayed.

To obtain further information about a driver of a particular vehicle, metadata 1920 about the driver can be provided. For example, a user can hover a mouse or other selection tool over a vehicle's icon. The map 1905 can then display a visualization presenting information about the vehicle, the driver of the vehicle, the current route of the vehicle, and the like.

In one aspect, the presented information can also include the overall safety score of the driver (e.g., for the day or average for a range of time), the number of safety events triggered during the particular shift that is going on in real time, and any metadata related to the vehicle or the route. The presented information can indicate a status of the vehicle such as if it is moving or it is currently stopped. The presented information can include statistical values of a driver's driving characteristics, such as the frequency of proximity events detected, frequency of fundamental driving errors detected, and frequency of contact with an environmental surface or collision detected.

The icons of each vehicle on the map can be color-coded based on user's current safety score. One icon can be a first color (e.g., red) to indicate a low overall score. A second color (e.g., blue) can indicate a high overall score. For example, if a driver has an overall user score for the day that is deemed low, a red color could be assigned to the vehicle's icon and displayed on the map with the vehicle icon to indicate that the particular vehicle on the map is being driven by a driver with a low overall score for that day or whatever range of time the user wants to see.

In one example, a user of the map can see if the specific route taken by the vehicle is the same specific route that was predetermined as the route to take for a particular route. A user can identify if the vehicle deviated from the predetermined route by a little bit such as a few exits or took an entire detour that is not within a geofence defined by the vehicle monitoring system.

The live view can display in real time when a vehicle in the fleet is engaged in a collision, such as collisions described above for reconstruction. The display can alert the user, such as a fleet manager, that a vehicle has engaged in a collision in the live view page. When a collision is detected and displayed on the live view visualization, the user can report the collision, if it is a serious one, to authorities local to where the collision took place. In one example, the vehicle monitoring system can automatically report the collision to the authorities and provide location data and temporal data. The user can then review the reconstructed data that has been sent to a cloud server and retrieved by the user's computer.

The visualization of the live view can also include a side menu 1930 or a hamburger menu including a list of other driver's vehicles currently in the fleet or engaged in a route. The side menu 1930 can include a list 1940 of different kinds of live views.

The visualization can display all vehicles' icons currently within the size of the map displayed on the user interface. The user can filter the types of vehicles to be displayed, such as by number of vehicles currently moving, number of vehicles whose drivers are currently on a break, based on the odometry of the vehicle, or only the vehicles whose drivers have reached a certain number of safety events triggered. The features can be modified based on the user's preferences. In one example, the filters can be selected by specifically having the filters selectable on the side menu.

In one example, the side menu 1930 can display a list of drivers currently within the size of the map displayed on the user interface. In another example, the side menu can display the list of drivers in the particular fleet. Specific features of the drivers can be indicated with visual cues in the list on the side menu. In one example, the features can indicate currently active drivers on a route or indicate the number of safety events triggered on the particular route.

In one example, the locations of the vehicles displayed in the live view visualization can be determined by global positioning systems (GPS). In another example the locations of the vehicles can be further refined on the map based on the ranging data (e.g., as a point cloud map) collected from the light ranging system. The period of time the GPS data or ranging data is collected and processed for a particular driver can be equivalent to a time ranging from the start of the route to the completion of the route.

Referring back to FIG. 15, a map display is shown for a particular driver. A route is shown for the vehicle. Metadata can be shown for the particular driver, as described above for FIG. 19. Given that only one driver is shown on the map, metadata for the driver can be shown automatically, e.g., in window 1510. Particular data can be shown about a driving pattern, e.g., a risk breach, such as speeding. Data about risk breaches for the fleet can also be shown, e.g., regarding angular velocity around a corner. A link can provide more information about a breach, e.g., proximity breaches or even just average closest proximity throughout a route.

2. View Across Regions

Figure 20:
FIG. 20 illustrates an example live view having a visualization of all fleets displayed on a map according to some embodiments.

FIG. 20 illustrates an example live view having a visualization of all fleets displayed on a map according to some embodiments. The map can represent a more zoomed out region such that multiple fleets 2010 can be shown across the map. In one example, the visual representation of a fleets can be represented in a single icon for easier visualization at such a zoomed out state, instead of having to see many dots or individual vehicle icons at once, as described in FIG. 20.

The icons for each fleet spread across the map can have a number associated with the fleet such that the number indicates the number of safety events triggered for a particular time that the user wants to see or the number of active vehicles in that region. In one example, the time frame can be for a single day where the live routes are being executed across the region of the map. In another example, the icons can be color-coded by a color scare indicating the number or frequency of safety events recorded.

FIG. 20 illustrates the southwestern region of the United States and features the number of live fleets in the map. For example, a fleet can operate in the Los Angeles area, another fleet in Arizona, another fleet in Texas, and another fleet in Nevada. A user, generally a fleet manager or general manager, can view all of these fleets in a single display of the southwest region of the united states. If the live fleet operating in the Los Angeles area has accumulated 20 safety events, a number 20 and a color code can be associated with the icon representing the live fleet in Los Angeles.

Such a live view having a visualization of all fleets displayed in the area selected by the user can have an additional feature of an overlay of a live fleet count 2020. The live fleet count can include a table showing the status of each driver across the fleets in the selected region. The status can be categorized by moving drivers, stopped drivers, idle drivers, and off duty drivers. The overlay can display the number of drivers currently identified by each category.

In one example, a user can select a particular fleet in the regional view of fleets on the user interface. When the user selects the particular fleet, the visualization can change to that of the map visualization of that particular fleet, e.g., the view shown in FIG. 19.

3. Flowchart

Figure 21:
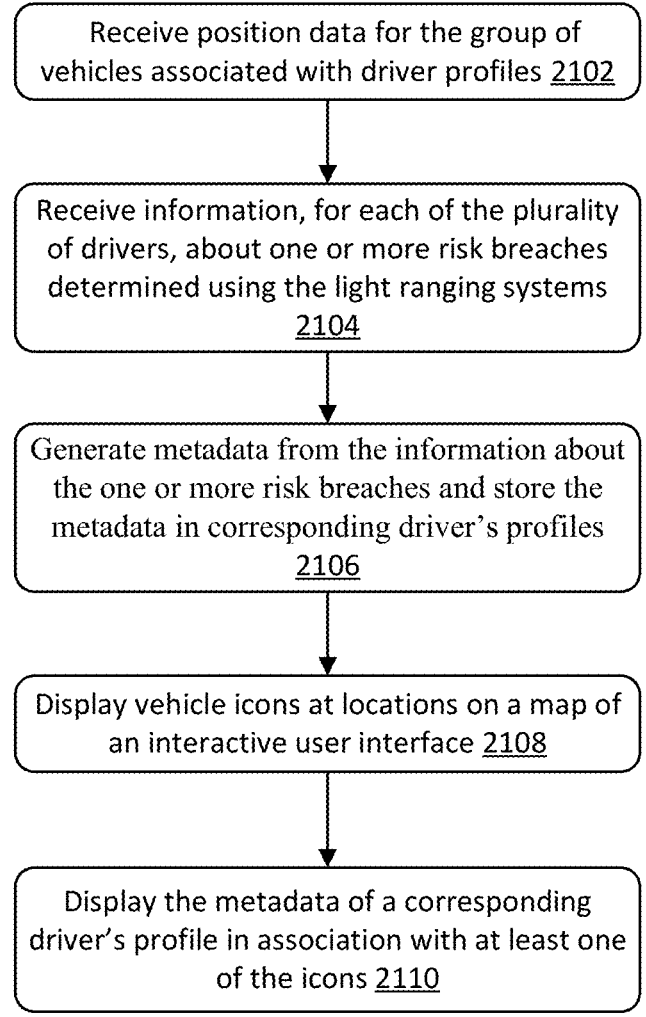
FIG. 21 is a flowchart illustrating a method for using light ranging data collected from light ranging systems installed on a group of vehicles according to some embodiments.

FIG. 21 is a flowchart illustrating a method for using light ranging data collected from light ranging systems installed on a group of vehicles according to some embodiments. The method may be performed by a computing system, such as a client computer or a server computer, which may provide a website to clients. The computing system can act as a vehicle monitoring system, e.g., of a fleet of vehicles.

At step 2102, a vehicle monitoring system receives position data for a group of vehicles (e.g., in a fleet), each equipped with a light ranging system. Each vehicle can be associated with a driver of a plurality of drivers in the fleet. Each driver can have a profile. A profile can include information as described above, e.g., for FIGS. 9-17. The profile data can be determined from ranging data collected from a vehicle that the driver was driving. An identifier for a driver can be established for a session with the vehicle, e.g., by a user logging into a control unit or through facial recognition from a camera in the vehicle. When data is uploaded from a control unit (e.g., that is in communication with a light ranging system) to a server, the identifier can be used to store the new data with existing data in that driver's profile. The profile can be established using historical data measured for previous driving sessions, just for a current session, or results for both can be provided.

At step 2104, the vehicle monitoring system receives information about one or more risk breaches for each of the plurality of drivers. Such risk breaches can be determined using ranging data measured with a light ranging system of a vehicle. For example, the risk breaches can be determined as described in section IV. The risk breaches may be determined by the light ranging systems, and information about the risk breaches provide to the vehicle monitoring system, e.g., via a network connection. Alternatively, some or all of the ranging data or certain statistical values of the ranging data (e.g., distances, distance vectors, speeds, velocities, and accelerations) can be uploaded to the vehicle monitoring system, which can analyze the data to determine the one or more risk breaches.

At step 2106, the vehicle monitoring system generates metadata from the information about the one or more risk breaches. The metadata can be stored in corresponding driver's profiles. As examples, the metadata can include one of a performance score, a number of risk thresholds breached, a vehicle identifier name, a route of a driver associated with the driver's profile (e.g., a route the driver is currently tasked), or a combination thereof. Other examples of such metadata are provided herein, e.g., for FIGS. 9-17.

At step 2108, the vehicle monitoring system displays a map on an interactive user interface, where the map includes one or more icons indicating each vehicle of the group of vehicles. The icons can be located on the map based on the position data for the group of vehicles. For example, as shown in FIG. 19, vehicle icons 1910 are displayed on map 1905. The user interface is interactive, e.g., vehicles can be selected to view more information.

At step 2110, the metadata of a corresponding driver's profile can be displayed in association with at least one of the icons. For example, the vehicle icons can be color coded such that the color codes are associated with an overall performance score of the driver's profile associated with the one or more vehicles. For instance, a first color code (e.g., red) can indicate the overall performance score is below a threshold, and a second color code (e.g., blue) indicates the overall performance score is above the threshold. The overall performance score of each driver can be determined by the information about the one or more risk breaches determined by the light ranging system. As another example, numerical values (e.g., a score, number of safety events, etc.) can be provided, e.g., as metadata 1920.

In some embodiments, the vehicle monitoring system can include a user interface with a browsing page. On the browsing page, a user can select specific analytics to be displayed about data gathered and processed by the light imaging systems of vehicles in the network. In one example, a user can view data by drivers, by safety events, by routes, by vehicle types or names, or by fleets. For instance, a page showing data by drivers can display a list of drivers in rows in alphabetical order and have fleet number information, safety score, number of drivers in each fleet, and date of last operating a vehicle in the row. In another example, the rows can be ordered by the fleet name, safety scores, number of drivers in a fleet, or date of last driven.

F. Correction of GPS Data with Lidar Data

In some embodiments, the position of a vehicle can be initially determined using GPS, and that initial position can be corrected using lidar data. GPS data is often inaccurate in cities, where signals can be blocked by buildings. In such cases, the lidar data surveyed from the environment (e.g., the buildings) can be used to identify a position more accurately. For example, the points clouds from the lidar measurements can be compared to known maps, thereby allowing a position on the map to be identified. In another embodiment, the vehicle can determine its location and odometry directly in real-time using the lidar data and a precomputed 3D map of the area that it downloaded from a central server. Thus, GPS data or other initial position measurement may not be needed.

Figure 22:
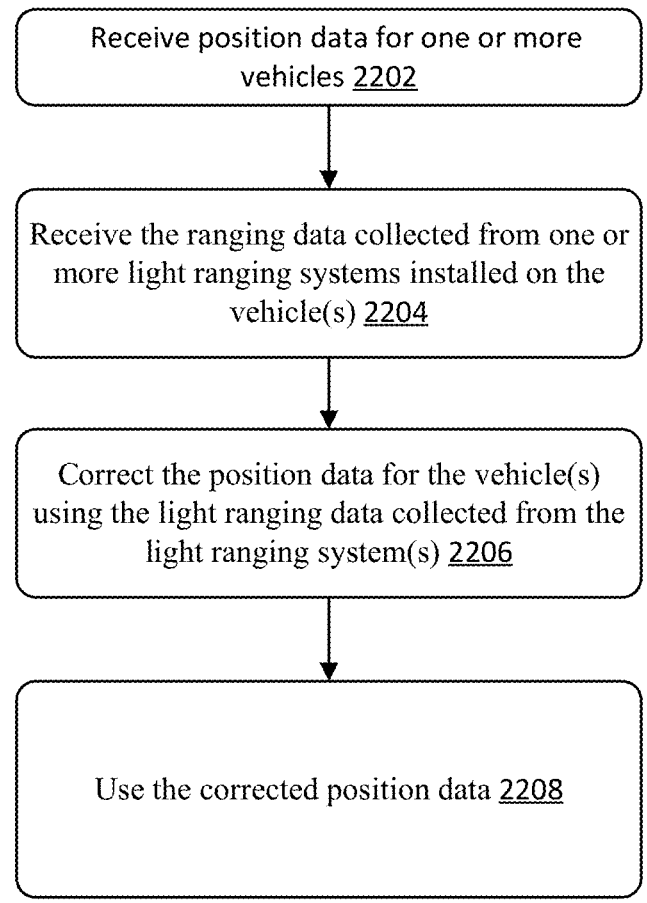
FIG. 22 is a flowchart of a method for using light ranging data collected from light ranging systems installed on a group of vehicles according to some embodiments.

FIG. 22 is a flowchart of a method for using light ranging data collected from one or more light ranging systems installed on one or more vehicles according to some embodiments. The method may be performed by a computer system, such as a client computer or a server computer, which may provide a website to clients. The computing system can act as a vehicle monitoring system, e.g., of a fleet (group) of vehicles. In other embodiments, the computer system can be installed on a vehicle, e.g., as a control unit described herein or as part of the light ranging system.

At step 2202, position data is received for the one or more vehicles. The position data can be received at a vehicle monitoring system, e.g., as described above, or at a control unit, which may track a driving pattern of the vehicle to provide analytics or alerts. Each vehicle can be associated with a driver of a plurality of drivers. Each driver can have a profile. The position data for a vehicle can be determined using location circuitry, e.g., GPS. As other examples, this position data can be determined using previous measurements of the light ranging system of the vehicle (e.g., a previous lidar-determined position) or a default position, e.g., a general area so that a corresponding part of the reference physical map can be used.

At step 2204, the light ranging data collected from the light ranging systems installed on the group of vehicles is received. The light ranging data can be in various forms, e.g., point clouds taken at one or more times, just a portion of a point cloud, or other data structure that includes distances to one or more objects. The light ranging data may be compressed, e.g., with changes from one point cloud to another being transmitted. The light ranging data may be received via a network.

At step 2206, the position data for the group of vehicles is corrected using the light ranging data collected from the light ranging systems installed on the group of vehicles, thereby obtaining corrected position data. As an example for such correcting, a portion of a first physical map can be obtained based on an initial position (e.g., via GPS) of a vehicle of the group of vehicles, and the light ranging data can be aligned to the portion of the physical map to determine the corrected position data. The aligning can include generating a second physical map generated from the light ranging data (e.g., from point clouds) and aligning the second physical map to the first physical map. The alignment can include determining pairs of positions in the two maps that correspond with each other, e.g., corners of objects. A distance between the same corner of the object in one map relative to the other map can be minimized by translating one of the maps. The shifting can continue to minimize a sum of the errors (e.g., using least squares), e.g., the distance pairs of corresponding positions.

The corrected location can be determined as the position of the vehicle in the second physical map. The portion of the first physical map can be selected to be a predetermined area (e.g., 1,000 meters) around the initial position of the vehicle. Such a first physical map can be stored locally or at a server that can provide maps (e.g., 3D maps) as a service.

The map may be physical in that distances are known from different positions to other positions. And, positions of objects are known in the map. The objects can be buildings, but can also be other stationary objects, such as signs, newspaper racks, trees, etc. The first physical map can be two- or three-dimensional. Such physical maps may be obtained from past measurements of other vehicles in a fleet.

At step 2208, the corrected position data is used by the computer system. For example, if the computer system is part of a vehicle monitoring system, a map can be displayed on a display of the computer system, e.g., on a screen of the computer. The map can include one or more icons indicating one or more vehicles of a group of vehicles. The icon(s) can be displayed at one or more locations on the map based on the corrected position data for the group of vehicles. In some embodiments, a light ranging system can perform the correction, e.g., when the computer system is a control unit of the light ranging system. In such an embodiment, the corrected locations can be sent to a vehicle monitoring system, e.g., for displaying in an interactive user interface, such as in FIG. 19.

In embodiments where the computer system is at the vehicle, the system can determine the exact location in real-time. Knowing the exact location in real time may allow for better information and warnings for the driver. For instance, by localizing in real time to a 3D map that also contains information about the location of stop signs, the system can provide warnings to a driver when they fail to stop at a stop sign based on their location and odometry information. Thus, the alert can be generated based on a relative distance between the corrected position of the vehicle and a known position of a sign on the first physical map. Such odometry information can be determined from the ranging data or sensors of the vehicle, either providing information about a trajectory (e.g., speed, velocity, acceleration, etc.) of the vehicle.

In such an embodiment, it is possible for object recognition to not be used. Thus, there may be no requirement that the system detect the stop sign in real time. The same benefit can be true for lane departure warnings. The 3D physical map can contain information about the exact location of lane centerlines and edges and can provide departure warnings to the driver, if the system is localizing to a map that contains this information. This is an improvement on systems that would traditionally try to detect lane lines in real time which is a hard problem that does not work when lane lines are not visible or do not exist.

G. Vehicle Monitoring System

Figure 23:
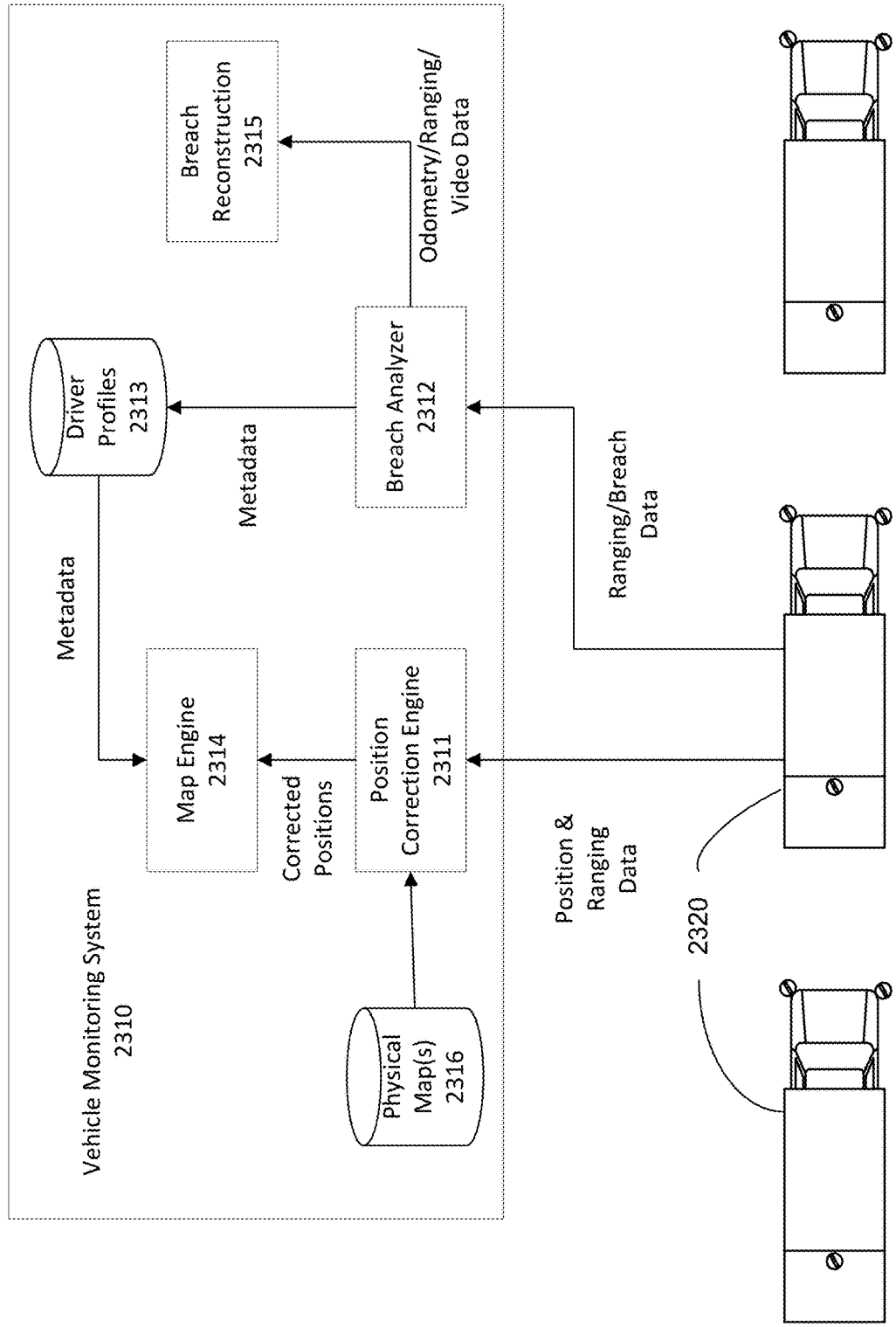
FIG. 23 shows a vehicle monitoring system according to some embodiments.

FIG. 23 shows a vehicle monitoring system 2310 according to some embodiments. Vehicle monitoring system 2310 can communicate with vehicles 2320 that have light ranging systems installed on them. Various data can be communicated from the light ranging systems to vehicle monitoring system 2310 across a network. For example, cellular channels, such as 3G, 4G, LTE, and 5G may be used. In other examples, WiFi can be used, e.g., when a vehicle is near a WiFi hotspot the data can be transferred, thereby transferring data collected since a last transmission at a previous WiFi hotspot. Vehicle monitoring system 2310 can include various software modules/engines. For ease of illustration, particular data is shown being communicated to a particular module, although such data may be transmitted to a network interface and then internally communicated to any modules as needed. In other embodiments, all or parts of vehicle monitoring system 2310 can be implemented at the vehicle, e.g., by a vehicle control unit, as described herein.

Position correction engine 2311 can receive position and ranging data from a vehicle. The position data can correspond to GPS, e.g., as described in the section above. Position correction engine 2311 can align the point clouds of ranging data to physical maps 2316 to determine a correction to the position data. Alternatively, the corrected position can be determined in real-time on the vehicle by sending the map data for physical map(s) 2316 to the vehicle. Corrected position data can then be sent to map engine 2314, which can provide a map display, e.g., as described for FIGS. 15, 16, and 19. Position correction engine 2311 and map engine 2314 can be used in the method of FIG. 22.

Breach analyzer 2312 can receiving ranging and/or breach data. If a light ranging system detects breaches itself, the light ranging system can send data about a breach, e.g., a type of breach, its duration, specific odometry and proximity values (e.g., velocity, acceleration, closest distance, etc.) used to detect the breach. When ranging data is received by breach analyzer 2312, it can perform an odometry analysis or distance determination to determine whether a breach has occurred. Breach analyzer 2312 can perform such analysis over a driving session of a user and provide metadata, including statistical values of the session (e.g., number of breaches, including of different types), and provide the metadata to database that stores driver profiles 2313. The metadata can be provided to map engine 2314 when requested, e.g., in real-time or when viewing historical information about a driver and/or a session. Breach analyzer 2312 and map engine 2314 can be used in the method of FIG. 21.

Breach reconstruction module 2315 can receive various data for displaying information about a breach, e.g., as shown in FIG. 16. Such data can include ranging data (e.g., to display point clouds in maps in window 1615, odometry data (e.g., as continuous values 1605), and video data (e.g., in windows 1621 and 1622). Breach reconstruction module 2315 can received such data directly from a light ranging system, breach analyzer 2312, or entirely or partially from other modules. Breach reconstruction module 2315 can save the various types of data together, so that playback can be synchronized.

VII. EXAMPLE COMPUTER SYSTEM

Figure 24:
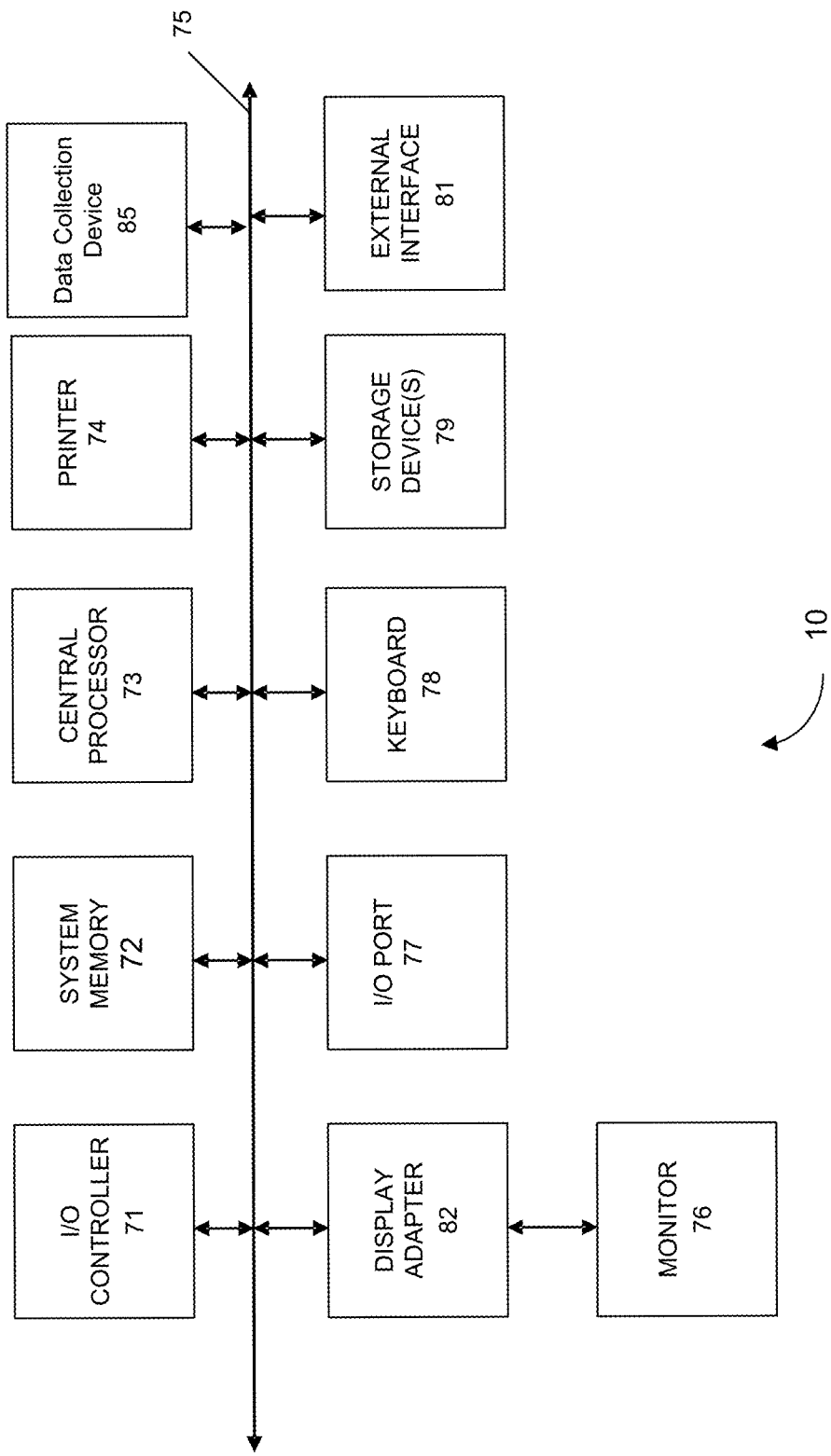
FIG. 24 shows a block diagram of exemplary computer system for implementing various embodiments.

Any of the computer systems (e.g., User Interface Hardware & Software 315) mentioned herein may utilize any suitable number of subsystems. Examples of such subsystems are shown in FIG. 24 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 24 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

VIII. REFERENCES

Alismail, H., Baker, L. D., & Browning, B. (2014, May). Continuous trajectory estimation for 3D SLAM from actuated lidar. In *Robotics and Automation (ICRA), 2014 IEEE International Conference on* (pp. 6096-6101). IEEE.

Anderson, S., MacTavish, K., & Barfoot, T. D. (2015). Relative continuous-time SLAM. The International Journal of Robotics Research, 34(12), 1453-1479.

Barfoot, T. D., Tong, C. H., & Särkkä, S. (2014, July). Batch Continuous-Time Trajectory Estimation as Exactly Sparse Gaussian Process Regression. In *Robotics: Science and Systems*.

Besl, P. J., & McKay, N. D. (1992, April). Method for registration of 3-D shapes. In *Robotics-DL tentative* (pp. 586-606). International Society for Optics and Photonics.

Dube, R., Sommer, H., Gawel, A., Bosse, M., & Siegwart, R. (2016, May). Non-uniform sampling strategies for continuous correction based trajectory estimation. In *Robotics and Automation (ICRA), 2016 IEEE International Conference on* (pp. 4792-4798). IEEE.

Geiger, A., Lenz, P., Stiller, C., & Urtasun, R. (2013). Vision meets robotics: The KITTI dataset. *The International Journal of Robotics Research*, 32(11), 1231-1237.

Kaul, L., Zlot, R., & Bosse, M. (2016). Continuous-Time Three-Dimensional Mapping for Micro Aerial Vehicles with a Passively Actuated Rotating Laser Scanner. Journal of Field Robotics, 33(1), 103-132.

Kohler, D., Hess, W., & Rapp, H. (2016, October) Cartographer is a system that provides real-time simultaneous localization and mapping (SLAM) in 2D and 3D across multiple platforms and sensor configurations. Retrieved from github.com/googlecartographer/cartographer.

Magnusson, M. (2009). The three-dimensional normal-distributions transform: an efficient representation for registration, surface analysis, and loop detection (Doctoral dissertation, Örebro universitet).

Pomerleau, F., Colas, F., & Siegwart, R. (2015). A review of point cloud registration algorithms for mobile robotics. *Foundations and Trends in Robotics*, 4(1), 1-104.

Segal, A., Haehnel, D., & Thrun, S. (2009, June). Generalized-ICP. In Robotics: science and systems (Vol. 2, No. 4).

Stoyanov, T., Magnusson, M., Andreasson, H., & Lilienthal, A. J. (2012). Fast and accurate scan registration through minimization of the distance between compact 3D NDT representations. *The International Journal of Robotics Research*, 31(12), 1377-1393.

Tam, G. K., Cheng, Z. Q., Lai, Y. K., Langbein, F. C., Liu, Y., Marshall, D., . . . & Rosin, P. L. (2013). Registration of 3D point clouds and meshes: a survey from rigid to nonrigid. *Visualization and computer graphics, IEEE transactions on*, 19(7), 1199-1217.

Zhang, J., & Singh, S. (2014, July). LOAM: Lidar Odometry and Mapping in Real-time. In *Robotics: Science and Systems* (Vol. 2).

Zhang, J., & Singh, S. (2014, November). laserOdometry.cpp. Retrieved from http://web.archive.org/web/20160728191133/http://docs.ros.org/indigo/api/loam_velodyne/html/laserOdometry_8cpp_source.htmlhttp://docs.ros.org/indigo/api/loamvelodyne/html/laserOdometry8cppsource.html.

Zlot, R., & Bosse, M. (2014). Efficient Large-scale Three-dimensional Mobile Mapping for Underground Mines. *Journal of Field Robotics*, 31(5), 758-779.

What is claimed is:

1. A method for using ranging data collected from a light ranging system installed on a vehicle, the method comprising performing, by a computer system:
receiving sensor data corresponding to a risk breach for the vehicle determined using the light ranging system of the vehicle, wherein the sensor data includes a ranging data stream measured by the light ranging system of an environment around the vehicle at an amount of time before and after the risk breach was detected;
receiving, at a user interface, user input indicating that a reconstruction of the risk breach is to be played; and
in response to the user input:
displaying the ranging data stream as a reconstructed model of the environment around the vehicle in a first window of the user interface.

2. The method of claim 1, further comprising:
receiving position data for the vehicle during a time interval associated with the risk breach; and
in response to the user input, displaying, in another window of the user interface, positions of the vehicle on a map at times synchronized with the ranging data stream.

3. The method of claim 1, further comprising:
obtaining a series of values of a variable determined from the ranging data stream, wherein the series of values span a time interval associated with the risk breach; and
displaying the series of values in another window of the user interface.

4. The method of claim 3, wherein the variable is speed, velocity, or acceleration.

5. The method of claim 4, wherein the computer system determines the series of values for the variable from the ranging data stream.

6. The method of claim 1, wherein the sensor data further includes a video data stream obtained from a camera installed on the vehicle, the method further comprising:
synchronizing the ranging data stream and the video data stream by determining a time in the ranging data stream that corresponds to a time in the video data stream; and
in response to the user input:
displaying the video data stream in a second window of the user interface.

7. The method of claim 6, further comprising:
obtaining a series of values of a variable determined from the video data stream, wherein the series of values span a time interval associated with the risk breach; and
displaying the series of values in another window of the user interface, wherein the variable measures distraction of a driver of the vehicle and is determined using the video data stream.

8. The method of claim 6, wherein the user interface includes an interface element that allows a user to move time forward and backward such that the reconstructed model of the environment around the vehicle displayed in the first window and the video data stream displayed in the second window are played forward and backward in synchronization.

9. The method of claim 1, further comprising:
displaying a profile of a driver or a group of drivers;
displaying one or more safety events;
receiving a selection of a safety event from the one or more safety events; and
in response to receiving the selection of the safety event, displaying the user interface indicating that the reconstruction of the risk breach is to be played.

10. The method of claim 1, while displaying the reconstructed model of the ranging data stream changing a perspective view of the reconstructed model.

11. The method of claim 1, wherein displaying the ranging data stream as the reconstructed model includes:
displaying environmental objects a different color than ground.

12. The method of claim 1, wherein the first window is refreshed at a same rate the ranging data stream was measured.

13. A computer product comprising a non-transitory computer readable medium storing a plurality of instructions that, when executed on one or more processors of a computer system, control the computer system to perform operations for using ranging data collected from a light ranging system installed on a vehicle, the operations comprising:
receiving sensor data corresponding to a risk breach for the vehicle determined using the light ranging system of the vehicle, wherein the sensor data includes a ranging data stream measured by the light ranging system of an environment around the vehicle at an amount of time before and after the risk breach was detected;
receiving, at a user interface, user input indicating that a reconstruction of the risk breach is to be played; and
in response to the user input:
displaying the ranging data stream as a reconstructed model of the environment around the vehicle in a first window of the user interface.

14. The computer product of claim 13, wherein the operations further comprise:
receiving position data for the vehicle during a time interval associated with the risk breach; and
in response to the user input, displaying, in another window of the user interface, positions of the vehicle on a map at times synchronized with the ranging data stream.

15. The computer product of claim 13, wherein the operations further comprise:
obtaining a series of values of a variable determined from the ranging data stream, wherein the series of values span a time interval associated with the risk breach; and
displaying the series of values in another window of the user interface.

16. The computer product of claim 15, wherein the variable is speed, velocity, or acceleration.

17. The computer product of claim 16, wherein the computer system determines the series of values for the variable from the ranging data stream.

18. The computer product of claim 13, wherein the sensor data further includes a video data stream obtained from a camera installed on the vehicle, and wherein the operations further comprise:
synchronizing the ranging data stream and the video data stream by determining a time in the ranging data stream that corresponds to a time in the video data stream; and
in response to the user input:
displaying the video data stream in a second window of the user interface.

19. The computer product of claim 18, wherein the operations further comprise:
obtaining a series of values of a variable determined from the video data stream, wherein the series of values span a time interval associated with the risk breach; and
displaying the series of values in another window of the user interface, wherein the variable measures distraction of a driver of the vehicle and is determined using the video data stream.

20. The computer product of claim 18, wherein the user interface includes an interface element that allows a user to move time forward and backward such that the reconstructed model of the environment around the vehicle displayed in the first window and the video data stream displayed in the second window are played forward and backward in synchronization.

21. The computer product of claim 13, wherein the operations further comprise:
displaying a profile of a driver or a group of drivers;
displaying one or more safety events;
receiving a selection of a safety event from the one or more safety events; and
in response to receiving the selection of the safety event, displaying the user interface indicating that the reconstruction of the risk breach is to be played.

22. The computer product of claim 13, while displaying the reconstructed model of the ranging data stream changing a perspective view of the reconstructed model.

23. The computer product of claim 13, wherein the first window is refreshed at a same rate the ranging data stream was measured.

\* \* \* \* \*